United States Patent
Arguelles et al.

(10) Patent No.: US 11,310,165 B1
(45) Date of Patent: Apr. 19, 2022

(54) SCALABLE PRODUCTION TEST SERVICE

(71) Applicant: Amazon Technologies, Inc., Reno, NV (US)

(72) Inventors: Carlos Alejandro Arguelles, Shoreline, WA (US); Ramakrishnan Hariharan Chandrasekharapuram, Seattle, WA (US); Blair Livingstone Hotchkies, Bellevue, WA (US); Thomas Lowell Keller, Renton, WA (US); Choi Yong Ngo, Issaquah, WA (US); Peter Collin Nix, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 838 days.

(21) Appl. No.: 14/133,559

(22) Filed: Dec. 18, 2013

Related U.S. Application Data

(60) Provisional application No. 61/902,765, filed on Nov. 11, 2013.

(51) Int. Cl.
*H04L 12/911* (2013.01)
*H04L 47/70* (2022.01)

(52) U.S. Cl.
CPC .................................. *H04L 47/70* (2013.01)

(58) Field of Classification Search
CPC ... H04L 12/2602; H04L 41/22; H04L 41/024; H04L 41/0681; H04L 41/5009; H04L 43/00; H04L 43/50; H04L 67/36; H04L 67/02; H04L 67/10; H04L 67/22; H04L 43/06; H04L 43/08; H04L 43/10; H04L 43/045; H04L 43/0876; H04L 67/42;
(Continued)

(56) References Cited

U.S. PATENT DOCUMENTS 6,883,162 B2  4/2005  Jackson et al.
8,214,794 B2  7/2012  Nigul et al.
(Continued)

OTHER PUBLICATIONS

U.S. Appl. No. 14/133,562, filed Dec. 18, 2013, Carlos Alejandro Arguelles.
(Continued)

*Primary Examiner* — Nicholas R Taylor
*Assistant Examiner* — Michael Li
(74) *Attorney, Agent, or Firm* — Robert C. Kowert; Kowert, Hood, Munyon, Rankin & Goetzel, P.C.

(57) ABSTRACT

A network-based scalable production load test service may be implemented on a provider network including a plurality of computing devices in order to provide load testing for network-based production systems. In some embodiments, the plurality of computing devices is configured to receive a request to capture to a load test data repository items of transaction data for a network-based production service. In some embodiments, the plurality of computing devices is configured to capture to the load test data repository the items of transaction data. The transaction data include input to the network-based production service over a network. In some embodiments, in response to a load test specification received by the scalable production load test service, the plurality of computing devices is configured to dynamically allocate one or more resources to perform a load test of the network-based production service according to the load test specification.

15 Claims, 32 Drawing Sheets

(58) Field of Classification Search
CPC .... H04L 47/70; H04L 41/147; G06F 11/3414; G06F 11/3433; G06F 11/3688; G06F 17/30899; G06F 11/263; G06F 11/3419; G06F 11/3495; G06F 11/3672; G06F 2201/87; G06F 2201/875; G06F 11/3452; G06F 17/30598
See application file for complete search history.

(56) References Cited

U.S. PATENT DOCUMENTS

| | | | |
|---|---|---|---|
| 8,219,852 B2 | 7/2012 | Lind et al. | |
| 8,375,443 B1 | 2/2013 | Reis et al. | |
| 2002/0138226 A1* | 9/2002 | Doane | G06F 11/2294 702/119 |
| 2002/0177977 A1* | 11/2002 | Scarlat | G06F 11/3414 702/186 |
| 2003/0074606 A1* | 4/2003 | Boker | G06F 11/3414 714/42 |
| 2004/0039550 A1* | 2/2004 | Myers | G06F 11/3414 702/186 |
| 2005/0021689 A1 | 1/2005 | Marvin et al. | |
| 2008/0066009 A1* | 3/2008 | Gardner | G06F 8/34 715/809 |
| 2009/0106174 A1* | 4/2009 | Battisha | H04L 12/2602 706/12 |
| 2009/0276431 A1 | 11/2009 | Lind et al. | |
| 2010/0218104 A1* | 8/2010 | Lewis | G06Q 10/04 715/736 |
| 2010/0333072 A1* | 12/2010 | Dulip | G06F 11/3419 717/128 |
| 2012/0017165 A1* | 1/2012 | Gardner | G06F 17/30899 715/771 |
| 2012/0151066 A1* | 6/2012 | Brown | G06F 11/3664 709/226 |
| 2013/0054792 A1* | 2/2013 | Sharaf | G06F 8/20 709/224 |
| 2013/0055026 A1* | 2/2013 | Hatano | G06F 11/263 714/32 |
| 2013/0205020 A1* | 8/2013 | Broda | H04L 43/08 709/224 |
| 2015/0058478 A1* | 2/2015 | Ajiro | G06F 11/3672 709/224 |
| 2015/0067404 A1* | 3/2015 | Eilam | G06F 11/3006 714/38.1 |

OTHER PUBLICATIONS

U.S. Appl. No. 14/133,554, filed Dec. 18, 2013, Carlos Alejandro Arguelles.
U.S. Appl. No. 14/133,584, filed Dec. 18, 2013, Carlos Alejandro Arguelles.
The Grinder, "Features of The Grinder 3," dated Oct. 4, 2011, pp. 1-5.
U.S. Appl. No. 14/133,581, filed Dec. 18, 2013, Carlos Alejandro Arguelles.
"The Netflix Simian Army—Netflix TechBlog-Medium", Retreived from URL: https://medium.com/netflix-techblog/the-netflix-simian-army-16e57fbab116 on Mar. 18, 2017, pp. 1-6.

\* cited by examiner

SCALABLE PRODUCTION TEST SERVICE

PRIORITY INFORMATION

This application claims benefit of priority to the following provisional application, which is hereby incorporated by reference in its entirety: Ser. No. 61/902,765 filed Nov. 11, 2013 titled Annotations-based Generic Load Generator Engine and Data Providers, Workflow Support, and Load Testing Service Therefor.

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which may be hosted in geographically separate locations and which may be configured to process large quantities (e.g., millions) of client requests daily or even hourly. Ensuring that these services can scale to handle abnormally high loads is a non-trivial problem.

Existing test solutions are frequently not scalable enough to handle storing, accessing, processing and/or applying a load to test at the size of today's large production systems. As a further complication, it may be desirable to test for some time periods having loads that are many times the load of other time periods. For example, a business may want to test how a network site will handle increased traffic during a time period for which the business is advertising a special promotion, or test how a retail website will handle a volume of traffic expected on peak shopping days (e.g., Black Friday or Cyber Monday).

Consequently, traditional load generators frequently need to send large (sometimes very large) amounts of data to the service under test. Traditional testing platforms frequently do not provide a clear difference between the data preparation and the actual transaction execution on the service under test and therefore the collection of latency metrics (and/or other performance metrics) may be skewed. In other words, if the data preparation is slow, but the actual transaction is fast, the slowness of the data preparation may skew collected performance metrics. Similarly, errors performance encountered during data preparation may (such as file I/O errors, or data validation errors) may count towards the number of performance errors that are reported for the service under tests.

Existing testing platforms directed to testing network-based production services frequently utilize programming libraries or frameworks that provide individual methods/class which the developers call from within their application to create a load generator that will test the production services. For example, some existing testing development frameworks may provide Java classes as building blocks that users/programmers combine into their own program. For example, programmers may declare a dependency on the Java JAR that contains the load generation code, and then piece the objects together. There may be a Java class responsible for generating transactions at a specific number of transactions per second, which programmers may use directly. This approach may create a very tight (and restrictive) contract between the programmer building the load generator and the load generation framework. Programmers generally need low-level knowledge of the way the framework works, which may hinder the flexibility of framework. Often innovation within the framework may only occur by introducing changes to the load generation framework API, possibly breaking existing applications.

Other existing frameworks may require the programmer to implement a very specific interface in order to interact with the framework. Such an interface frequently is not scalable due to having a "one-size-fits-all" approach. Additionally, existing interfaces often require programmers to create a more complex application than needed. For example, the interface may have to support diverse testing scenarios that may have little in common with each other and that may not be required by any one particular application.

Figure 1:
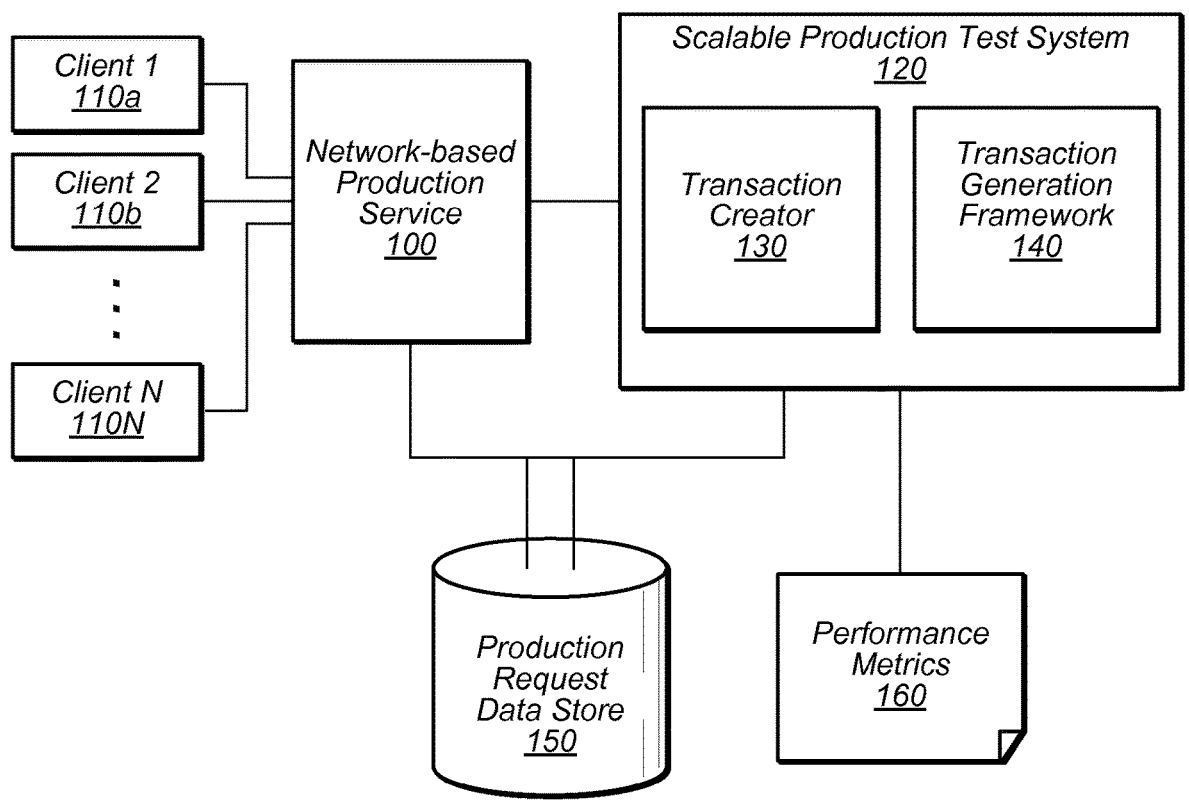
FIG. 1 is a logical block diagram illustrating an example configuration of a system for testing a network-based production service using a transaction generation framework, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended examples. The headings used herein are for organizational purposes only and are not meant to be used to limit the scope of the description or the examples. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

As discussed in more detail below, systems and methods for a generic transaction generation framework for scalable testing of a production system are provided. A network-based production service implemented by one or more computers may be configured to process requests from clients for the production service via a network. A load generator may be configured to simulate client requests as test transactions by providing production request data, such as by either making up synthetic test data (e.g., choosing random strings or numbers in valid ranges, etc.) or by replaying real-world traffic that service owners have saved in past runs. For example, client request data defining the requests may be captured and stored in a data store for subsequent use in testing the production service as production request data. In some embodiments, individual transactions performed on/for the production service may be serialized into sets of records that may subsequently be used to "replay" those transactions for testing.

An example network-based production service may be an on-line retail business that processes millions or billions of client requests per day. However, on a given day such as peak shopping days (e.g., Black Friday, Cyber Monday) the number of client requests may be two to four times larger than an average day. In order to ensure the health of the production system during peak times, a test system may be implemented to test the production service hosting the on-line retail business. To create the test data, the client requests/transactions for a given time period may be captured for replay on the production system during test. Client requests may be captured without interfering with the normal processing of the client requests. Examples of client request data are one or more web page requests, selecting an object in the web page, one or more of the steps of the check-out process for the on-line retail business, or requests to a web services based compute or storage service. In some embodiments, requests/transactions may be captured and stored in log files that may be read and used during testing to generate test data.

When developing a load generator for testing a production service, developers may utilize a generic transaction generator framework that allows the developers and/or testers to specify a particular load to apply to the production service under test. As will be described in more detail below, a load may be specified in terms of any number of consecutive steps of load. A load step may specify a rate at which to apply transactions (e.g., transactions per second or a number of concurrent connections), a time period over which to apply the transaction rate, and a distribution of transaction types. A distribution of transaction types may be considered a set of percentages representing the numbers of individual transaction types to be generated relative to other transaction types. For example, if a production service under test could handle transaction types X, Y and Z, an example transaction distribution might specify that 70% of the transactions generated by the load generator should be of type X, while 10% should be of type Y and 20% should be of type Z.

A generic transaction generation framework, as described herein, may be configured to work in conjunction with a product-specific transaction creator module that may provide methods which the transaction generator framework can call to generate a transaction for each transaction type. The product-specific method may be responsible for the details of interacting with the production service under test and execution of the test transactions. In some embodiments, utilizing a combination of a transaction generator framework and a product-specific transaction creator module may isolate product specific knowledge from the transaction generation framework, possibly allowing it to be fully generic. In some embodiments the transaction generation framework may be considered a load generation framework.

Additionally, allowing test developers to specify the rate at which transactions are executed as well as the distribution of transaction types may, in some embodiments, allow test engineers to simulate any number of user scenarios and load situations. For example, if a service executes Reads and Writes as two transaction types, one user scenario could be 10% writes, 90% reads, whereas another user scenario could be 30% writes, 70% reads, and another one could be 100% reads, according to various examples. Furthermore, each user scenario may have a completely different performance profile, according to some embodiments.

In some embodiments, a test system may be implemented by one or more computers and comprise one or more controllers configured to create test jobs according to a test plan for testing the production service. The test plan may specify production request data and a profile for using the test data (e.g., production request or synthetic data) to simulate a load on the production service. In some embodiments, a job queue may be configured to receive and queue jobs from one or more controllers. The one or more controllers may add test jobs to the job queue according to the test plan, in some embodiments. One or more workers may be configured to access jobs from the job queue, access test data from the data store as specified in each job.

FIG. 1 illustrates a configuration of a system for testing a network-based production service using a transaction generation framework, according to one embodiment. In general, a network-based production service 100 may be any type of network-based service, such as on-line retail, web service-based or cloud computing/storage, and/or image/web hosting service, for example. In some embodiments, network-based production service 100 receives requests from clients 110. Examples of requests received from clients 110 are requesting one or more web pages viewable from a web-based browser, uploading one or more images to an online image processing business, and/or accessing a remotely implemented computing environment.

Network-based production service 100 may receive thousands or even millions of client requests per day, minute or seconds, for example. The client request data received by network-based production service 100 during a given time period may be stored in production request data store 150 for later use during testing, in some embodiments. Examples of client request data may include web page accesses, selecting a link on a webpage, uploading and/or downloading images/data. Scalable production test system 120 may include a generic transaction generation framework, such as transaction generation framework 140, as well as a transaction creator module, such as transaction creator 130, and all three may work in conjunction to generate test transactions for testing network-based production service 100.

Scalable production test system 120 may include transaction generation framework 140 which may work in conjunction with product-specific transaction creator 130 to generate test transactions for testing network-based production service 100, according to some embodiments. The transaction creator 130 may include runtime-discoverable information that may be used by transaction generation framework 140 to work with transaction creator 130. Transaction creator 130 may provide, via runtime-discoverable information, product-specific knowledge regarding the generation of transactions. For example, the runtime-discoverable information may identify which methods of transaction creator 130 should be called to create transactions of specific types. Runtime-discoverable information may also be used to specify a testing transaction rate, a period over which the test transactions should be generated and/or a distribution of transaction types, among other things.

Runtime-Discoverable Information

For example, in some embodiments, transaction creator 130 may include runtime-discoverable information, such as annotations 200 (see FIG. 2), to specify various types of information that may be discoverable by transaction generation framework 140 at runtime. In one embodiment, annotations 200 may represent Java annotations. Transaction generation framework 140 may include logic to search for and discover the runtime-discoverable information in transaction creator 130, such as annotations parser 210. Transaction generation framework 140 may then use the information discovered at runtime when generating test transactions.

In general, any of various forms of runtime-discoverable information may be used by transaction creator 130 and transaction generation framework 140. In some embodiments, Java annotations may be used as runtime-discoverable information. Java annotations may be considered a form of metadata that may be added to Java source code. For example, classes, methods, variables, parameters and/or packages may be annotated and the annotations may become attributes of the class, method, variable or parameter. Java annotations may be reflective in that they can be embedded in class files generated by the compiler and may be retrievable at run-time. Java annotations may also specify pairs of keys and corresponding values, such as may be used to communicate runtime-discoverable information between transaction creator 130 and transaction generation framework 140.

Java annotations may represent a dynamic (e.g., runtime) contract between two executing systems. Since Java annotations may represent a looser contract than Java interfaces, using Java annotations (or other forms of runtime-discoverable information) may allow users to pick and choose which Java particular annotations serve their purpose best rather than having to implement a strict, possibly very large, Java interface that may include methods that do not apply to their particular situation or use case. Additionally, binding happens at runtime, not at compile time, so transaction generation framework 140 may be able to make decisions about the code dynamically rather than statically (e.g., at compile time). For example, a method could support a number of different versions of it, dynamically bound at runtime, as will be discussed in more detail below.

While described herein mainly using Java annotations, annotations 200 may represent any of various forms of runtime-discoverable information communicated between transaction creator 130 and transaction generation framework 140, according to various embodiments. For instance transaction creator 130 may be configured to communicate runtime-discoverable information to transaction generation framework 140 via runtime-accessible configuration files.

In some embodiments, developers may specify the runtime-discoverable information during coding of the transaction creator 130. In other embodiments, however, users (e.g., testers) may be able to specify runtime-discoverable information via a user interface provided by transaction creator 130 or by a separate user interface module (such a test configuration module). Thus, a user or test designer may be able add, remove, change or modify the information provided by, and specified in, the runtime-discoverable information, while the scalable production test system is running/executing. In some embodiments, transaction generation framework 140 may be configured to discover the new/changed runtime-discoverable information and change the test load and/or test transactions used during testing. Thus, in some embodiments, scalable production test system 120 and/or transaction generation framework 140 may provide an interactive test system in which the user may change or modify testing parameters while the test system is running Scalable production test system 120 may utilize test data when generating test transactions. For example, production request data in production request data store 130 may be accessed by scalable production test system 120 during testing of network-based production service 100, according to some embodiments. In other embodiments, scalable production test system 120 may generate synthetic test data for use with test transactions. Scalable production test system 120 may generate test transactions and provide production request data (e.g., either captured client requests/transactions or synthetic test data) to network-based production service 100 to create "real-world", real-time, at scale simulations to stress network-based production service 100 safely.

In some embodiments, transaction creator 130 may be configured to provide specific methods callable by transaction generation framework 140 in order to prepare (e.g., load, generate, calculate, etc.) test data for use with a specific transaction and/or transaction type. For example, transaction creator 130 may include runtime-discoverable information that identifies individual methods that can be called by transaction generation framework 140 in order to prepare test data for a specific transaction type.

In yet other embodiments, transaction creator 120 may be configured to provide runtime-discoverable information, such as via annotations 200, indicating specific interdependencies between individual transaction types. Transaction generation framework 140 may be configured to discover such interdependencies and generate test transactions of different transaction types according to specified dependencies.

In some embodiments, network-based production service 100 is a network-based service implemented by one or more computers configured to process client requests. For example, network-based production service 100 may be a remote computing service configured to allow multiple clients to configure dedicated compute environments. Other examples are businesses such as on-line retail, web-hosting services, on-line image processing, brokerage firms, remote data storage, email services and/or social media web-sites. In some embodiments, network-based production service 100 receives a plurality of requests from client 110. For example, requests from clients 110 may be requests to access product pages on an on-line retail site. As another example, requests from clients 110 may be reading and/or submitting information to a social media site. For a given on-line retail sites, the number of requests could be thousands or millions of requests per hour.

Production Request Data

In some embodiments, production request data store 150 may store client request data for a given time period. The client request data may be received and processed by network-based production service 100. In addition, as a low level background task for example, the client request data may be captured (in an ongoing manner) without interfering with the normal processing of the client requests. The captured client request data may be stored in production request data store 150, such as in transaction log files, for subsequent use by scalable production test system 120. In general, production request data store 150 may be used to store (e.g., serialize) client requests or transactions that occur during live operation of a network-based production service 100 and to provide (e.g., replay) those requests or transactions for testing purposes, but without production request data store 150 being necessary for the execution of network-based production service 100. In other words, while production request data store 150 may be used during execution of network-based production service 100, network-based production service 100 may not require or use information from production request data store 150 during live operation. The production request data may be stored in time intervals such as minutes, for example. A time stamp and other identifying information are stored with the production request data, in some embodiments. In addition, the production request data may be encrypted prior to storage in production request data store 150, in some embodiments. The client request data may be organized in data store 150 according to time intervals (e.g., minutes) of standard timeframes (e.g., days). In some embodiments, captured production request data may be maintained in production request data store 150 for a limited amount of time, such as a two week rolling window, for example. In addition, data from time periods of interest may be kept indefinitely. A time period of interest may be a peak sales day for a retail business or a time period with a significant increase in traffic on a social media or news website.

In some embodiments, production request data store 150 may include, but may not be limited to, solid state storage, one or more disk drives, multiple disk drives configured as a RAID system, network-based storage devices, databases, and/or a cloud computing resource. In addition, production request data store 150 may represent any of various locations to which data may be stored. For example, production request data store 150 may represent a local data store, a network-accessible data store, an online cloud-based data store, an online multi-user network-based cloud queue, or other suitable data store, according to various embodiments.

In some embodiments, scalable production test system 120 may be configured to test network-based production service 100 with production request data from production request data store 150. Production request data may be captured client request data (e.g., transaction logs) from actual client requests/transactions to the production service, in some embodiments. Scalable production test system 120 may replay production request data from production request data store 150 (e.g., from captured transaction logs) to network-based production service 100 in order to test network-based production service 100.

The production request data from a particular time period may be replayed to network-based production service 100 in addition to ongoing client requests from clients 110A-110N, in some embodiments. In other embodiments, the production request data from different time periods is combined to create a more stressful test. For example to simulate a given time period of client requests, production request data from a particular time period or that exhibits a profile of interest may be replayed to production service 100. The production request data may be replayed in network-based production service 100 in order to test network-based production service 100.

As an alternate example, scalable production test system 120 may scale the tests to stress network-based production service 100 by merging production request data from similar standard time periods (e.g., from multiple days) captured at a particular time interval into a single test for the standard time period. Merging the production request data may create a stress test for network-based production service 100 to determine network-based production service 100's response to the simulated quantity of requests.

Network-based production service 100 may be a network-based storage service, for example. On a minute by minute basis any given number of clients may store or request data from the network-based storage service. To ensure that the network-based storage service can respond to large amounts of client requests, the network-based storage service may be stress tested with client data that has been previously captured. Scalable production test system 120 may store all of the client traffic on a minute by minute basis during a one week window. To stress (e.g. test) the network-based service, the stored client traffic (e.g. production request data) is replayed real-time with current client traffic (e.g., store and request for data). The response of the network-based storage service can be monitored to ensure that the response is as expected. As another example, the captured client request data (e.g., production request data) may be combined to create a more stringent stress test. For example, production request data from three separate days may be combined to create a single test. The combined production request data may simulate a peak period of client requests to the network-based service, for example.

Figure 2:
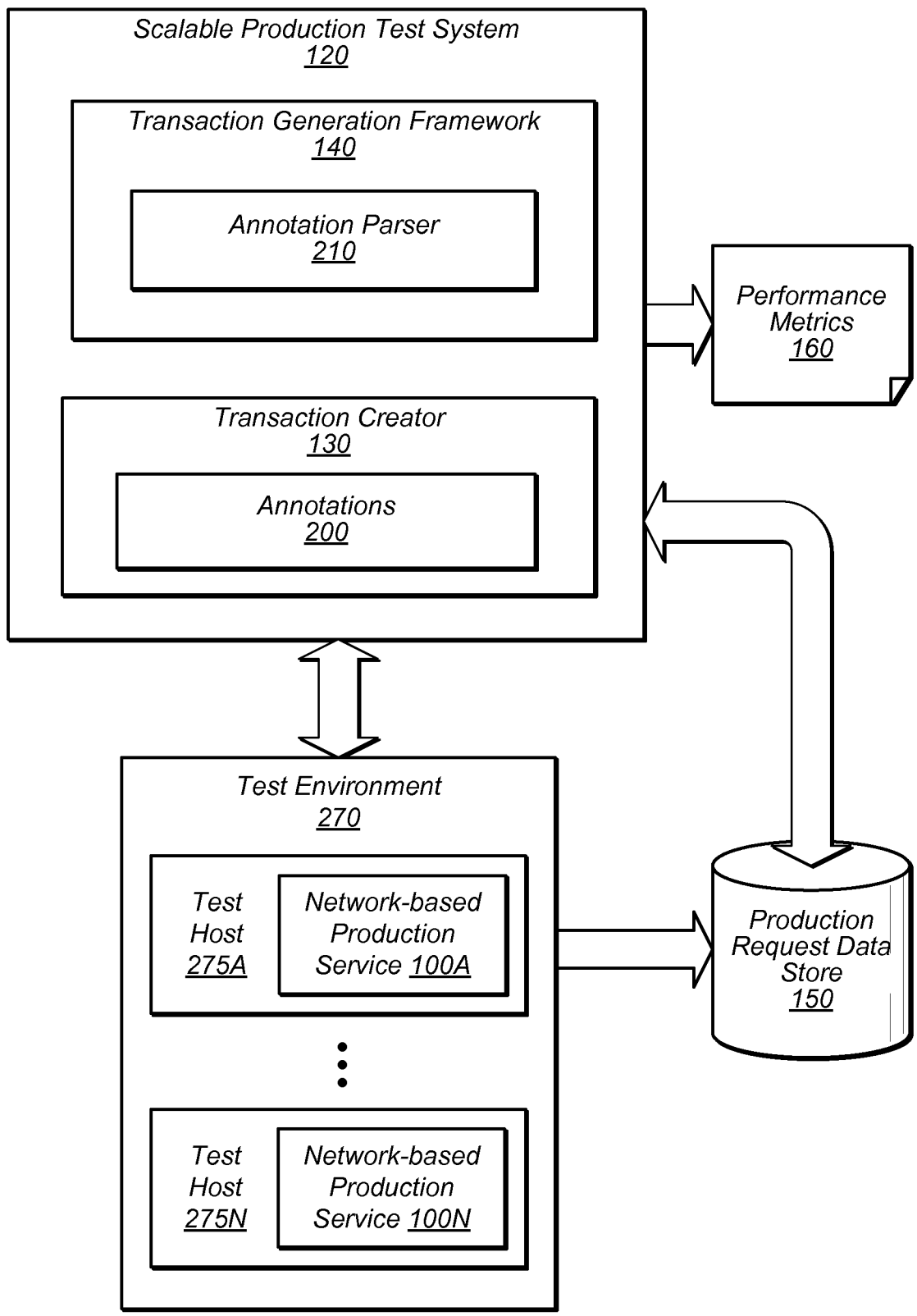
FIG. 2 is a logical block diagram illustrating an example system environment for a scalable production test system including a transaction generation framework, according to one embodiment.

FIG. 2 illustrates an example system environment for a scalable production test system including a transaction generation framework, according to one embodiment. The scalable production test system 120 may include one or more modules that perform aspects of the functionality described above with respect to FIG. 1. In one embodiment, the scalable production test system 120 may include a transaction creator 130 and a transaction generation framework 140. In addition, according to various embodiments, scalable production test system 120 may include fewer modules than shown, additional modules not shown, or different combinations or quantities of the modules shown.

Figure 20:
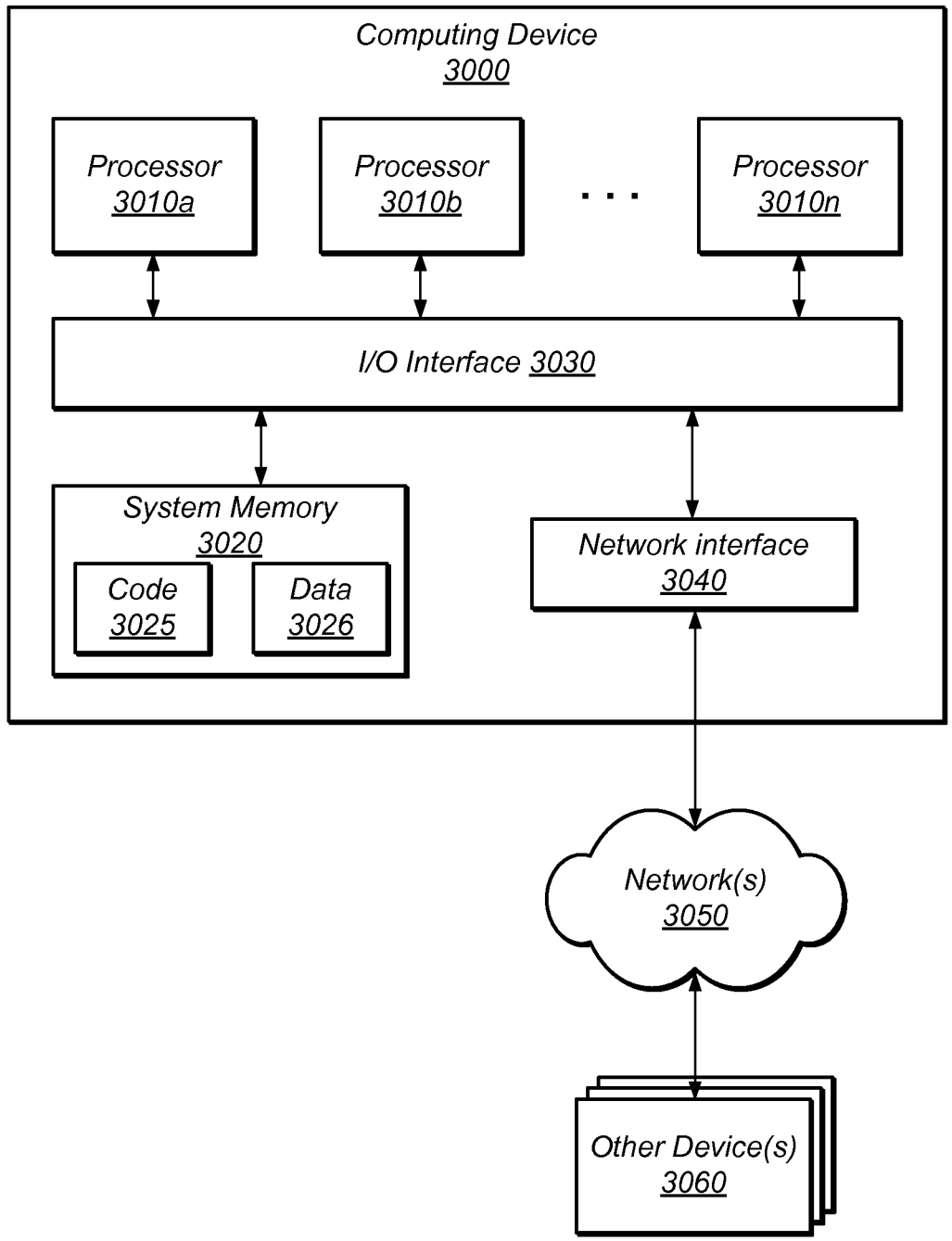
FIG. 20 illustrates a general-purpose computing device suitable for implementing one embodiment of a scalable production test system including a transaction creator module and a transaction generation framework, as described herein.

The scalable production test system 120 may comprise one or more computing devices, any of which may be implemented by the example computing device 3000 illustrated in FIG. 20. In various embodiments, portions of the functionality of the different modules (e.g., transaction creator 130 and transaction generation framework 140) may be provided by the same computing device or by any suitable number of different computing devices. If any of the components of the scalable production test system 120 are implemented using different computing devices, then the components and their respective computing devices may be communicatively coupled, e.g., via a network. Each of the illustrated components may represent any combination of software and hardware usable to perform their respective functions.

Generating Test Transactions According to Runtime-Discoverable Information

In one embodiment, transaction generation framework 140 may be part of a generic framework that applies transactions to any suitable software product. The transaction generation framework 140 may permit developers to specify a load to apply to a software product during various portions of the performance testing. For instance, runtime-discoverable information may be included within transaction creator 130.

In one embodiment, the transaction generation framework 140 may permit a target load to be defined in terms of one or more steps of load. Each step of load may specify a target load (e.g., a transaction frequency, a number of concurrent connections, etc.), a duration for the load, and a target distribution of the transaction types in the load (e.g., a target percentage for each type of transaction out of 100%). Load steps are discussed further with respect to FIG. 4. By permitting developers to specify the rate at which to execute transactions and the distribution of transaction types, the transaction generation framework 140 may permit various kinds of user scenarios and loads to be simulated during the performance tests. For example, a first scenario may specify 10% writes and 90% reads, a second scenario may specify 30% writes and 70% reads, and a third scenario may specify 100% reads. The scalable production test system 120 may employ suitable performance testing to assess the different performance profiles of each scenario.

The scalable production test system 120 may collect suitable performance metrics 160 in conjunction with various performance tests. For example, suitable metrics may include percentile client-side latencies (e.g., p50, p90, minimum, maximum, average, etc.), the number of transactions attempted, the number of transactions that failed, the rate at which transactions were being applied, etc. The performance metrics 160 may be stored in a repository using any suitable storage technology. In various embodiments, the repository may be internal or external to the scalable production test system 120. For example, in some embodiments, the collected metrics may be posted to an online or cloud-based data store (such as Amazon's SimpleDB™, Amazon's S3™ or Amazon's CloudWatch™) for archival and future retrieval.

In one embodiment, the performance metrics for different builds of the same software product may be stored in the repository. Additionally, performance metrics for different instances of the same build of a software product may be collected. For example, different instances of network-based production service 100 may be executing on different hosts and/or endpoints, such as on Test Hosts 275A-275N of test environment 270 illustrated in FIG. 2.

Metrics for various builds and/or endpoints may be retrieved from the repository and compared to the other metrics to determine whether the service under test passes or fails the performance tests. In various embodiments, the transaction creator 130 and the transaction generation framework 140 may be jointly responsible for various aspects of the performance testing, but the specific responsibilities of the two modules may vary.

A plurality of different software products may be used in conjunction with the scalable production test system 120. As shown in the example of FIG. 2, network-based production services 100A-100N may be submitted for performance testing by the scalable production test system 120. Although two production services 100A and 100N are shown for purposes of illustration and example, it is contemplated that other quantities may be used.

To implement the performance tests transaction creator 130 may provide one or more methods to be invoked by transaction generation framework 140. In one embodiment, transaction creator 130 may provide one or more methods to be invoked for each type of transaction that the corresponding production service under test can process. The methods may be responsible for the low-level details of executing transactions and may be identified by runtime-discoverable information provided by transaction creator 130 to transaction generation framework 140.

In some embodiments, the test hosts 275A-275N and network-based production services 100A-100N may be implemented as virtual compute instances or physical compute instances. The virtual compute instances and/or physical compute instances may be offered to clients, provisioned, and maintained by a provider network that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented by the example computing device 3000 illustrated in FIG. 20.

Figure 3:
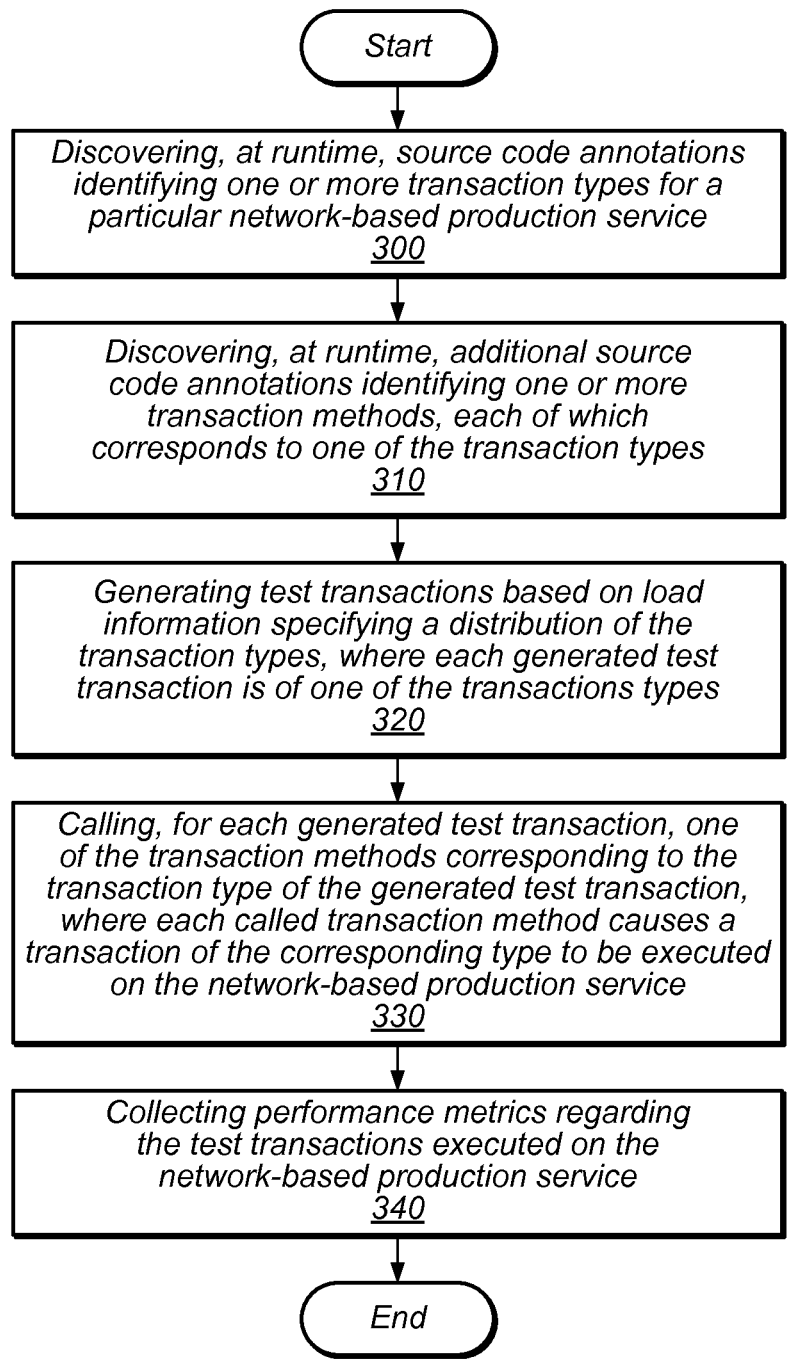
FIG. 3 is a flowchart illustrating one embodiment of a method for generating test transactions according to runtime-discoverable information.

FIG. 3 is a flowchart illustrating one embodiment of a method for generating test transactions according to runtime-discoverable information, according to one embodiment. As noted above, a scalable production test system 120 may include a transaction generation framework that identifies various types of runtime-discoverable information in a transaction creator module for use with testing a network-based production service. The method illustrated in FIG. 3 may include discovering, at runtime, source code annotations identifying one or more transaction types for a particular network-based production service, as shown in block 300. The method may also include discovering, at runtime, additional source code annotations identifying one or more transaction methods, each of which corresponds to one of the transaction types, as shown in block 310.

For example, transaction creator 130 may include annotations 200, which may include runtime-discoverable information that identifies one or more transaction types. For instance, in one embodiment, annotations 200 may include one or more Java annotations that identify transaction types and/or transaction methods.

In some embodiments, transaction creator 130 may include the various transaction methods within a single overall class, which may be identified in annotations 200. For instance, in one embodiment, transaction creator 130 may be configured to use the Java annotation "@LoadGenerator" to specify a product-specific transaction creator class which may contain individual transaction methods (as well as other variables/classes/methods).

The following snippet of Java shows one example of identifying a product-specific transaction creator class using an "@LoadGenerator" annotation:
@LoadGenerator
   public class MyProductXTransactionCreator { . . . }

Transaction creator 130 may also include annotations (or other runtime-discoverable information) that identifies transaction methods and transaction types. In some embodiments, transaction types may be specified separately from transaction methods, while in other embodiments, transaction types may be specific together with transaction methods.

For instance, in one embodiment, transaction creator 130 may use the "@LoadGeneratorTransaction" annotation to identify a transaction method that creates a test transaction of a particular transaction type. The "@LoadGeneratorTransaction" annotation may include a key=value pair that identifies the transaction type. For example, the following Java code example, uses the "@LoadGeneratorTransaction" to identifying three transaction types and a corresponding transaction method for each type:
@LoadGenerator
   public class MyProductXTransactionCreator {
   @LoadGeneratorTransaction(name="TransactionX")
      public void transactionX( ) { . . . }
   @LoadGeneratorTransaction(name="TransactionY")
      public void transactionY( ) { . . . }
   @LoadGeneratorTransaction(name="TransactionZ")
      public void transactionZ( ) { . . . }
   }

In the example above, the method transaction( ) creates a transaction of type "TransactionX", method transactionY( ) creates a transaction of type "TransactionY" and method transactionZ( ) creates a transaction of type "TransactionZ" as specified by the three "@LoadGeneratorTransaction" annotations.

Transaction generation framework 140 may be configured to discover these annotations at runtime, such as by using annotation parser 210. In one embodiment, transaction generation framework 140 may utilize the reflection capability of Java to search for and retrieve the annotation included in transaction creator 130. For instance, transaction generation framework 140 may use the Java reflection methods to search for all instances of the "@LoadGenerationTransaction" annotation within transaction creator 130 to discover transaction types and transaction methods. In other words, the method annotated with the name "TransactionZ" may be responsible for executing a single transaction of type "TransactionZ" to the network-based production service under test.

In some embodiments, transaction generation framework 140 may be unaware of (or agnostic to) the actual types of transactions specified by "TransactionX", "TransactionY", and "TransactionZ". Thus, test developers may choose to define transactions in whichever way works best for their particular testing scenario. Additionally, when using annotations, or other runtime-discoverable information, to identify which transaction methods transaction generation framework 140 should use, the developer may be able to include multiple transaction methods and switch between them via changing the annotations, according to some embodiments.

It should be noted that while described above regarding the use of Java annotations, in other embodiments, different types of runtime-discoverable information may be used to identify the transaction types and transaction methods.

The method illustrated in FIG. 3 may also include generating one or more test transactions based on load information specifying a distribution of transaction types, where each generated transaction is of one of the transaction types, as shown in block 320. In other words, transaction generation framework 140 may be configured to generate test transaction according to an overall distribution of transaction types. For example, test developers may specify a testing run with a distribution of {TransactionX=20%, TransactionZ=70%, TransactionY=10%}. In other words, of the total number of test transactions to be executed, 70% of them should be of type TransactionZ, while 20% should be of type TransactionX, and 10% should be of type TransactionY. Thus, transaction generation framework 140 may be configured to call, for each generated test transaction, one of the transaction methods corresponding to the transaction type of the generated test transaction, as illustrated in block 330 of FIG. 3.

Test developers (and/or test users) may specify a distribution of transaction types in any of various manners. For example, in one embodiment, the distribution information may be included in the same "@LoadGeneratorTransaction" that identifies the transaction type. For instance, an additional key-value pair may be included in the annotation that specifies the distribution information for that transaction type. The following example code illustrates one example embodiment of specifying distribution information in this way:

```
@LoadGenerator
public class MyProductXTransactionCreator {
    @LoadGeneratorTransaction (
        name="TransactionX"
        distribution="20")
    public void transactionX( ) { ... }
    @LoadGeneratorTransaction (
        name="TransactionY"
        distribution="10")
    public void transactionY( ) { ... }
    @LoadGeneratorTransaction (
        name="TransactionZ"
        distribution="70")
    public void transactionZ( ) { ... }
{
```

In order to generate test transactions according to the specified distribution of transaction types, transaction generation framework 140 may be configured to pick a random number between 0 and 100 for every transaction that it is to execute, according to one example embodiment. If the random number falls in the range 0 . . . 20 transaction generation framework 140 may call the method annotated with "TransactionX" as its name. Similarly if the random number falls in the range 20 . . . 90 transaction generation framework 140 may call "TransactionZ" and if the random number falls in the range 90 . . . 100 transaction generation framework 140 may call "TransactionY."

When using transaction distribution information transaction generation framework 140 may, in some embodiments, be configured to verify that the distribution information for transaction types represents percentages that total up to 100%. In other embodiments, however, transaction creator 130, or some other module, may be configured to verify distribution information.

In one embodiment, a user interface module may present a user interface allowing users to specifying distribution information for transaction types and may be responsible for verifying that the percentages of the individual transaction types add up to 100%. As noted previously, in some embodiments, users may be able to modify the distribution information during execution of the test system and in response, transaction generation framework 140 may detect and use the new/modified distribution information when generating subsequent test transactions.

When generating test transactions, transaction generation framework 140 may generate transactions randomly, but may also ensure that the overall distribution, or blend, of transaction types matches the specified distribution information. For example, transaction generation framework 140 may be configured to keep track of how many of each transaction type has been generated and if the actual distribution is getting too far from the specified distribution, transaction generation framework 140 may skew the randomly generated transaction types toward the specified distribution. For instance, transaction generation framework 140 may be configured to substitute one transaction type for one randomly chosen, according to some embodiments.

As described above, in some embodiments, the transaction method called by transaction generation framework 140 is responsible for executing the transaction (e.g., of the appropriate type) on the service under test. In order to execute the transaction, the transaction method may have to provide data to the service (e.g., a URL specifying a web page to be displayed, information necessary to select a produce on a retail web site, etc.). Thus, in some embodiments, the transaction method (or some other method of transaction creator 130 called by the transaction method may generate synthetic data (e.g., by selected random values within valid ranges for each API called on the service) or read an appropriate file containing serialized transaction (e.g., that were previously executed), parse the file to find the correct data, and construct the data to be sent to the service under test.

The method illustrated in FIG. 3 may also include transaction generation framework 140 collecting performance metrics regarding the test transaction executed on the network-based production service, as shown in block 340. The performance metrics may relate to aspects of processor usage, memory usage, disk or storage usage, network usage, and/or the usage of any other measurable resource, according to various embodiments. The performance metrics may relate to overall performance, latency or load information for the service under test. The performance metrics may be collected using any suitable techniques, e.g., the instrumentation of various software modules and/or the use of data gathered by an operating system.

The performance metrics may be used by various product-specific heuristics to determine whether the network-based production service passes or fails the transaction test(s). In one embodiment, the heuristics may be predetermined or preconfigured by the test developer or development team. The heuristics may also include default heuristics, where appropriate. In one embodiment, a user may specify the percentile metrics to consider for the heuristics (e.g., minimum, maximum, average, etc.). In one embodiment, a user may specify which transactions (or transaction types) to consider for the heuristics: e.g., all transactions averaged, any transaction type, or a specific transaction type.

In one embodiment, the heuristics may test the service's adherence to service level agreements (SLAs) for the service. For example, the load steps may specify an increase in the load (e.g., transactions per second) over time until latency or error rates violate the SLA. As another example, a specific test host or endpoint may be targeted, and the deployment may fail if the single host or endpoint cannot reach a target transaction frequency (e.g., 30 transactions per second). Similarly, a set of test hosts may be targeted, and the deployment may fail if the set of hosts (or endpoints) cannot collectively reach a target transaction frequency (e.g., 10 hosts and 300 transactions per second). As another example, an endpoint may be flooded with a high transaction frequency with no warm-up period to verify that the service can handle an unexpected flood of traffic (e.g., the heuristic may fail the build if a particular error rate is exceeded).

In one embodiment, the transaction generation framework 140 (or some other module of the scalable production test system 120) may perform aspects of the performance tests on the service(s) under test. The transaction generation framework 140 may collect suitable performance metrics 160 in conjunction with various transaction tests. For example, suitable metrics may include percentile client-side latencies (e.g., p50, p90, minimum, maximum, average, etc.), the number of transactions attempted, the number of transactions that failed, the rate at which transactions were being applied, etc. The performance metrics 160 may be stored in a repository using any suitable storage technology. In various embodiments, the repository may be internal or external to the scalable production test system 120.

In one embodiment, the performance metrics for different builds of the same software product may be collected and stored in the repository. Metrics for prior builds may be retrieved from the repository and compared to the metrics for a current build to determine whether the current build passes or fails the performance tests. Similarly, the performance metrics for different hosts or endpoints executing the same network-based production service may be collected and stored. The performance metrics for the various hosts/endpoints may then be compared to determine how well the overall service performed on the various hosts/endpoints.

As noted above, transaction generation framework 140 may be configured to allow testers/users to specify a distribution of transaction types. Additionally, in some embodiments, a user may be able to specify a specific transaction load in terms of a number of consecutive steps of load. For example, a single load step may specify:

Rate at which to apply the transactions (as transactions per second, OR number of concurrent connections),
Period for which the rate is to be applied, and
Distribution of transaction types.

Figure 4:
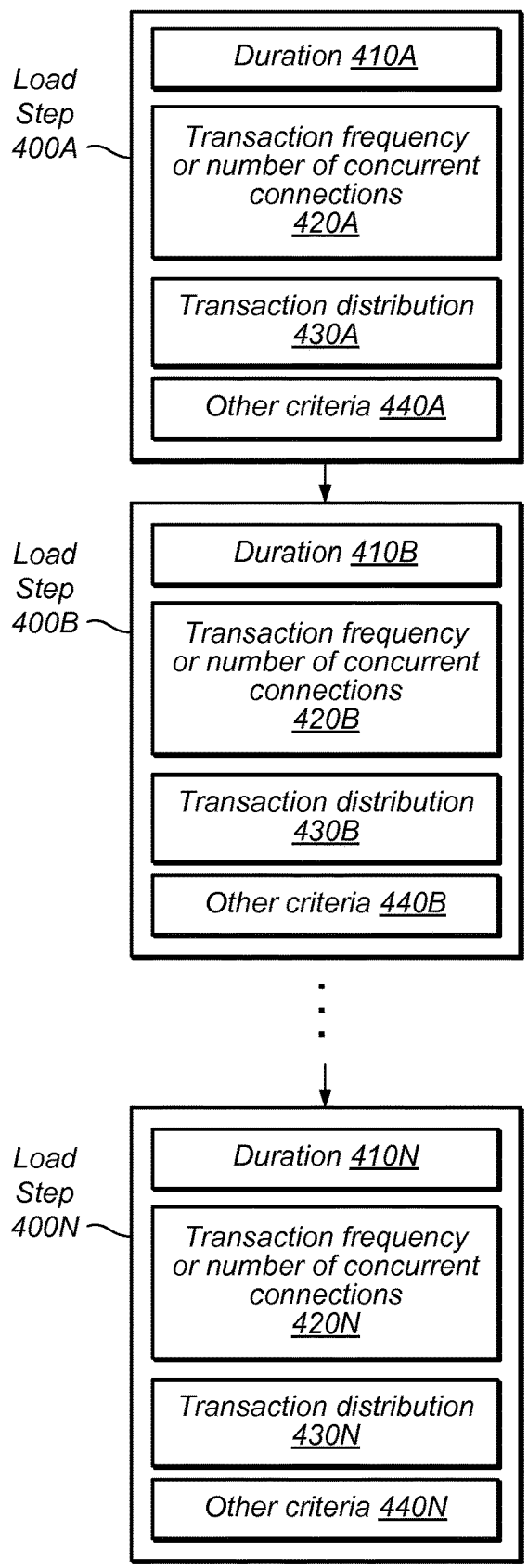
FIG. 4 is a block diagram illustrating a sequence of load steps for use when testing, according to one embodiment.

FIG. 4 illustrates an example of load steps usable for scalable load testing, according to one embodiment. A load test of a network-based production service may include multiple steps of load. The load steps may vary based on various characteristics, and the load steps may be ordered to vary the characteristics of the load test over time. For example, a first load step 400A may be placed before a second load step 400B in a load test. The load steps may be ordered in this manner until a final load step 400N. Although three load steps 400A, 400B, and 400N are shown for purposes of illustration and example, it is contemplated that any number and configuration of load steps may be used with the scalable production test system 120.

Each load step may specify a duration of time for which the load should be generated. For example, the first load step 400A may specify a duration 410A, the second load step 400B may specify a duration 410B, and the final load step 400N may specify a duration 410N. Any of the durations 410A, 410B, and 410N may differ from one another. Each load step may specify a prescribed load to be generated, such as a transaction frequency (e.g., a number expressed in transactions per second) or a number of concurrent connections. For example, the first load step 400A may specify a transaction frequency or number of concurrent connections 420A, the second load step 400B may specify a transaction frequency or number of concurrent connections 420B, and the final load step 400N may specify a transaction frequency or number of concurrent connections 420N. Any of the prescribed loads 420A, 420B, and 420N may differ from one another in quantity and/or type of load.

Each load step may also specify a distribution of transactions associated with the load to be generated. For example, the first load step 400A may specify a transaction distribution 430A, the second load step 400B may specify a transaction distribution 430B, and the final load step 400N may specify a transaction distribution 430N. Any of the transaction distributions 430A, 430B, and 430N may differ from one another.

The transaction distribution may indicate the different transaction types to be performed and the percentage of the total for each transaction type. For example, a transaction distribution may specify 30% write operations and 70% read operations. Additionally, a load step may include or reference one or more sets of program code to be executed to implement the job. The program code may be executable to generate a synthetic load based on the parameters of the test job description. In some embodiments, different transaction types in the transaction distribution may have their own sets of program code. For some transaction types, the program code may be executable to generate values within a predetermined range of input data.

Furthermore, each load step may specify other criteria, such as other criteria 440A, 440B and 440N, for transactions. For example, in one embodiment, a load step may specify a particular data size to be transferred as part of one (or more than one) transaction. Thus, in some embodiments, criteria 440A may represent a transactional data size (e.g., payload). In general, virtually any sort of criteria or metric that may be quantified, discrete, measured and/or used in a granular fashion (i.e., broken into steps), may be used as load step criteria for generating test transactions, according to various embodiments. In some embodiments, load step criteria may be product (e.g., testing system) specific, while in other embodiments, load step criteria may be more general. The specific load step criteria and/or characteristics shown in FIG. 4, such as duration, transaction frequency, number of concurrent connections, transaction distribution and/or other criteria, are merely some of the possible examples of criteria types that may be used for generating test transactions. Some embodiments may not include all the criteria shown in FIG. 4, while in other embodiments, additional or different criteria may be included.

The nature of a test job may vary based on the nature of the service to be load tested. For example, if the service under test is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc. Each test job may comprise data associated with a plurality of transactions or other operations that are processed by the service. The jobs may vary in the transaction frequency (e.g., transactions per second) they are expected to maintain or in the number of concurrent connections that are expected to establish. In some embodiments, the data associated with the test jobs may be generated by sampling actual production transactions and/or by generating synthetic transactions.

The load step information may be specified in any of various manners, according to different embodiments. For example, in one embodiment, load step information may be specified within runtime-discoverable information within transaction creator 130. For instance, Java annotations may be included within transaction creator 130 that include specific key-value pairs specifying particular load step information. In other embodiments, however, load step information may be specified in configuration file, specific load step information files, or in any of other suitable methods.

Initialization and Termination Methods

Figure 5:
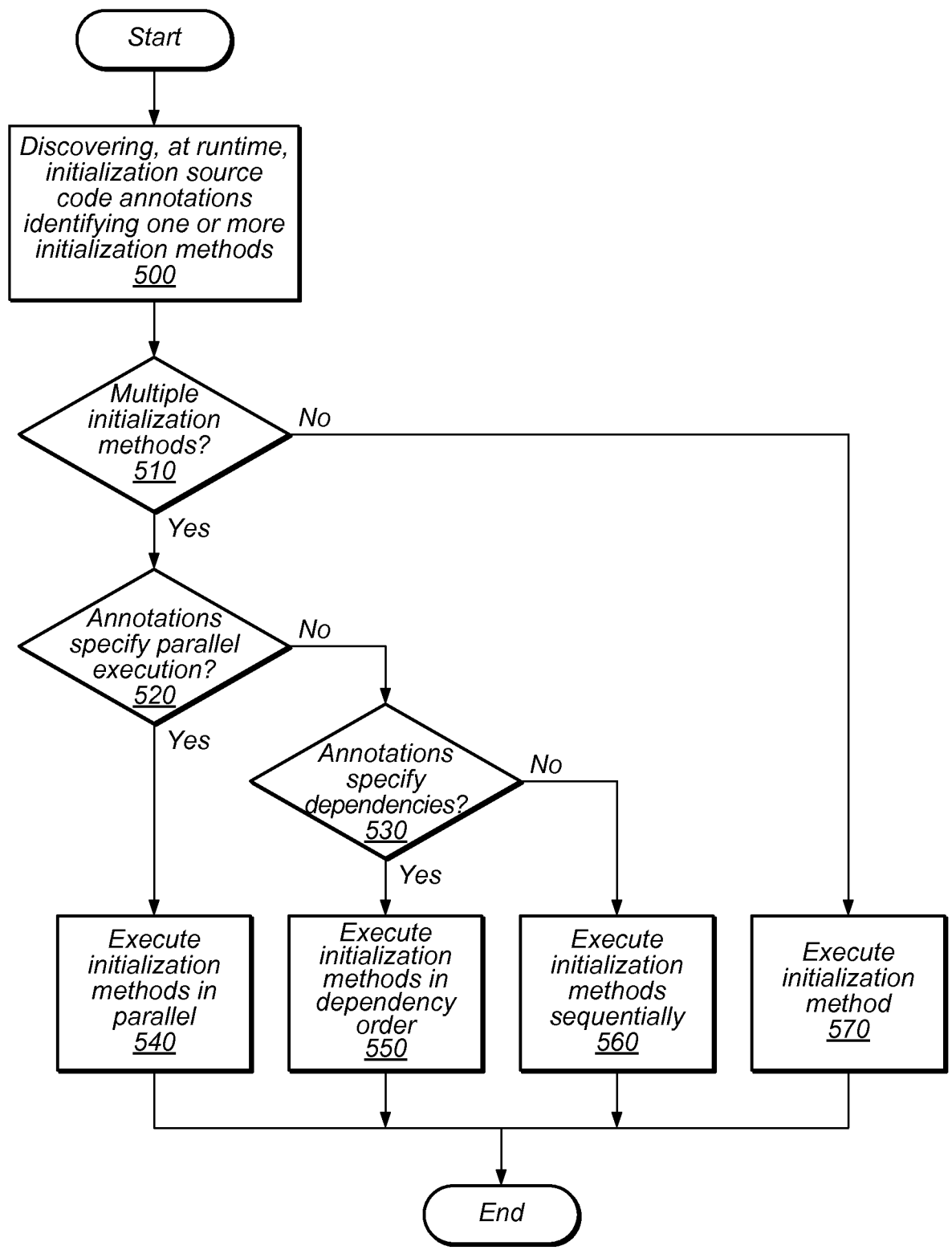
FIG. 5 is a flowchart illustrating one embodiment of a method for identifying and calling initialization methods using runtime-discoverable information, as described herein.

In addition to including transaction methods, transaction creator 130 may also include initialization methods to be called by transaction generation framework 140. In some embodiments, transaction creator 130 may specify methods as initialization and/or termination methods using runtime-discoverable information. FIG. 5 is a flowchart illustrating one embodiment of a method for identifying and calling initialization methods using runtime-discoverable information, as described herein. In one embodiment, transaction generation framework 140 may be configured to discover, at runtime, initialization source code annotations identifying one or more initialization methods, as shown in block 500.

For example, in one embodiment, Java annotations may be used to indicate an initialization method to be called by the transaction generation framework. The following example code illustrates, according to one embodiment, using an "@LoadGeneratorInitialize" annotation to indicate an initialization method in transaction creator 130:

@LoadGenerator
    public class MyProductXTransactionCreator {
    @LoadGeneratorInitialize
      public void initialize( ) { . . . }
    }

The initialization method may be used to perform any of various functions required by transaction creator 130 prior to executing test transactions. For example, the initialization function may be used to create resources that test transactions may require, such as input files, database connections, etc. or to instantiate a client connection to various services, such as the network-based production service under test.

In some embodiments, by identifying the initialization method using runtime-discoverable information (such as Java annotations) test developers may include an optional initialization method. For instance, testing situations that do not require any specific initialization may keep the source code of the method, but may not identify the method in the runtime-discoverable information as a specific initialization method to be called by transaction generation framework 140, according to some embodiments. This may be in contrast to testing frameworks requiring adherence to a specific interface in which test developers may have to always include a specific initialization method (that has a particular signature) whether they require one or not.

The initialization source code annotations (or other runtime-discoverable information) may identify more than one initialization method, as indicated by decision block 510. For example, the annotations may identify multiple methods as being part of an initialization routine. Again, this may be in contrast to testing frameworks that require adherence to a specific interface in which test developers may only be able to include a single initialization method. The following example code illustrates one embodiment of using Java annotations to specify multiple initialization methods:

@LoadGenerator
    public class MyProductXTransactionCreator {
    @LoadGeneratorInitialize
      public void initializeDatabase( ) { . . . }
    @LoadGeneratorInitialize
      public void prepareInputData( ) { . . . }
    }

Thus, transaction generation framework 140 may be configured to search (e.g., via Java's reflection methods in one embodiment) for all methods that are identified as initialization method (e.g., using "@LoadGeneratorInitialize") and may call them all when initializing a product-specific transaction creator module, such as transaction creator 130. In the above example, transaction generation framework 140 may identify and call both initializeDatabase( ) and prepareInputData( ).

If there is only one initialization method identified, as indicated by the negative output from block 510, then transaction generation framework 140 may be configured to call or execute the identified initialization method, as shown in block 570. Alternatively, if there are multiple initialization methods identified in the annotations (or other runtime-discoverable information), as indicated by the positive output from block 510, transaction generation framework 140 may be configured to determine whether or not the annotations specify any instructions regarding execution of the initialization methods. For instance, the source code annotations may specify whether multiple initialization methods should be executed sequentially or in parallel. For example, the source code annotations may include specific key-value pairs that indicate whether the initialization methods should be executed sequentially or in parallel (e.g., on different thread). According to some embodiments, executing initialization methods in parallel may speed up the overall initialization whereas sequential execution may be necessary due to resource inter-dependencies.

Thus, if the annotations specify parallel execution, as indicated by the positive output of block 520, transaction generation framework 140 may be configured to execute the initialization methods in parallel, as shown in block 540. If, as indicated by the negative output of block 520, transaction generation framework 140 may be configured to determine whether there are any dependencies specified by the source code annotations (or other runtime-discoverable information) for the multiple initialization methods.

In some embodiments, the initialize source code annotations (or other runtime-discoverable information) by specify dependencies among multiple initialization methods. For instance, the annotations may specify an order in which two or more initialization methods should be executed by specifying that one method is dependent on the other. In some embodiments, specific key-value pairs within Java annotations may be used to specify dependencies between initialization methods. The following example code illustrates one embodiment in which the key, "dependsOn" is used to specify dependencies between two initialization methods:

@LoadGenerator
    public class MyProductXTransactionCreator {
    @LoadGeneratorInitialize
      public void initializeDatabase( ) { . . . }
    @LoadGeneratorInitialize (
      dependsOn="initializeDatabase")
      public void prepareInputData( ) { . . . }
    }

Thus, transaction generation framework 140 may be configured to identify that the method prepareInputData( ) depends on the method initializeDatabase( ), according to the example above. Using the example above, transaction generation framework 140 may be configured to execute initializeDatabase( ) and only subsequently execute prepareInputData( ). Thus, if there the annotations (or other runtime-discoverable information) specify dependencies between two or more of the initialization methods, as indicated by the positive output from block 530, transaction generation framework 140 may be configured to execute the initialization methods in the dependency order specified, as shown in block 550. If, however, as indicated by the negative output from block 530, the annotations do not specify any dependencies, transaction generation framework 140 may be configured to execute the initialization methods sequentially (but not necessarily in any particular order) as shown in block 560.

In some embodiments, an absence of specific execution instructions may be interpreted by transaction generation framework 140 as default execution instructions. For example, in one embodiment, if transaction generation framework 140 does not discover specific execution instructions regarding multiple initialization methods, transaction generation framework 140 may be configured to execute the initialization methods sequentially. Other default execution instructions may be used in various embodiments.

Furthermore, in some embodiments the various types of execution instructions may be combined. For example, transaction creator 130 may include multiple initialization methods and may indicate that one is dependent upon another, but that others should be executed in parallel. In general any suitable combination of execution instructions may be specified in runtime-discoverable information (such as Java annotations).

Additionally, identifying multiple initialization methods using runtime-discoverable information (such as Java annotations) may allow test developers to include initialization methods that have different method signatures for different test runs. For example, in one embodiment, transaction generation framework 140 may be configured to recognize whether or not the identified initialization method takes a set of strings as input and to pass unrecognized input parameters (e.g., command line parameters to the transaction generation framework) as input to the identified initialization method. If the identified initialization method does not take an appropriate input parameter, transaction generation framework 140 may not pass any additional parameters as input. For instance, the following example source code illustrates one embodiment of using Java annotations to identify a particular initialization method that has a different signature:

```
@LoadGenerator
  public class MyProductXTransactionCreator {
    public void initialize( ) { . . . }
    @LoadGeneratorInitialize
    public void initialize(String[ ] args) { . . . }
  }
```

In the above example, transaction generation framework 140 may be configured to ignore the initialize( ) method and instead to call the initialize(String[ ] args) method, passing unrecognized parameters as input, according to one embodiment. By identifying the specific initialization method at runtime (e.g., by using runtime-discoverable information, such as Java annotations), test developers may include multiple initialization methods with different signatures and transaction generation framework 140 can determine at runtime which is the appropriate one to call, according to some embodiments.

Figure 6:
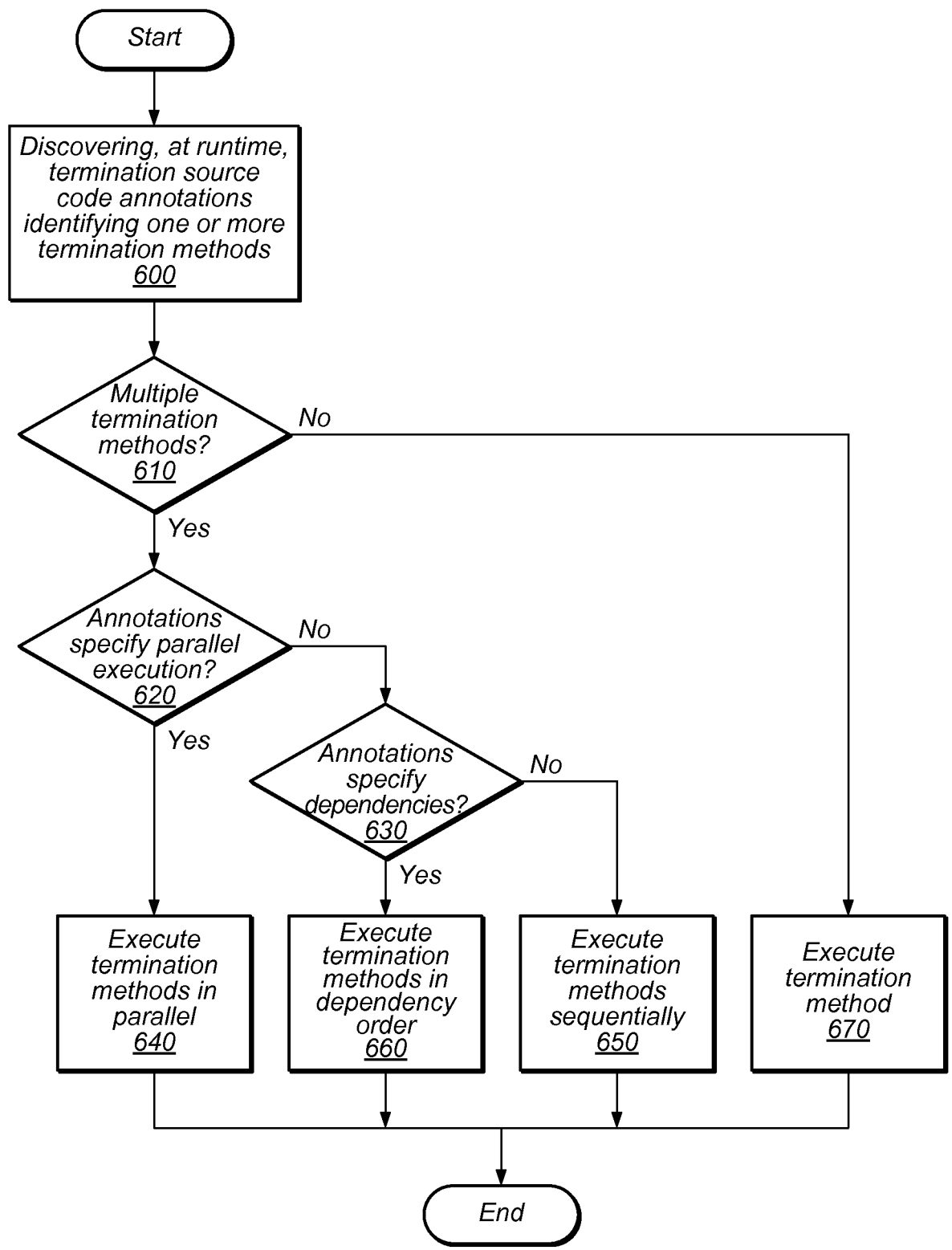
FIG. 6 is a flowchart illustrating one embodiment of a method for identifying and calling termination methods using runtime-discoverable information, as described herein.

In addition to including transaction methods, transaction creator 130 may also include termination methods to be called by transaction generation framework 140. In some embodiments, transaction creator 130 may specify methods as initialization and/or termination methods using runtime-discoverable information. FIG. 6 is a flowchart illustrating one embodiment of a method for identifying and calling termination methods using runtime-discoverable information, as described herein. In one embodiment, transaction generation framework 140 may be configured to discover, at runtime, termination source code annotations identifying one or more termination methods, as shown in block 600.

For example, in one embodiment, Java annotations may be used to indicate a termination method to be called by the transaction generation framework. The following example code illustrates, according to one embodiment, using an "@LoadGeneratorTerminate" annotation to indicate an initialization method in transaction creator 130:

```
@LoadGenerator
  public class MyProductXTransactionCreator {
    @LoadGeneratorInitialize
    public void initialize( ) { . . . }
    @LoadGeneratorTerminate
    public void terminate( ) { . . . }
  }
```

The terminate method may be used to perform any of various functions required by transaction creator 130 subsequent to executing test transactions. For example, the termination function may be used to terminate any open connections, such as network or database connections, clean up temporary resources that test transactions may have required, close input/output streams or files, etc. Additionally, in some embodiments, a terminate method may be used to perform custom heuristics to decide whether the network-based production serviced passed or failed the test run.

As with the initialization methods discussed above, identifying the termination method(s) using runtime-discoverable information (such as Java annotations) may allow test developers to include an optional termination method. For instance, testing situations that do not require any specific termination activities may retain the source code of the method, but may not identify the method in the runtime-discoverable information as a specific termination method to be called by transaction generation framework 140, according to some embodiments. This may be in contrast to testing frameworks requiring adherence to a specific interface in which test developers may have to always include a specific termination method (that has a particular signature) whether they require one or not.

The termination source code annotations (or other runtime-discoverable information) may identify more than one termination method, as indicated by decision block 610. For example, the annotations may identify multiple methods as being part of a termination routine. Again, this may be in contrast to testing frameworks that require adherence to a specific interface in which test developers may only be able to include a single termination method. The following example code illustrates one embodiment of using Java annotations to specify multiple termination methods:

```
@LoadGenerator
  public class MyProductXTransactionCreator {
    @LoadGeneratorTerminate
    public void closeDatabase( ) { . . . }
    @LoadGeneratorTerminate
    public void terminateInputData( ) { . . . }
  }
```

Thus, transaction generation framework 140 may be configured to search (e.g., via Java's reflection methods in one embodiment) for all methods that are identified as termination methods (e.g., using "@LoadGeneratorTerminate) and may call them all when terminating a product-specific transaction creator module, such as transaction creator 130. In the above example, transaction generation framework 140 may identify and call both closeDatabase( ) and terminateInputData( ).

If there is only one termination method identified, as indicated by the negative output from block 610, then transaction generation framework 140 may be configured to call or execute the identified termination method, as shown in block 670. Alternatively, if there are multiple termination methods identified in the annotations (or other runtime-discoverable information), as indicated by the positive output from block 610, transaction generation framework 140 may be configured to determine whether or not the annotations specify any instructions regarding execution of the termination methods. For instance, the source code annotations may specify whether multiple termination methods should be executed sequentially or in parallel. For example, the source code annotations may include specific key-value pairs that indicate whether the termination methods should be executed sequentially or in parallel (e.g., on different threads). According to some embodiments, executing termination methods in parallel may speed up the overall termination whereas sequential execution may be necessary due to resource inter-dependencies.

Thus, if the annotations specify parallel execution, as indicated by the positive output of block 620, transaction generation framework 140 may be configured to execute the termination methods in parallel, as shown in block 640. If, as indicated by the negative output of block 620, transaction generation framework 140 may be configured to determine whether there are any dependencies specified by the source code annotations (or other runtime-discoverable information) for the multiple termination methods.

In some embodiments, the termination source code annotations (or other runtime-discoverable information) may specify dependencies among multiple termination methods. For instance, the annotations may specify an order in which two or more termination methods should be executed by specifying that one method is dependent on the other. In some embodiments, specific key-value pairs within Java annotations may be used to specify dependencies between termination methods. The following example code illustrates one embodiment in which the key, "dependsOn" is used to specify dependencies between two termination methods:

@LoadGenerator
    public class MyProductXTransactionCreator {
        @LoadGeneratorTerminate
        public void terminateInputData( ) { . . . }
        @LoadGeneratorTerminate (
            dependsOn="terminateInputData")
        public void closeDatabase( ) { . . . }
    }

Thus, transaction generation framework 140 may be configured to identify that the method closeDatabase( ) depends on the method terminateInputData( ) according to the example above. Using the example above, transaction generation framework 140 may be configured to execute terminateInputData( ) and only subsequently execute closeDatabase( ). Thus, if annotations (or other runtime-discoverable information) specify dependencies between two or more of the termination methods, as indicated by the positive output from block 630, transaction generation framework 140 may be configured to execute the termination methods in the dependency order specified, as shown in block 650. If, however, as indicated by the negative output from block 630, the annotations do not specify any dependencies, transaction generation framework 140 may be configured to execute the termination methods sequentially (but not necessarily in any particular order) as shown in block 660.

In some embodiments, an absence of specific execution instructions may be interpreted by transaction generation framework 140 as default execution instructions. For example, in one embodiment, if transaction generation framework 140 does not discover specific execution instructions regarding multiple termination methods, transaction generation framework 140 may be configured to execute the termination methods sequentially. Other default execution instructions may be used in various embodiments.

Furthermore, in some embodiments the various types of execution instructions may be combined. For example, transaction creator 130 may include multiple termination methods and may indicate that one is dependent upon another, but that others should be executed in parallel. In general any suitable combination of execution instructions may be specified in runtime-discoverable information (such as Java annotations).

As noted above regarding FIG. 2, transaction generation framework 140 may be configured to compare testing and/or performance results for a service, such as network-based production service 100 that is running on multiple hosts or endpoints, such as test hosts 275A-275N. For instance, a service may be executing on multiple endpoints that have different hardware configurations and the service owners would like to compare how the service performs (e.g., in terms of throughput, latency, etc.) on the different hardware configurations. Additionally two different endpoints may be running the service, but with different settings (e.g., different cache sizes, caching algorithms, etc.) and it is desired to compare the performance of the service between different settings. Similarly, two different versions (e.g., a current and a new or proposed version) of the service may be executing on two different (possibly identical) endpoints and testers wish to validate the new version by comparing its performance to the current version.

Testing with Multiple Endpoints

Figure 7:
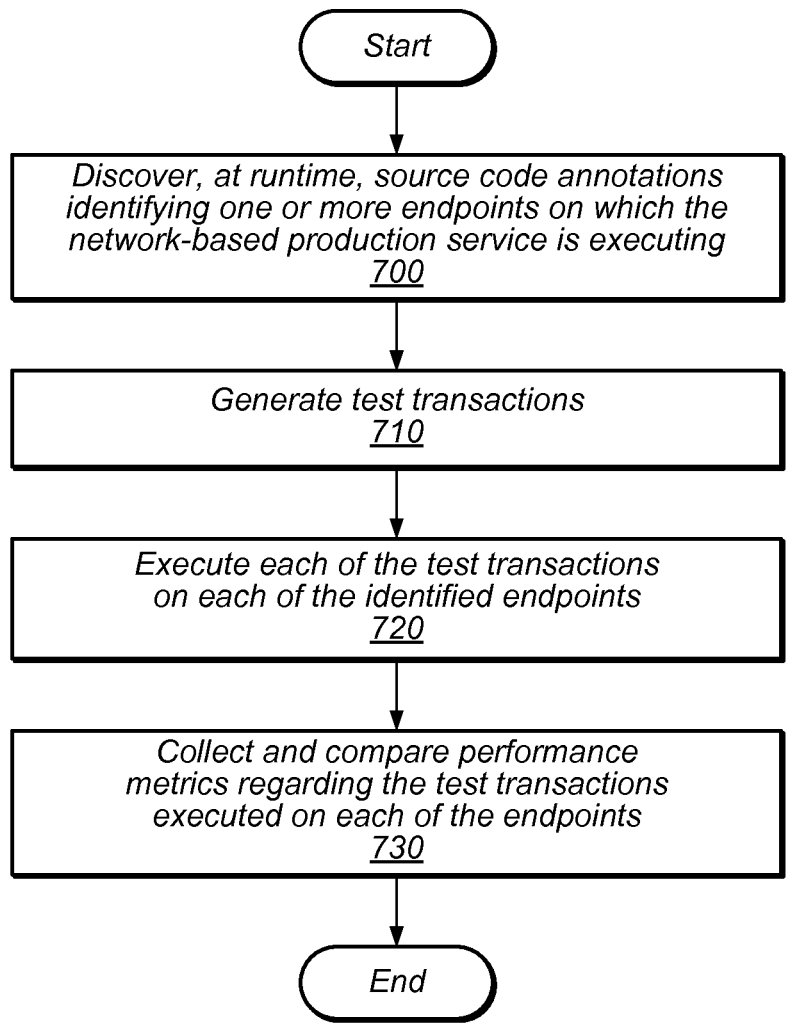
FIG. 7 is a flowchart illustrating one embodiment of a method for testing a network-based production service on multiple endpoints, as described herein.

FIG. 7 is a flowchart illustrating one embodiment of a method for testing a network-based production service on multiple endpoints, as described herein. As shown in block 700, transaction generation framework 140 may be configured to discover, at runtime, source code annotations identifying one or more endpoints on which the network-based production service is executing. It should be noted that while described herein using Java annotations, endpoints may be identified using other types of runtime-discoverable information, as described previously for transaction types, transaction method, initialization method, and termination methods, according to some embodiments.

In some embodiments, an initialization method of transaction creator 130 may be configured to initialize all the endpoints and may determine which endpoints should be active during this test run, such as based on user input (e.g., command line options). Additionally, if the initialization method initializes the endpoints, it may also return a set of endpoints which transaction generation framework 140 may use and/or administer. For example, in one embodiment, a specific programming object may be used to communicate endpoint information between transaction creator 130 and transaction generation framework 140. For instance, the example code below illustrated one embodiment that uses a Java class Endpoint to communicate endpoint information:

@LoadGeneratorInitialize( )
        public Set<Endpoint>initialize ( ) { . . . }

As shown in block 710, transaction generation framework 140 may generate test transaction. Transaction generation framework 140 may generation test transaction in any of various manners, as describe previously.

After generating the test transactions, transaction generation framework 140 may be configured to execute each of the transactions on each of the identified endpoints, as shown in block 720. When testing on multiple endpoints, each transaction method to be called by transaction generation framework 140 may be configured to take and endpoint as an input parameter and execute the requested transaction on the endpoint specified. For instance, the following example code illustrates one embodiment of a transaction method that takes an endpoint as a parameter:

> @LoadGeneratorTransaction(name="TransactionX")
> public void transactionX (Endpoint endpoint) { . . . }

Thus, transaction generation framework 140 may be responsible for executing every transaction simultaneously on every endpoint returned by the initialize method. For example, transaction generation framework 140 may execute multiple instances of the relevant transaction method in parallel (e.g., in multiple threads) passing a different endpoint to each instance. Transaction generation framework 140 may also collect and possibly compare performance metrics regarding the test transactions executed on each of the endpoints, as shown in block 730. Additionally, transaction generation framework 140 may be configured to generate charts that compare collected latency and throughput metrics, in some embodiments. Thus, is may be possible to verify that the systems under test were receiving the exact same amount of load at the exact same time, and if they have common dependencies, that they were using the dependency at the same time, according to one embodiment. In some embodiments, it may be possible to reduce variance between the systems under test and have a more meaningful comparison (e.g., with less noise).

In some embodiments, specifying and using multiple endpoints may allow the comparison of any number of endpoints simultaneously, not just two. Additionally, virtually any number of metrics may be enabled for comparison in various embodiments, such as the latency of call execution, CPU/Memory/Network performance on the hosts under test, etc.

As described above regarding FIG. 3, in some embodiments, the transaction method called by transaction generation framework 140 to execute a test transaction may be responsible for providing the data necessary to properly execute that transaction on the service under test. In order to provide the transaction data, the transaction method may, according to some embodiments, generate synthetic data (e.g., by selected random values within valid ranges for each API called on the service) or read an appropriate file containing serialized transaction (e.g., from production request data store 150), parse the file to find the correct data, and construct the data to be sent to the service under test.

Data Provider Methods

Figure 8:
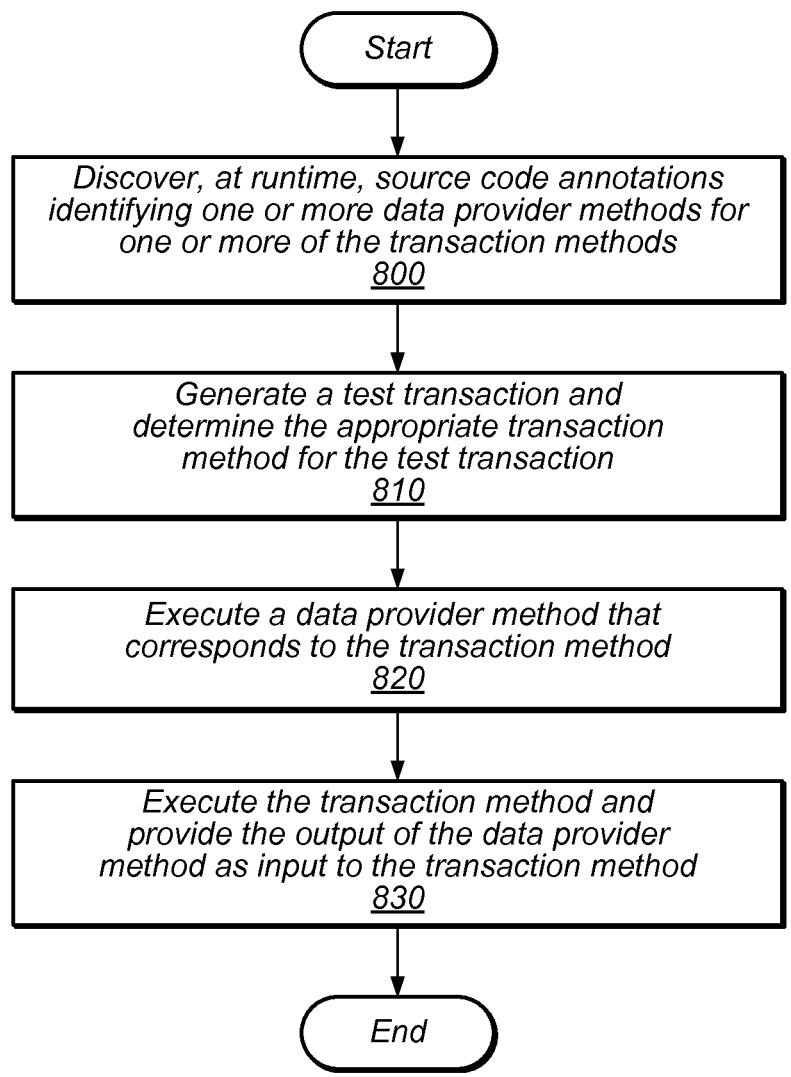
FIG. 8 is a flowchart illustrating one embodiment of a method for using data providers, as described herein.

In other embodiments, however, transaction creator 130 may include data provider methods that are configured to provide the data for test transactions, possibly in conjunction with transaction generation framework 140. For example, test developers may include data provider methods in transaction create 130 and may identify those data provider methods using runtime-discoverable information. FIG. 8 is a flowchart illustrating one embodiment of a method for using data providers, as described herein.

As shown in block 800, transaction generation framework 140 may be configured to discover, at runtime, source code annotations identifying one or more data provider methods for one or more of the transaction methods, according to one embodiment. For example, in some embodiments, specific source code annotations (or other runtime-discoverable information) may be used to identify data provider methods and associate them with transaction methods. For instance, the following example code illustrates one embodiment in which the Java annotation @LoadGeneratorDataProvider is used to identify a method as a data provider method and the key-value pair "dataProvider" is used to associate it with a transaction method:

> @LoadGenerator
> public class PriceCheckerTransactionCreator {
> @LoadGeneratorTransaction(
> name="CheckItemPrice"
> dataProvider="ItemProvider")
> public void checkItemPrice(Item input) { . . . }
> @LoadGeneratorDataProvider(
> name="ItemProvider")
> public Item provideItem( ) { . . . }
> }

In the above example, the key-value pair "dataProvider='ItemProvider'" that is part of the @LoadGeneratorTransaction annotation indicates that the method provideItem( ) is the data provider method for use with the checkItemPrice transaction method. As indicated in the example above, in some embodiments, the value data of the "dataProvider" key-value pair in the @LoadGeneratorTransction annotation may match the value data of the "name" key-value pair of the @LoadGeneratorDataProvider annotation, thus associating the provideItem( ) data provider method with the checkItemPrice( ) transaction method.

After identifying the data provider methods and associating them with transaction methods, transaction generation framework 140 may be configured to generate and execute test transactions. As shown in block 810, transaction generation framework 140 may generate a test transaction and determine the appropriate transaction method to call for executing the generated test transaction. Thus, after generating a test transaction, as described previously, transaction generation framework 140 may determine, based on the identified transaction types and their associated transaction methods, an appropriate transaction method of transaction creator 130 to call (i.e., in order to execute the test transaction). If transaction generation framework 140 has identified a data provider method associated with the transaction method, transaction generation framework 140 may first execute the data provider method that corresponds to the transaction method, as shown in block 820 and then may execute the transaction method and provide the output of the data provider method as input to the transaction method, as shown in block 830.

In the code example above, the method provideItem( ) may be automatically called by transaction generation framework 140 before the transaction method checkItemPrice( ) is called. Additionally, the output from provideItem( ) may be used as input to checkItemPrice( ) Utilizing separate data provider methods may allow for the separation of data preparation (e.g., as done in provideItem( ) from the actual transaction execution (e.g., as done in checkItemPrice( ). Furthermore, this separation may allow transaction generation framework 140 to keep more accurate latency metrics (as well as more accurate reliability metrics) for each transaction type, according to some embodiments.

While described above as including one data provider method for each transaction method, please note that there may not be a 1:1 relationship between data providers and transaction types (and therefore transaction methods). In some embodiments, one data provider may provide data for more than one transaction method, or there may be more than one data provider associated with a single transaction method, or there may be multiple data provider methods associated with multiple transaction methods, as will be discussed in more detail below.

As noted above, in some embodiments, a single data provider method may provide data for more than one transaction types (and hence for more than one transaction method). For example, two different transaction types may utilize the same type of data. For instance, in one embodiment, a test transaction to add a retail item to an online user's wish list may use the same data as a test transaction to add the retail item to the user's shopping cart. As another example, a data provider method may return data regarding coffee brands, and the data may be used in a test transaction that sells coffee or a test transaction that ships it.

The following example code illustrates one embodiment of a single data provider method providing data for multiple transaction type or transaction methods:

```
public class MyProductXTransactionCreator {
    @LoadGeneratorTransaction(
        name="SellCoffee"
        dataProvider="CoffeeDataProvider")
    public void sellCoffee(Coffee input) { ... }
        @LoadGeneratorTransaction(
            name="ShipCoffee"
            dataProvider="CoffeeDataProvider")
        public void shipCoffee(Coffee input) { ... }
        @LoadGeneratorDataProvider(
            name="CoffeeDataProvider")
        public Coffee coffeeDataProvider( ) { ... }
}
```

As noted above, multiple data provides may be used to provide data for a single transaction method (and transaction type). For example, in one example embodiment, a test transaction may sell a digital item and may be able to sell either songs or movies. Thus, two different data provider methods, one that returns a song and another that returns a movie may both be used to provide data to the transaction method. As with overall test transaction distribution, described previously, the test developer may be able to specify, using runtime-discoverable information, the distribution (e.g., the ratio) between the various data provider methods that should be used. For instance, in one embodiment, source code annotations may be used to indicate that the data provider method returning songs should be used 80% of the time, while the data provider method return movies should be used 20% of the time. Thus, transaction generation framework 140 may be configured to discover the distribution ratios for data provider methods and load balance between the methods to achieve the overall desired distribution when executing test transactions.

The following example source code illustrates one embodiment in which multiple data provider methods are used to provide data for a single transaction method while specifying the distribution between the data provider methods:

```
public class MyProductXTransactionCreator {
    @LoadGeneratorTransaction(
        name = "SellDigitalItem"
        dataProvider = {
            "SongDataProvider", 0.80,
            "MovieDataProvider", 0.20 })
    public void sellDigitalItem( DigitalItem input ) { ... }
    @LoadGeneratorDataProvider(
        name = "SongDataProvider" )
    public DigitalSong songDataProvider( ){ ... }
    // DigitalSong extends DigitalItem
    @LoadGeneratorDataProvider(
        name = "MovieDataProvider" )
    public DigitalMovie movieDataProvider( ){ ... }
    // DigitalMovie extends DigitalItem
}
```

In the above example, both DigitalSong and DigitalMovie extend DigitalItem, so they can be casted properly when provided to the sellDigitalItem method as input (as sellDigitalItem takes a DigitalItem object as input).

Thus, by separating the data generation (that is performed in a data provider method) from the test transaction execution (that is performed in a transaction method), reliability and latency metrics for transaction execution may be prevented from being skewed by performance issues related to data generation.

In some embodiments, the data provider method is responsible for either generating the data (e.g., synthetic data) or for loading the data from a data store (e.g., from production request data store 150). In other embodiments, however, transaction generation framework 140 may be configured to provide raw data to the data provider method which, in turn, may generate transaction-ready data from the raw data. For example, in one embodiment, transaction generation framework 140 may be configured to read a data file line by line and provide a line of raw data to a data provider method each time that data provider method is called.

When transaction generation framework 140 is responsible for loading the test data from a specified input location, transaction generation framework 140 may be able to provide better control over how the data is loaded/read, such as based on the knowledge of how many transactions need to be executed and at what rate. For example, if transaction generation framework 140 knows that 100 transactions a second need to be executes (e.g., based on the specified load steps) transaction generation framework make load more data at a time (e.g., since it knows it will be needed), thereby possibly increasing the overall testing efficiency.

Thus, in some embodiments, a data provider method may take an input parameter allowing transaction generation framework 140 to pass test data to the data provider method. For instance, the following example code illustrates one embodiment of a data provider method that takes a Java String as input:

```
public T transactionXDataProvider(String line){ ... }
```

In order for transaction generation framework 140 to provide raw data to data provider methods, test developers may specify a data location, such as production request data store 150, in runtime-discoverable information within test creator 130. For example, production request data store 150 may reside in any of various locations (and may be specified using any of various ways), such as on a local storage drive (e.g., file://folder1/folder2/file), a network drive, a cloud storage system (clouddrive://bucket/folder/file), or may be provided dynamically via data transfer methods, such as a via an online multi-user, network-based cloud queue, according to various embodiments. In some embodiments the location of an input file may be specified as a uniform resource identifier (URI) to the input file (whether to a local or remote file location). In general the location of input files may be specified using any suitable method, according to different embodiments.

In some embodiments, Java annotations may be used to specify the location and type of a raw data file to be used with a data provider method. For example, the following code example illustrates one embodiment in which a "location" key-value pair included in the @LoadGenerator- DataProvider annotation is used to specify the location of a raw data file and a "inputFileType" key-value pair may be used to specify a file type (or format type) for use with the associated data provider method:

```
@LoadGenerator
public class MyProductXTransactionCreator
{
    @LoadGeneratorDataProvider(
       name="TransactionXDataProvider",
       inputFileType=FileType.TEXT;
       location="clouddrive://myBucket/myFolder/my-
          File")
    public T transactionXDataProvider(String line)
    {
    }
}
```

In the above example, transaction generation framework 140 may discover (such as by using the Java reflection methods) the location of the input file to use with the transactionXDataProvider method and may read the file and provide the raw data from the file to the data provider method. For example, the input file may represent a text file in which each line may include the data necessary for a single transaction. In such an example, transaction generation framework 140 may provide the transactionXDataProvider method a single line from the input file each time the data provider method is called.

In some embodiment, test developers may be able to specify the particular formatting details needed for transaction generation framework 140 to parse the input file for a data provider method. In the example above, each data record was contained on a single line in a text file and thus the newline character may be considered the record separator. In other embodiments, however, input files may be formatted differently and the specific record separator characters may be specified using runtime-discoverable information, such as Java annotations. For example, a specific key-value pair included in the @LoadGeneratorDataProvider annotation may specify a particular record separator for a specified input file.

The following code example illustrates one embodiment in which a "recordSplitRegex" key-value pair is included in the @LoadGeneratorDataProvider annotation to specify the record separator for the specified input file:

```
@LoadGeneratorDataProvider (
    name="TransactionXDataProvider",
    location="s3n://myBucket/myFolder/myFile"
    recordSplitRegex="EndOfRecord\n\
        n================")
public T transactionXDataProvider(String line){ . . . }
```

Similarly, a record containing data for a test transaction may contain several fields, such as in a comma delimited, (e.g., a comma separated values, or CSV, file format) or tab-delimited file. In other embodiments, input data may be formatted in a spreadsheet format or using extensible markup language (XML). Transaction generation framework 140 may be configured to discover and recognize information that indicates how the input data is formatted. For example, specific key-value pairs may be utilized to indicate comma-delimited formats, tab-delimited format, XML format and/or specific spreadsheet formats.

According to some embodiments, test developers may also specify a field splitting regular expression to be used to break a record into individual fields. In some embodiments, a record may be considered a set of fields that define a transaction (e.g., a transaction performed for, on or to a service) and a transaction may be serialized to a set of fields. Transaction generation framework 140 may be configured to parse a record into individual fields and provide them to a data provider method. For instance, transaction generation framework 140 may provide an array of Strings as input to a data provider method and each string may contain the data from one field within the data record. For instance, the following example code illustrates one embodiment in which the data provider method accepts an array of string as input and a field separator is specified in a "fieldSplitRegEx" key-value pair within the @LoadGeneratorDataProvider annotation:

```
@LoadGeneratorDataProvider(
    name="TransactionXDataProvider",
    location="clouddrive://myBucket/myFolder/myFile"
    fieldSplitRegEx="\t")
public T transactionXDataProvider(String[ ] fields)
    { . . . }
```

In the above example, the "fieldSplitRegEx" key-value pair specifies that the record uses a tab-separate format. In general, the runtime-discoverable information may specify a field separator value, a record separator value, or both for a data source, according to different embodiments. Additionally, in some embodiments, default record and/or field separator values may be used for specific data source types. For example, if the runtime-discoverable information indicates that a data source is a CSV file, a newline character (i.e., "\n") may be used as a default record separator and a comma (i.e., ",") may be used a default field separator. Similarly, if a tab-delimited file type is specified for a data source, a tab character (i.e., "\t") may be used as a default field separator. In yet other embodiments, some data sources may only use record separators without using any specific field separator. Thus, in one example, the runtime-discoverable information may specify a particular record separator without specifying any particular field separator for a data source.

While the examples above specify a single, specific, file to be used as the raw input for generating transaction data, in other embodiments, wildcards or other mechanisms may be used to specify multiple files as input files for use with data provider methods. For example, a string specifying a location using a wildcards (e.g., file://folder1/folder2/*TransactionX*, clouddrive://bucket/folder/*file*) may be specified in some embodiments. When using wildcards, transaction generation framework 140 may be configured to iterate through the location reading each file that matches the specified wildcard string and use the data from each of those file as input when calling a data provider method. Similarly, an entire folder (rather than a file) may be specified a the data location and transaction generation framework 140 may iterate through all the files in that folder and use the data within each file as input when calling the data provider method.

Additionally, the runtime-discoverable data (such as the Java annotations) may specify whether or not the location specified should be considered recursively or not. For example, when a location (whether using wildcards or a folder location) is specified to be considered recursive, transaction generation framework 140 may be configured to iterate through all files in the particular folder specified as well as all files in every folder within the specified folder, according to some embodiments.

Thus, the following list provides some example locations that may be specified according to various embodiments:
a file on a local disk: file://folder1/folder2/file
local disk with wildcard: file://folder1/folder2/*TransactionX*
local disk with entire folder: file://folder1/folder2
file on cloud storage: clouddrive://bucket/folder/file
cloud storage with entire folder: clouddrive://bucket/folder1/*file* cloud storage with folder: clouddrive://bucket/folder1/folder2

In some embodiments, a n online multi-user network-based cloud queue may be used to provide transaction data for test transactions. For example, in one embodiments, an extremely large amount of data files containing previously captured (e.g., serialized) transactions may be used as test data (e.g., replayed) by placing all the files into a single cloud queue (such as Amazon's SQS™). In some embodiments, the files may be placed into the queue using one file per queue message. Thus, rather than specifying a static resource, such a file on a local or cloud drive, the location of the input data may be specified as the name of a cloud queue to which transaction generation framework 140 may connect in order to provide test data to a data provider method.

In some embodiments, an online multi-user network-based cloud queue may be used for large-scale testing in which multiple testing platforms or load generation hosts are used to provide load (e.g., test transactions) to the system under test. For example, it may be desired to test how well a service may handle receiving transactions from a large number of individual connections. In some embodiments, each testing platform may include an instance of scalable production test system 120 including transaction generation framework 140 as well transaction creator 200.

Thus, in some embodiments, a test developer may be able to design the testing platform as if everything is on one machine, while relying on transaction generation framework 140 to load multiple instances of the testing platform on multiple machines and provide the cloud queue location to teach instance for use when loading test data.

In order to provide test data as input to a data provider methods when the data location is specified as a cloud queue, transaction generation framework 140 may be configured to dequeue a message from the specified cloud queue, read the actual data from the queue message, call the relevant data provider method (which will send the data to the service under test to execute the test transaction). Transaction generation framework 140 may be configured to continue dequeing messages from the cloud queue until the queue is empty, signaling an end to the test run.

In other embodiments however, a data provider method may be configured to take a cloud queue as an input parameter and retrieve the individual data from the queue itself rather than relying on transaction generation framework 140 to dequeue messages from the cloud queue.

In some embodiments, transaction generation framework 140 may be configured to load and cache some, or all, of the test data from an input file prior to executing test transactions. For example, whether or not an input file should be cached may be specified in runtime-discoverable information (such as with Java annotations) by test developers in some embodiments. Caching of test data may enable fast iteration through test data and thereby possibly allowing a higher transaction rate (since data will not have to be read from the file between test transactions), according to some embodiments. However, in some embodiments, caching of test data may delay execution of the first test transaction and may also increase memory usage by transaction generation framework 140.

Additionally, in some embodiments, test developers may be able to specify whether transaction generation framework 140 should iterate through test data sequentially or randomly. For instance, runtime-discoverable data (such as key-vale pairs in Java annotations) may include information indicating whether a particular input file should be accessed sequentially or randomly. For example, if the order in which the individual test transactions should be executed (as represented by the test data) is important, sequential access may be specified in the runtime-discoverable information. Alternatively, if the order in which the transactions are executed does not matter, random access may be specified. When accessing a data file randomly, transaction generation framework 140 may include a randomly chosen record from the specified data file location every time a data provider method is called. When accessing a data file sequentially, transaction generation framework 140 may be configured to synchronize the sequential access between multiple threads executing transactions, since sequential access may introduce thread contention and slow down the execution of transactions.

In some embodiments, various features may be specified in combination for a data source. For example a data file may be specified to be both cached and randomly accessed. In response, transaction generation framework 140 may load and cache the entire file to memory and subsequently access the cached file randomly for each call to the data provider method. In some embodiments, combining caching and random access may prevent the need to synchronize access across multiple threads.

In some embodiments, transaction generation framework 140 may be configured to access, read and/or load test data from a specified input location in the background while test transactions are executing, such as to enable a higher rate of transaction execution since a test transaction may not be delayed while loading the next test data. For instance, when multiple input files are specified, transaction generation framework 140 may be configured to load data from a second file while using data from a first file to execute test transactions.

Similarly, transaction generation framework 140 may be configured to call a data provider method multiple times prior to calling the associated transaction method, such as to queue up test data for multiple test transactions so that no delay may be required between executing the test transactions (thereby possibly providing a higher transaction rate). In some embodiments, test developers may be able to specify in runtime-discoverable information (such as Java annotations) whether or not transaction generation framework 140 should utilize background loading of test data and/or calling a data provider method multiple times without calling an associated transaction method.

Additionally, in some embodiments, test developers may be able to specify whether transaction generation framework 140 should loop and reiterate through test data after completing a first iteration through the data. For instance, runtime-discoverable data (such as key-vale pairs in Java annotations) may include information indicating whether looping should be used with a particular input file. Thus, the same test data may be used over and over again in repetition until the full test run is completed.

In yet other embodiments, transaction generation framework 140 may support various retry mechanisms for use when a call to a data provider method fails. For instance, individual retry mechanisms may be specified in the runtime-discoverable information, such as by using specific key-value pairs in Java annotations, according to some embodiments. For example, in some embodiments, test developers may specify whether transaction generation framework 140 should retry by calling the data provider method with the same data again (e.g., for a predetermined number of times) or with new test data.

In various embodiments, various features and/or mechanisms described above may be specified alone or in combination for use when data provider method. For instance, a test developer may specify a particular data input file that should be cached, accessed sequentially, looped and that failure should be retried using new data, according to one embodiment. In general any combination of the features/mechanisms described herein may be specified in runtime-discoverable information regarding data provider methods and data input sources, according to various embodiments. For example, in some embodiments, an "InputFileParsingLogic" key-value pair may be included in a @LoadGeneratorDataProvider annotation to specify the one or more features regarding the data source. The following code example illustrates one embodiment in which a "InputFileParsingLogic" key-value pair is included in the @LoadGeneratorDataProvider annotation to indicate a random access feature (e.g., that the contents of the data file should be used in a random order) and a caching feature (e.g., that the contents of the data should be cached) for the specified input file:

```
@ LoadGeneratorDataProvider(
    name="dataProviderName",
    inputFileType=FileType.TEXT,
    inputFileParsingLogic=InputFileParsingLogic.
        RANDOM_ACCESS, & InputFileParsingLogic.
        CACHING,
    location="file:///Absolute/Path/To/Input/File")
public T transactionXDataProvider (String line) { . . . }
```

Furthermore, while described herein mainly in terms of using Java annotations as runtime-discoverable information, in some embodiments, other forms of runtime-discoverable information may also be used with the features/mechanisms described herein. For instance, runtime-readable configuration files or programmatic interfaces may be used in some embodiments to specify data provider methods and associate them with transaction methods. Additionally, such configuration files may be also be used to specify data input sources, such as local files, cloud files or cloud queues, to provide test data to use as input when calling data provider methods.

While in general any form of runtime-discoverable information may be used with the systems and methods described herein, in some embodiments, Java annotations may provide specific benefits. For example, having the source code and the runtime-discoverable information in a single place (e.g., the program source files) may prevent mistakes since there are fewer files to modify for a particular testing configuration. Additionally Java annotation may provide additional type-safety as compared to other forms of runtime-discoverable information because some syntax (e.g., names) of the annotations may be check at compile time.

Transaction Dependencies

As discussed above, test developers may specify dependencies among multiple initialization and/or termination methods in transaction creator 130. Similarly, according to some embodiments, test developers may specify dependencies among various transaction types. As an example, four transactions types related to drinking coffee (DrinkCoffee, BrewCoffee, GrindCoffee and BuyCoffeeBeans) may involve transaction dependencies. In this example, in order to execute the DrinkCoffee transaction, the BrewCoffee transaction must have previously been executed. Similarly, the BuyCoffeeBeans and GrindCoffee transactions must both have been executed prior to executing BrewCoffee. Thus, in this simple example, the DrinkCoffee transaction depends on the BrewCoffee transaction, which depends on the GrindCoffee transaction, which depends on the BuyCoffeeBeans transaction. Thus, transaction dependencies may be views as defining a workflow. For the above example, the following workflow is defined:

BuyCoffeeBeans→GrindCoffee→BrewCoffee→DrinkCoffee

Additionally, dependency between two transaction types may also imply that the output from one transaction type is the input for the next. Continuing the above example related to coffee, the output of the BuyCoffeeBeans transaction (e.g., some coffee beans) may be input to the GrindCoffee transaction. Similarly, the output of the GrindCoffee transaction (e.g., ground coffee) may be the input to the BrewCoffee transaction, whose output (e.g., brewed coffee) may the input to the DrinkCoffee transaction.

Another example of transaction dependencies, according to one embodiment, may relate to purchasing an item through an online retailer. In this example, a ShipItem transaction type may depend on a CheckOut transaction type, which may depend on an AddItemToCart transaction type, which may in turn depend on a ViewItem transaction type. Please note that these are merely example transaction types and that other transaction types may be used in other embodiments.

As with initialization and termination methods, a test developer may utilize runtime-discoverable information to communicate transaction dependencies to transaction generation framework 140. For example, in one embodiment utilizing Java annotations as runtime-discoverable information, a specific key-value pair of an annotation may be used to indicate transaction dependencies. In fact, in some embodiments, the same "dependsOn" described above regarding initialization and termination method dependencies may also be used to indicate transaction dependencies. The following example code illustrates on embodiment of using Java annotations to specify transaction dependencies using the coffee example discussed above:

```
@LoadGenerator
public class CoffeeTransactionCreator {
    @LoadGeneratorTransaction (
        name="BuyCoffeeBeans")
    public CoffeeBeans buyCoffeeBeans ( ) { . . . }
    @LoadGeneratorTransaction (
        name="GrindCoffeeBeans"
        dependsOn="BuyCoffeeBeans")
    public GroundCoffee grindCoffeeBeans (CoffeeBeans coffeeBeans) {
    @LoadGeneratorTransaction (
        name="BrewCoffee"
        dependsOn="GrindCoffeeBeans")
    public Coffee brewCoffee(GroundCoffee coffee) { . . . }
    @LoadGeneratorTransaction(
        name="DrinkCoffee"
        dependsOn="BrewCoffee")
    public void drinkCoffee(Coffee coffee) { . . . }
}
```

Thus, in the above example, the "dependsOn" key-value pair of the @LoadGeneratorTransaction may be used to specify dependencies between transaction types. When transaction generation framework 140 discovers dependencies between transaction types in the runtime-discoverable information transaction generation framework 140 may be configured to build one or more dependency trees (or other suitable data structures) in order to ensure that transaction are executed in the order specified by the dependencies.

Since, as noted above, the output of one transaction may be the input for another, dependent, transaction. For example, if TransactionY depends on TransactionX, the output of TransactionX may be used as the input for TransactionY, according to one example. Thus, transaction generation framework 140 may need to store the output of one transaction until it can be used as the input for another transaction. Thus, in some embodiments, transaction generation framework 140 may be configured to maintain one or more dependency data queues for storing the output of transactions.

Figure 9:
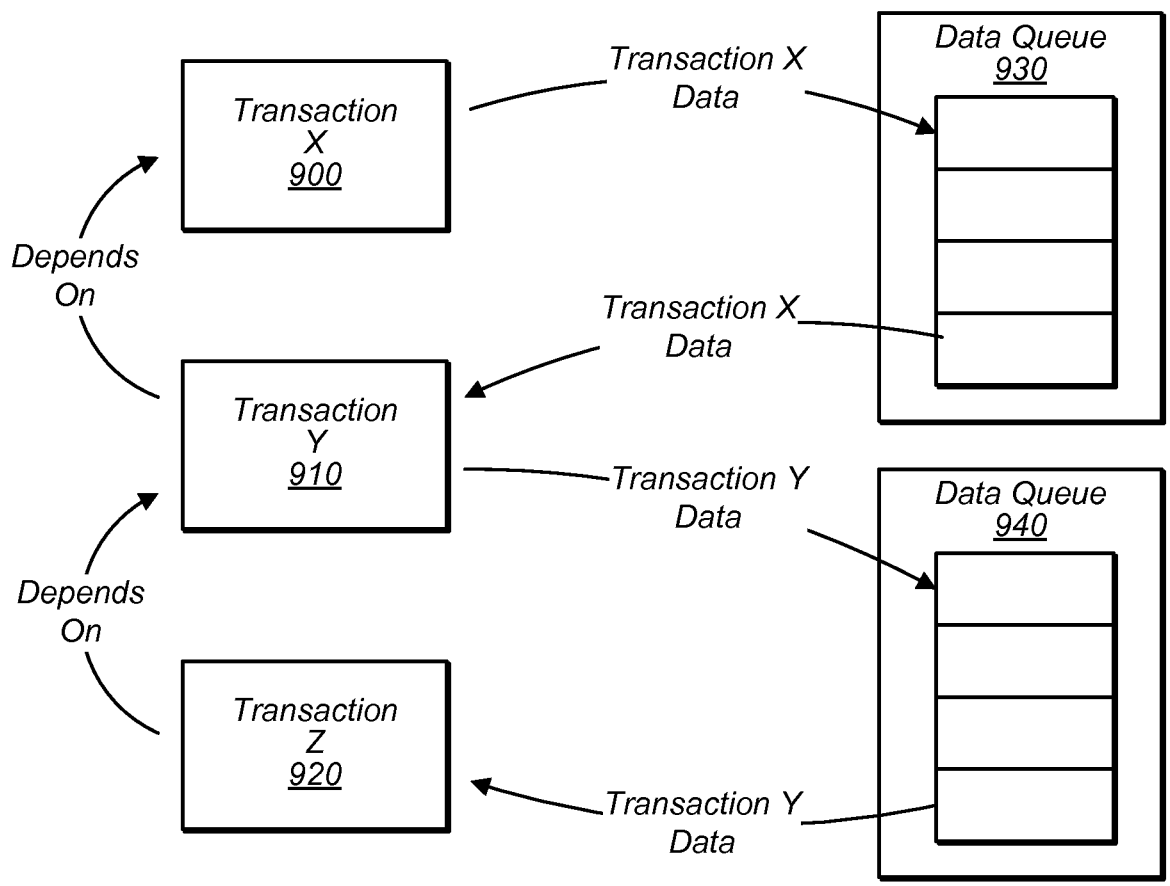
FIG. 9 is a logical block diagram illustrating the relationship between transaction dependencies and dependency data queues, according to one embodiment.

FIG. 9 is a logical block diagram illustrating the relationship between transaction dependencies and dependency data queues, according to one embodiment. As illustrated in FIG. 9, Transaction Z 920 may depend on Transaction Y 910, which may depend on Transaction X 900. Thus, the output of Transaction X 900 may need to be stored until Transaction Y 910 is executed. Similarly, the output of Transaction Y 910 may need to be stored until Transaction Z 920 is executed. Thus, transaction generation framework 140 may maintain dependency data queues 930 and 940 to store the output from Transaction X 900 and Transaction Y 910, respectively.

Since, as described previously, transaction framework 140 may randomly decide which transaction types to execute, one transaction type (such as Transaction X 900) may be executed multiple times prior to another, dependent, transaction (such as Transaction Y 910) being executed. Therefore, in some embodiments, the output from multiple executions of a single transaction, such as Transaction X 900, may be stored in a dependency data queue, such as data queue 930, for use when a dependent transaction, such as Transaction Y 910, is executed. In order to maintain the output from multiple transactions from which multiple other transactions depend, transaction generation framework 140 may be configured to create and maintain a dependency data queue for each transaction dependency specified by the runtime-discoverable information. For example, FIG. 9 illustrates two transaction dependencies and two dependency data queues. Whenever transaction generation framework 140 executes Transaction X 900, it may enqueue the output from the transaction onto data queue 930 and subsequently, whenever transaction generation framework 140 executes Transaction Y 910 it may dequeue an element off data queue 930 and use the data as input to the transaction, according to one example embodiment.

While described above in terms of using a separate data queue for each transaction dependency, in some embodiments, other data structures may be used to store the output data from a transaction until it can be used as input for another, dependent, transaction. For example, in one embodiment, a single data queue may be used to store the output from all transactions (using suitable identifiers to identify which transaction created any specific data in the queue) and transaction generation framework 140 may search the entire queue for data output by a particular transaction. In general, any suitable method may be used to store the output of transactions, according to various embodiments.

When using dependency data queues, as described above, whenever transaction generation framework 140 needs to execute a transaction that is dependent on a first transaction, it may attempt to dequeue the output of the first transaction from the appropriate dependency data queue. For instance, if transaction generation framework 140 needs to execute Transaction Y 910, which depends on Transaction X 900, transaction generation framework 104 may first attempt to dequeue an element off data queue 930. If, however, data queue 930 is empty, then transaction generation framework 140 may not have any data to use as input to Transaction Y 910. Data queue 930 may be empty for various reasons. For example, Transaction X 900 may not have been executed yet during this test run or all output data from previous executions of Transaction X 900 may have already be dequeued and used as input for previous executions of Transaction Y 910.

When transaction generation framework 140 selects a dependent transaction type for execution for which transaction generation framework 140 does not have any input data (e.g., the relevant dependency queue is empty), transaction generation framework 140 may attempt to execute the transaction type upon which the dependent transaction depends, according to some embodiments. For example, if transaction generation framework 140 selects Transaction Z 920 to execute, but data queue 940 is empty, transaction generation framework 140 may attempt to execute Transaction Y 910 instead. If however, when attempting to execute Transaction Y 910, dependency data queue 930 is empty, transaction generation framework 140 may attempt to execute Transaction X 900. Thus, even though transaction types may be randomly selected for execution (as discussed previously), transaction generation framework 140 may substitute execution of other transaction types in order to execute transactions according to a specified dependency order, according to some embodiments.

Similarly, if transaction generation framework 140 selects a transaction type for execution for which the relevant data queue used to store the output from the transaction is full, transaction generation framework 140 may attempt to execute a transaction that depends on that transaction type instead. For example, if transaction generation framework 140 selects Transaction X 900 for execution, but data queue 930 is full, transaction generation framework 140 may attempt to execute Transaction Y 910 instead, thereby dequeing an element off data queue 930 in the process.

Dependency data queues may be considered full for various reasons. For instance, the size of data queues may be limited in order to limit overall memory usage. Additionally, transaction generation framework 140 may attempt to limit the number of times particular transaction type is executed relative to another transaction type in order to adhere is a specified overall transaction distribution, as discussed previously. Thus, having a certain number of elements on a particular dependency data queue may indicate that a particular transaction type has been executed more times that may be indicated by a target transaction distribution, according to some embodiments.

Thus, as discussed above, transaction generation framework 140 may, in some embodiments, be configured to execute different transaction types than those that may be randomly selected due to transaction dependencies. When transaction generation framework 140 executes a different transaction type rather than an original transaction type that was randomly selected (e.g., due to transaction dependency issues or to meet a target transaction distribution) transaction generation framework 140 may store an indication of the original transaction type for subsequent execution. For instance, if transaction generation framework 140 randomly selects Transaction Z 920 for execution, but instead executes Transaction Y 910, as discussed above, transaction generation framework 140 may subsequently execute Transaction Z 920 in place of Transaction Y 910 if Transaction Y 910 is later randomly selected for execution.

Thus, in some embodiments, transaction generation framework 140 may store an indication that Transaction Z 920 was not executed when selected for execution and that Transaction Y 910 was executed instead. Transaction generation framework 140 may further store an indication that Transaction Z 920 should be executed instead of Transaction Y 910 when Transaction Y 910 is next selected for execution. In some embodiments, transaction generation framework 140 may use a redirect queue to store information regarding which transaction types should be substitute for other transaction types, such as because different transaction types were previously substituted for execution due to transaction dependency (or other) reasons.

Figure 10:
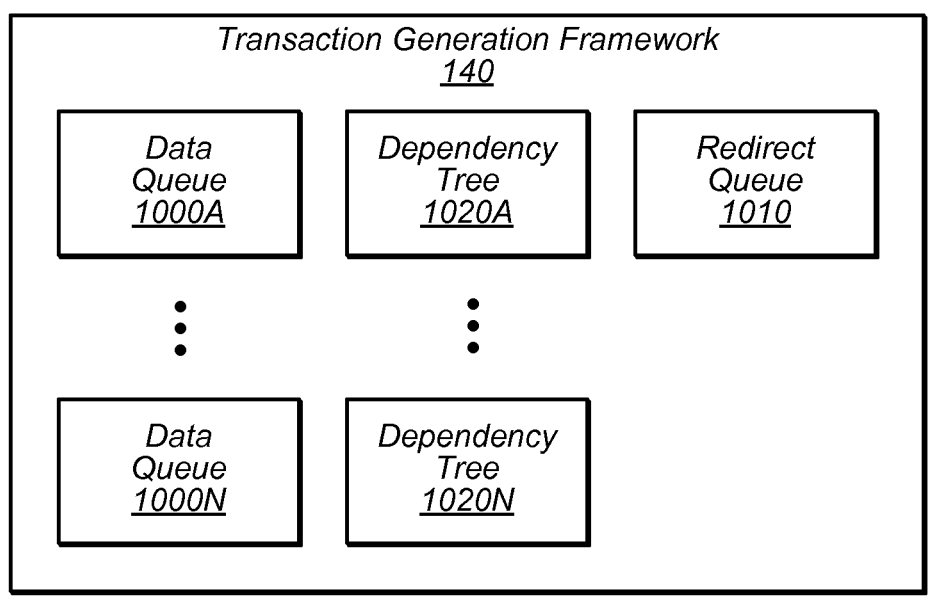
FIG. 10 is a block diagram illustrating a transaction generation framework including various data storage structures, according to one embodiment.

FIG. 10 is a block diagram illustrating a transaction generation framework including both dependency data queues and a redirect queue, according to one embodiment. As illustrated in FIG. 10, transaction generation framework 140 may include (or maintain) a number of data queues, such as data queues 1000A-1000N and a redirect queue 1010. In some embodiments, as noted above, transaction generation framework 140 may maintain a separate data queue for each transaction dependency specified by the runtime-discoverable information. In some embodiments, transaction generation framework 140 may also include one or more dependency trees, such as dependency trees 1020A-1020N, which may be used to maintain the specify dependency relationships among transactions as specified in the runtime-discoverable information. The specific number of dependency trees and data queues may vary from embodiment to embodiment and from test run to test run. Additionally, the number of dependency trees may vary from the number of data queues, depending upon the particular set of transaction dependencies.

Additionally, as noted above, transaction generation framework 140 may utilize redirect queue 1010 to store indications of transaction types that should be substituted for other, as described above. For example, if transaction generation framework 140 randomly selected Transaction Z 920 for execution, but instead executes Transaction Y 910 (e.g., due to a dependency between the two transaction types), transaction generation framework 140 may store in redirect queue 1010 an indication that the substitution was made and that Transaction Z 920 should be executed when Transaction Y 910 is selected for execution (e.g., randomly or otherwise). Subsequently, when Transaction Y 910 is selected for execution, transaction generation framework 140 may check redirect queue 1010 to determine whether another transaction types should be substituted for Transaction Y 910.

Figure 11:
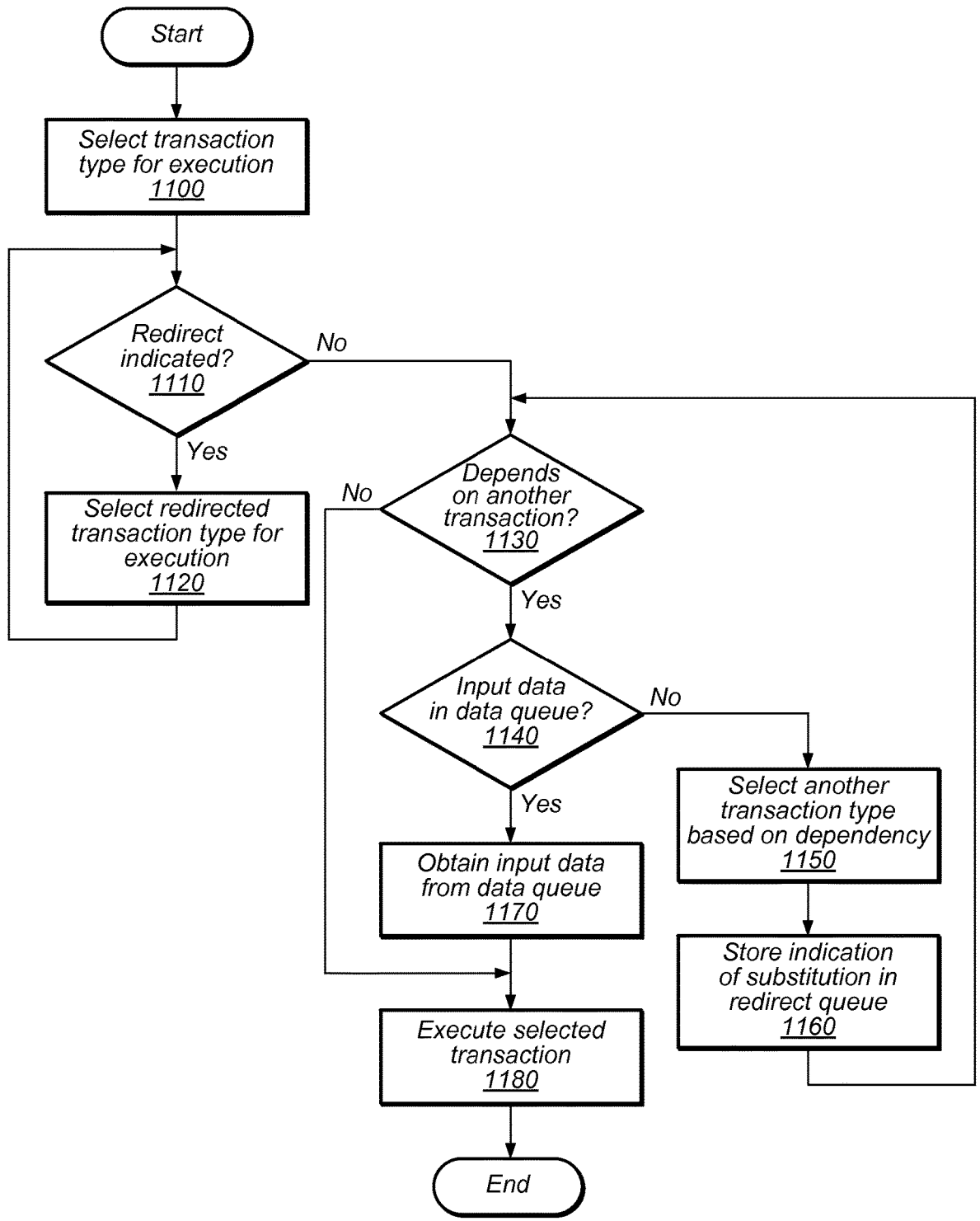
FIG. 11 is a flowchart illustrating one embodiment of a method for transaction substitution utilizing data queues and a redirect queue.

Thus, transaction generation framework 140 may substitute transaction types and use both dependency data queues and a redirect queue to store data and information regarding the substitutions. FIG. 11 is a flowchart illustrating one embodiment of a method for transaction substitution utilizing data queues and a redirect queue. As shown in block 1100, transaction generation framework 140 may select a particular transaction type for execution, such as by randomly selecting a transaction type according to the transaction distribution specified by the test developer. Transaction generation framework 140 may then check the redirect queue to determine whether the selected transaction type was previously substituted for another transaction type and therefore the other transaction type should now be substituted for the selected type.

If, as indicated by the positive output of decision block 1110, a redirect (or substitution) is indicated, transaction generation framework 140 may be configured to select the redirected transaction type for execution, as shown in block 1120. Since, as noted above, the newly substituted (e.g., redirected) transaction type, may itself have been substituted for yet another transaction type previously, transaction generation framework 140 may again check the redirect queue to determine whether the other transaction type should be substituted for the newly selected transaction type, as indicated by the line from block 1120 to decision block 1110.

If, however, now substitution is indicated by the contents of the redirect queue, as shown by the negative output of decision block 1110, transaction generation framework 140 may determine whether or not the currently selected transaction type is dependent upon another transaction type, as shown in decision block 1130. If, as indicated by the negative output of decision block 1130, the currently selected transaction type does not depend on another transaction type, transaction generation framework 140 may proceed to execute the currently selected transaction, as shown in block 1180.

If, as indicated by the positive output of decision block 1140, the currently selected transaction type does depend on another transaction type, transaction generation framework 140 may determine whether or not appropriate input data for the currently selected transaction type is stored in the relevant dependency data queue, as shown in decision block 1140. For instance, if transaction generation framework 140 determines that Transaction Z 920 depends on Transaction Y 910, transaction generation framework 140 may check dependency data queue 940 to determine whether output from Transaction Y 910 was previous stored there and is therefore available for use as input data for Transaction Z 920, according to one embodiment.

If, as indicated by the positive output from decision block 1140, appropriate data is available in the relevant data queue, transaction generation framework may then obtain the input data from the data queue, as shown in block 1170 and proceed to execute the selected transaction (using the obtained input data) as shown in block 1180. Alternatively, if no appropriate input data is available from the relevant data queue, as indicated by the negative output from decision block 1140, transaction generation framework 140 may select another transaction type based on the dependency between the transactions, as shown in block 1150. For example, if transaction generation framework 140 selects Transaction Y 910 for execution (e.g., either randomly or because Transaction Z 920, which depends on Transaction Y 910, was selected), and there is not input data (e.g., output data from Transaction X 900) in dependency queue 930, transaction generation framework 140 may select Transaction X 900 for execution because Transaction Y 910 depends on Transaction X 900, according to one example embodiment.

After selected another transaction type for execution based on dependencies between transaction types, as shown in block 1150, transaction generation framework 140 may store an indication of the substitution in a redirect queue, such as redirect queue 1110, as shown in block 1160. After storing an indication of the substituted transaction type, transaction generation framework 140 may check the dependency information for the new (e.g., substituted) transaction type to determine whether another transaction type should be executed in place of the newly substituted transaction type, as indicated by the line from block 1160 to decision block 1130. For example, transaction generation framework 140 may substitute Transaction Y 910 for Transaction Z 920 because dependency information indicates that Transaction Z 920 depends on Transaction Y 910 and transaction generation framework 140 may also check to see whether Transaction Y 910 depends on another transaction, such as Transaction X 900.

Thus, in some situations, transaction generation framework 140 may go through several redirections (e.g., substitutions) prior to actually executing a transaction, depending on specific transaction dependencies and upon which transactions have been executed or substituted previously.

As noted previously, a test developer may specify a particular distribution for the execution of various transaction types. Thus, one transaction type may be executed more often that another. For example, a test developer may specify (e.g., in runtime discoverable information) that transaction X should be execution 20% of the time, that transaction Y should be executed 60% of the time and that transaction Z should be executed 20% of the time. Thus, transaction Y may be executed three times as often as either transaction X or transaction Y. If transaction Y depends on transaction X, then executing transaction X every time input data is needed for transaction Y may result in an actual overall transaction distribution that does not match the target transaction distribution (e.g., 20:60:20). Therefore, in some embodiments, transaction generation framework 140 may be configured to reuse the output of a transaction more than once. In other words, if the transaction workflow based on transaction distribution is not 1:1 between all transaction types, the output of some transactions may be used more than once in order to meet the desired workflow distribution, while maintaining proper transaction dependencies.

Extending the earlier coffee example, the transaction distribution may indicate that the DrinkCoffee transaction type should be executed more often than the BrewCoffee transaction type. For example, BrewCoffee may be specified to be executed 20% of the time, while DrinkCoffee may be specified to be executed 80% of the time (assuming only BrewCoffee and DrinkCoffee transaction types in the current dependency tree). This means that the output of BrewCoffee may be used as input by 4 DrinkCoffee transactions (e.g., a single pot of brewed coffee may provide four actual services of coffee). In order to reuse the output of a transaction a certain number of times, transaction generation framework 140 may be configured to store an indication of how many times output data may be used. In one embodiment, transaction generation framework 140 may store such an indication with output data that is stored to a dependency data queue.

For example, in one embodiment transaction generation framework 140 may use a UsesLeft field (or other data object) as part of the information stored in a dependency data queue. Each time the output data from a data queue is dequeued (e.g., to be used as input to another transaction), transaction generation framework 140 may decrement the UsesLeft field. If the decremented UsesLeft field is greater than zero, transaction generation framework 140 may requeue the output data (along with the decremented UsesLeft value) onto the data queue for future use. If however, the decremented UsesLeft field is not greater than zero, transaction generation framework 140 may not enqueue the output data back onto the data queue.

Additionally, in some embodiments, transaction dependency information may indicate a 1:1 dependency relationship between two transaction types, while indicating a many:1 dependency relationship between other transaction types. Therefore, transaction generation framework 140 may be configured to store output data for transaction types whose data should only be used once with a UsesLeft value of 1 (i.e., so that it will only be used once).

In some embodiments, transaction generation framework 140 may be configured to re-enqueue output that is to be used again (e.g., whose UsesLeft is greater than zero) onto the front of the relevant dependency data queue, while in other embodiments, output data may be re-enqueued into a data queue in other locations, such as at the end of the queue or at a randomly selected location within the queue, such as depending on whether or not the test developer desires the same output data to be re-used consecutively. Thus, in different embodiments, the transaction generation framework 140 may restore used output data at the front of the data queue (e.g., if immediate reuse is desired) or store it at the end of the queue (e.g., if the intent is to space out transactions using the same data).

As discussed previously regarding transaction dependencies, in some embodiments more than one transaction type may depend from a single other transaction type. Thus, transaction generation framework 140 may be configured to take such many-to-1 dependency relationships into account when determining how may time to reuse the output from a particular transaction. For example, if transaction Y and transaction Z both depend from transaction X and the transaction distribution indicates that transaction X is to be executed 20% of the time, while transaction X and transaction Y are each to be executed 40% of the time, transaction generation framework 140 may determine that output from a single execution of transaction X may be reused four times (twice for transaction Y and twice for transaction Z).

For ease of discussion, the examples above used a set of transaction distributions that involved evenly divisible numbers. In many situations, however, such may not be the case. For instance, extending the coffee example from above, a test developer may specify a load test that includes a transaction distribution that indicates ratio of 15% BrewCoffee to 85% DrinkCoffee. In such an example, each output of BrewCoffee should be used as input, on average, by 5.66 DrinkCoffee transactions. Thus, in some embodiments, transaction generation framework 140 may be configured to utilize a non-integer UsesLeft field. For the example above, transaction generation framework 140 may initially use a UsesLeft value of 5.66 for output data from a BrewCoffee transaction, decrementing UsesLeft each time the output data is reused. After the 5th time, the data may be put back into the dependency data queue with a UsesLeft value of 0.66. The next time that data is used, transaction framework 140 may select a random number between 0-1 to determine whether or not to re-use the data once more. If the random number is less than 0.66, transaction generation framework 140 may use the data again as input for a transaction. If not, transaction generation framework 140 may not discard the data, but may obtain different input data, such as from other data already in the data queue or by executing the relevant transaction type to obtain new data.

Figure 12:
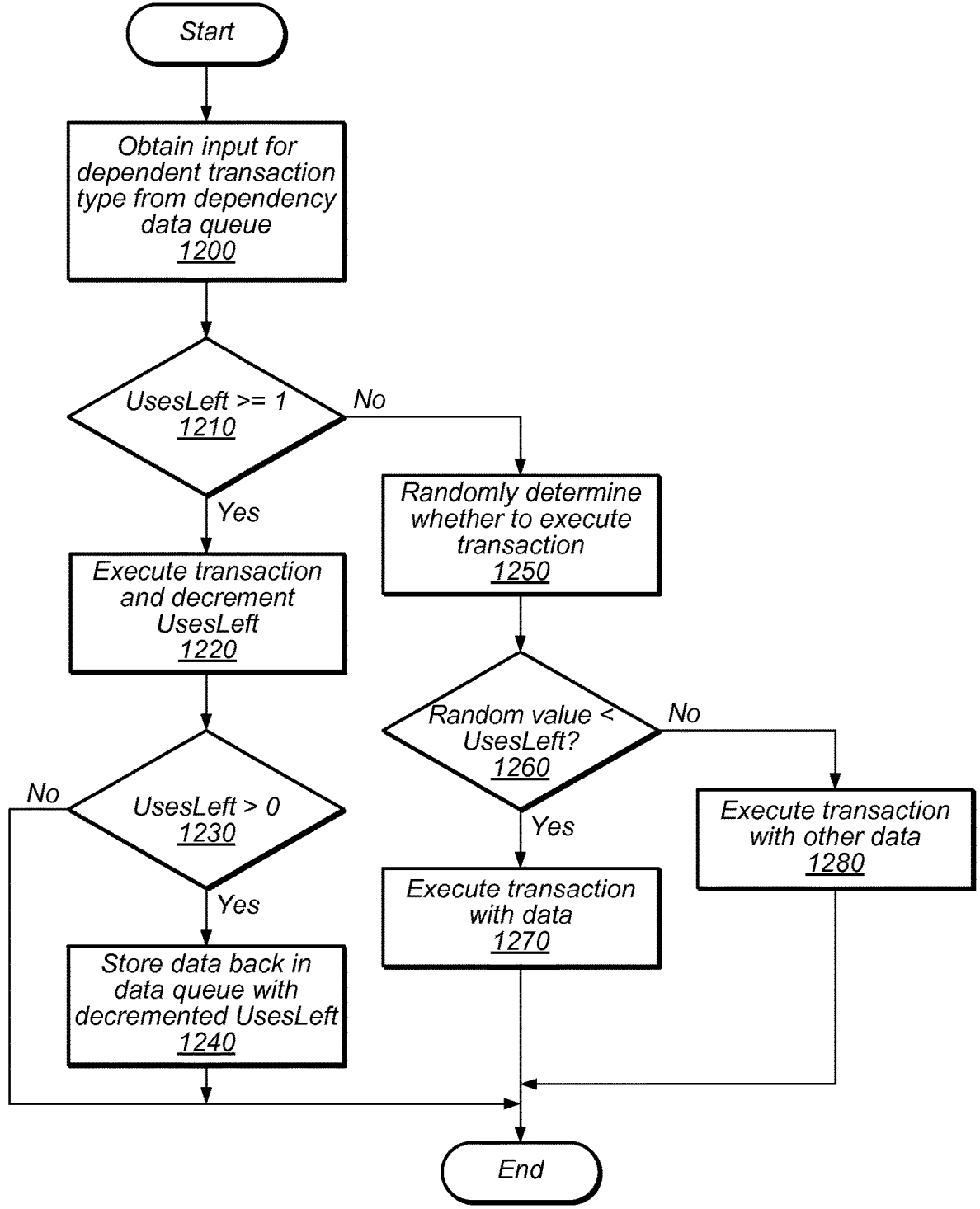
FIG. 12 is a flowchart illustrating one embodiment of a method for reusing the output from a transaction more than one, as described herein.

As discussed above, transaction generation framework 140 may be configured to reuse output from a transaction any number of times, based on the actual transaction distribution specified in the runtime-discoverable information by the test developer, according to various embodiments. FIG. 12 is a flowchart illustrating one embodiment of a method for reusing the output from a transaction more than one, as described herein. As shown in block 1200, transaction generation framework 140 may obtain input for a dependent transaction type from a dependency data queue. For example, in one embodiment, transaction generation framework 140 may have randomly selected transaction Z 920 for execution and may have previously stored output data from a previous execution of transaction Y 910, on which transaction Z 920 depends. Thus, transaction generation framework 140 may find input data for transaction Z 920 (e.g., output data from transaction Y 910) in dependency data queue 940.

If, as indicated by the positive output of decision block 1210, the UsesLeft value for the data is greater than or equal to 1, transaction generation framework 140 may execute the transaction and decrement UsesLeft, as shown in block 1220. Transaction generation framework 140 may then determine whether or not the decremented UsesLeft value is greater than zero. If it is, as indicated by the positive output of decision block 1230, transaction generation framework 140 may store the data back in the data queue with the decremented value of UsesLeft (i.e., so that it may be reused again), as shown in block 1240. If the decremented value is not greater than zero, transaction generation framework 140 may discard the data so that it is not reused again, as indicated by the negative output of decision block 1230.

Alternatively, if at decision block 1210, UsesLeft is not greater than or equal to 1 (i.e., is less than 1), as indicated by the negative output, transaction generation framework 140 may randomly determine whether or not to execute the transaction, as shown in block 1250. For example, as noted above, if the UsesLeft value is between 0 and 1, as would be the case at block 1250 of FIG. 12, transaction generation framework 140 may generate a random number between 0 and 1. If the random number is less that the value of UsesLeft, as indicated by the positive output of decision block 1260, transaction generation framework 140 may execute the transaction (and discard the data) as shown in block 1270. If however, the random number is not less than UsesLeft, as indicated by the negative output of decision block 1260, transaction generation framework 140 may discard the data from the queue and execute the transaction with different data (e.g., data from another entry in the queue or newly generated data), as shown in block 1280. For example, if the data from a particular entry in a data queue has been used the maximum number of times, as indicated by the UsesLeft value, transaction generation framework 140 may obtain other data from another entry in the data queue (since more than one previous transaction may have stored the appropriate data) or by executing an appropriate transaction to obtain the data, according to some embodiments.

The UsesLeft field described above is merely one example and any suitable method of maintaining an indication of how many times a particular set of output data may be reused may be utilized by transaction generation framework 140, according to various embodiments.

The techniques and/or methods of various embodiments described above have been illustrated and described using flow diagrams or flowcharts. Within the illustrated diagrams, rectangular elements may denote "processing blocks" and may further represent computer software instructions or groups of instructions which affect the execution of the computer software instructions or groups of instructions which affect the execution of the computer software instructions represented by the processing blocks. Alternatively, the processing and decision blocks may represent steps performed by functionally equivalent circuits such as a digital signal processor circuit or an application-specific integrated circuit (ASIC). The flow diagrams do not depict syntax of any particular programming language. Rather, the flow diagrams illustrate the functional information one skilled in the art may use to generate computer software (or to fabricate circuits) to perform the processing of some embodiments of the depicted system. It should be noted that many routine program elements such as initialization of loops and variables and the use of temporary variables are not shown. Additionally in different embodiments, the various processes represented by the flow diagrams may be performed in different orders and some steps may be repeated or omitted.

Some embodiments provide a network-based scalable production load test service on a provider network including a plurality of computing devices. In some embodiments, the plurality of computing devices is configured to receive a request to capture to a load test data repository items of transaction data for a network-based production service. In some embodiments, the plurality of computing devices is configured to capture to the load test data repository the items of transaction data. The transaction data include input to the network-based production service over a network. In some embodiments, in response to a load test specification received by the scalable production load test service, the plurality of computing devices is configured to dynamically allocate one or more resources to perform a load test of the network-based production service according to the load test specification.

In some embodiments, the plurality of computing devices is configured to perform the load test of the network-based production service using the dynamically allocated one or more resources. To perform the load test the network-based scalable production load test service is configured to generate a load for load testing the network-based production service based at least in part on the items of transaction data for the network based production service in the load test data repository, send from the scalable production load test service to the network-based production service transactions based on the generated load, and collect performance metrics indicating performance of the load test on the network-based production service.

In some embodiments, to capture to the load test data repository the items of transaction data, the network-based scalable production load test service is configured to filter the items of transaction data to eliminate from the transaction data repository items of transaction data for which persistence is forbidden. In some embodiments, to generate the load for load testing the network-based production service based at least in part on the items of transaction data for the network based production service in the load test data repository, the network-based scalable production load test service is configured to assemble load test transaction inputs according to a mix of load test transaction types different from a mix of transaction types present in the items of transaction data at said capturing.

In some embodiments, to generate the load for load testing the network-based production service based at least in part on the items of transaction data for the network based production service in the load test data repository the network-based scalable production load test service is configured to assemble load test transaction inputs according to a mix of load test transaction types copied from a mix of transaction types present in the items of transaction data at said capturing. In some embodiments, the network-based scalable production load test service is configured to present a dashboard of metrics representing performance of the network-based production service. In some embodiments, the network-based scalable production load test service is configured to execute on a provider network hosting the network-based production service executes transactions in a networked computing environment. In some embodiments, the load test data repository executes on a provider network on which the network-based production service executes transactions in a networked computing environment.

Some embodiments include a method for providing a load testing service. In some embodiments, the method includes, in response to a load test specification received by a scalable production load test service, a scalable production load test service dynamically allocating one or more resources to perform a load test of the network based production service according to the load test specification, and performing the load test of the network based production service using the dynamically allocated one or more resources. In some embodiments, the method includes, the dynamically allocating includes calculating a quantity of resources needed to perform a load test of the network-based production service according to the load test specification, identifying one or more resources available to the scalable production load test service to perform a load test of the network-based production service according to the load test specification, and assigning the one or more resources available to the scalable production load test service to perform a load test of the network-based production service according to the load test specification.

In some embodiments, performing the load test includes generating a load for load testing the network-based production service based at least in part on the items of transaction data for a network based production service in the load test data repository, sending from the scalable production load test service to the network-based production service transactions based on the generated load, and collecting performance metrics indicating performance of the load test on the network-based production service.

In some embodiments, the method further includes capturing to a load test data repository of the scalable production load test service items of transaction data. The capturing to the load test data repository of the scalable production load test service the items of transaction data further includes categorizing the items of transaction data to facilitate subsequent adjustment by the load test data repository items of transaction data for use by the scalable production load test service. In some embodiments, the method further includes presenting a billing interface representing costs associated with performance of the load test of the network based production service using the dynamically allocated one or more resources. In some embodiments, the method further includes presenting a dashboard of utilization metrics comprising metrics representing cost of resource consumption by the network-based production service during the load test of the network based production service. In some embodiments, the method further includes presenting a dashboard of metrics representing performance of the network-based production service during the load test of the network based production service using the dynamically allocated one or more resources.

In some embodiments, the method further includes presenting an order interface representing costs expected to be associated with selectable options for performance of the load test of the network based production service using the dynamically allocated one or more resources, and controls for selecting the selectable options to adjust selection of the one or more dynamically allocated resources. In some embodiments, the load test specification received by the scalable production load test service includes a description of acceptable execution timing for the sending from the scalable production load test service to the network-based production service transactions based on the generated load.

Some embodiments include a non-transitory computer-readable storage medium storing program instructions. In some embodiments, the program instructions are computer-executable to implement capturing to a load test data repository of the scalable production load test service the items of transaction data. The transaction data include input to the network-based production service over a network. In some embodiments, the program instructions are computer-executable to implement performing the load test of the load test of the network based production service using the dynamically allocated one or more resources. In some embodiments, in response to a load test specification received by the scalable production load test service, the scalable production load test service dynamically allocates one or more resources to perform a load test of the network based production service according to the load test specification. In some embodiments, the program instructions computer-executable to implement performing the load test include program instructions computer-executable to implement generating a load for load testing the network-based production service based at least in part on the items of transaction data for a network based production service in the load test data repository, and program instructions computer-executable to implement sending from the scalable production load test service to the network-based production service transactions based on the generated load.

In some embodiments, the program instructions computer-executable to implement capturing to a load test data repository of the scalable production load test service the items of transaction data further include program instructions computer-executable to implement filtering the items of transaction data to eliminate from the transaction data repository items of transaction data that have remained in the repository past a useful lifespan representing common occurrence of a transaction type of the data. In some embodiments, the program instructions computer-executable to implement capturing to a load test data repository of the scalable production load test service the items of transaction data further comprise program instructions computer-executable to implement assembling load test transaction inputs according to a mix of load test transaction types projected to exist on a future date based on a demand model provided by the scalable production load test service.

In some embodiments, the program instructions computer-executable to implement sending from the scalable production load test service to the network-based production service transactions based on the generated load further comprise program instructions computer-executable to implement sending from virtual computing instances of a provider network the scalable production load test service to the network-based production service transactions based on the generated load. Some embodiments include program instructions computer-executable to implement presenting a dashboard of metrics representing comparison between performance of the network-based production service during load testing of the network-based production service specified by the load test specification and a predictive model of the performance of the network-based production service during load testing of the network-based production service specified by the load test specification. In some embodiments, the capturing to a load test data repository of the scalable production load test service the items of transaction data further includes importing from a third-party provider to the load test data repository of the scalable production load test service the items of transaction data from the network based production service.

Figure 13A:
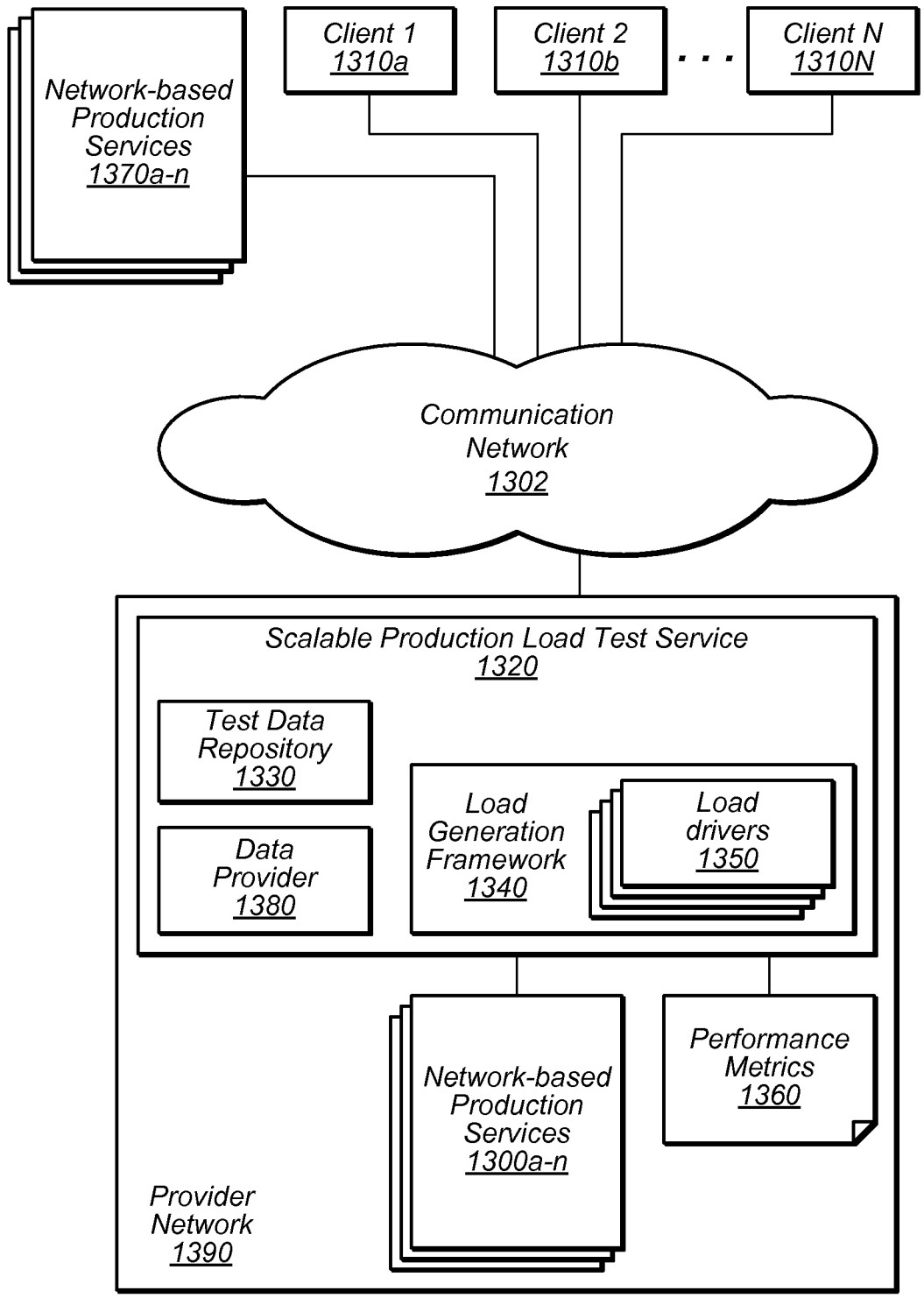
FIG. 13A is a logical block diagram illustrating an example configuration of a system for providing load testing as a service in a shared computing system, according to one embodiment.

Some embodiments provide load testing as a native service on a provider network, including a network-based scalable production load test service on a provider network including a plurality of computing devices. FIG. 13A is a logical block diagram illustrating an example configuration of a system for providing load testing as a service on a provider network, according to one embodiment. A series of testing clients 1310*a*-1310*n* interact with a scalable production load test service 1320 to test network based production services 1300*a-n* and network based production services 1370a-n. In some embodiments, scalable production load test service 1320 provides testing services to network based production services 1300a-n over a provider network 1390. Some embodiments implement sending from virtual computing instances of a provider network the scalable production load test service to the network-based production service transactions based on a generated load. In some embodiments, scalable production load test service 1320 provides testing services to network based production services 1370a-n over an external communication network 1302 connected to provider network 1390. In some embodiments, scalable production load test service 1320 provides testing services to network based production services 1370a-n over an external communication network 1302 connected to provider network 1390 and/or provides testing services to network based production services 1300a-n over a provider network 1390.

In the illustrated embodiment, network-based production services 1300a-n, scalable production load test service 1320, load generation framework 1340, data provider 1380, and test data repository 1330 (also sometimes referred to as a test data store) are implemented as instances operating on a provider network 1390. In alternative embodiments, any of network-based production service 1300a-n (e.g., network-based production service 1370a-n), load generation framework 1340, data provider 1380, and test data repository 1330 may be operated on computing systems separate from others of network-based production service 1300a-n, load generation framework 1340, data provider 1380, scalable test production system 1320, and test data repository 1330. In some embodiments, the network-based scalable production load test service is configured to execute on a provider network hosting the network-based production service executing transactions in a networked computing environment. In others, the network-based scalable production load test service is configured to execute separately from a provider network hosting the network-based production service executing transactions in a networked computing environment.

Within scalable production test system, a load generation framework 1340 executes test transactions for testing network based production services 1300a-1300n and 1370a-1370n, while a test data repository 1330 receives and filters data from network based production service 1300a-1300n and 1370a-1370n before data is deposited in test data repository 1330 for subsequent use by a load generation framework 1340. Some embodiments implement capturing to a load test data repository of the scalable production load test service items of transaction data. In some embodiments, the receiving or capturing to a load test data repository of the scalable production load test service the items of transaction data further includes importing from a third-party provider to the load test data repository of the scalable production load test service the items of transaction data from the network based production service.

In some embodiments, the plurality of computing devices is configured to receive a request to capture to a load test data repository items of transaction data for a network-based production service. In some embodiments, the plurality of computing devices is configured to capture to the load test data repository the items of transaction data. The transaction data include input to the network-based production service over a network. In some embodiments, test data repository 1330 in conjunction with data provider 1380 provides storage of production data from network based production service 1300a-1300n and 1370a-1370n for use in subsequent testing. In some embodiments, data enters test data repository 1330 through use of a saveData( ) method:

void LoadGenerationCloudService.saveData(
    String loadId,
    Interval interval,
    Map<String,String>tags,
    InputStream data)

In some embodiments, the loadId is a unique ID that persists to be used later for fetching data from test data repository 1330, allowing multiple products executing on network based production services 1300a-n and 1370a-n to be tested with a single account accessing test data repository 1330. The interval is the start and end time of the data received. Tags is any key-value pairs used for subsequent filtering. The data is provided as an InputStream.

Figure 13B:
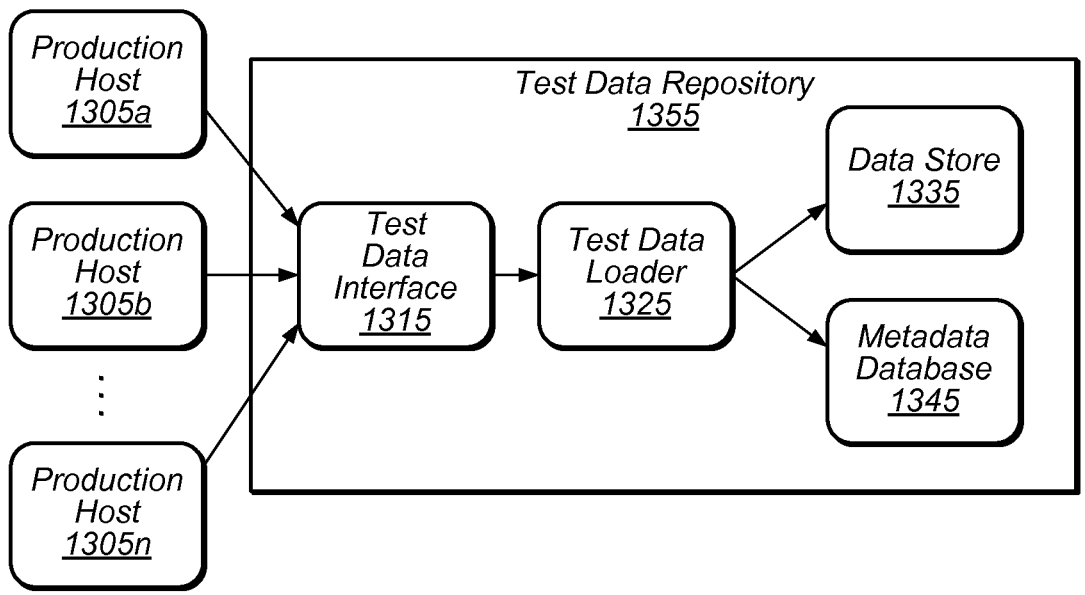
FIG. 13B is a logical block diagram illustrating an example configuration of operations for providing load testing as a service in a shared computing system, according to one embodiment.

FIG. 13B is a logical block diagram illustrating an example configuration of operations for providing load testing as a service in a shared computing system, according to one embodiment. In some embodiments, production hosts 1305a-1305n send data to a test data interface 1315 of a test data repository 1355, which transmits the data to a test data loader 1325, for storage in a data store 1335 with metadata stored to a metadata database 1345.

As an example, test data loader 1355 uploads test data for storage on data store 1335 and saves the load id, the interval, the tags and a pointer to the URI of the data to metadata database 1345 (e.g., in Amazon™ S3™ to SimpleDB™ or DynamoDB™, though one of skill in the art will realize in light of having read this disclosure that many other databases can also be used). Because identification data are saved to metadata database 1345, queries may be performed against metadata database 1345 to retrieve specific types of data from data store 1335.

In some embodiments, to generate the load for load testing the network-based production service based at least in part on the items of transaction data for the network based production service in the load test data repository, the network-based scalable production load test service is configured to assemble load test transaction inputs according to a mix of load test transaction types copied from a mix of transaction types present in the items of transaction data at said capturing. One problem that often occurs in saving production data is that a host may receive a blend of transaction types, i.e. 70% of the transactions that it handles are TransactionX, 10% of them are TransactionY, and 20% are TransactionZ. Since these may be uniformly distributed in production, a particular InputStream may have them mixed in random order. The users of LoadGenerationCloudService may wish to fetch data that only applies to a particular transaction type. Some embodiments therefore offer the capability to categorize data into buckets, as described below. The capturing to the load test data repository of the scalable production load test service the items of transaction data further includes categorizing the items of transaction data to facilitate subsequent adjustment by the load test data repository items of transaction data for use by the scalable production load test service. Additionally, some transactions may not be safe for replay or may contain data that for some reason is subject to a desire to avoid persistence. Some embodiments address this problem by filtering out records, or modifying data in records. Such embodiments provide not just a categorizer but also a transformer and filtering mechanism.

In some embodiments, because transformation and filtering is a time-consuming process, the embodiment may be designed to avoid use of hardware resources (i.e. CPU, memory) of the production host (network-based production service 1300*a-n* or 1370*a-n*) to categorize and filter the data. Some embodiments offer the capability of enabling data transformations to occur on the data at scalable production test system 1320. In some embodiments, the data transformations run in the elastic hardware of the provider network 1390 hosting scalable production test system 1320 as it is ingested, rather than on the production hosts at network-based production service 1300*a-n* or 1370*a-n*. The framework at scalable production test system 1320 has a pool of hosts available for data transforms, and uses load balancing and auto-scaling to assist these hosts in handling the current traffic efficiently.

Figure 13C:
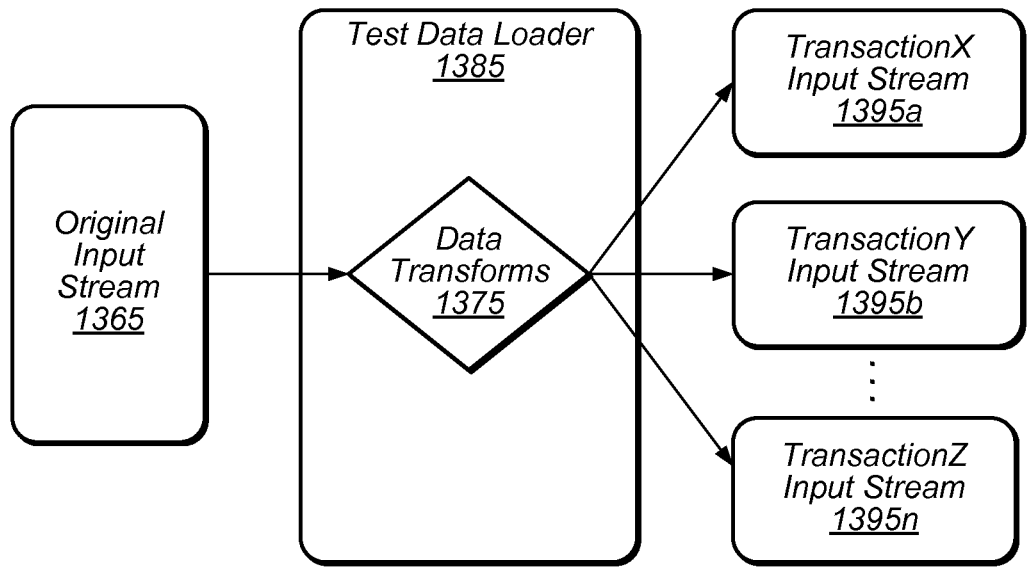
FIG. 13C is a logical block diagram illustrating an example configuration of data transforms for providing load testing as a service in a shared computing system, according to one embodiment.

FIG. 13C is a logical block diagram illustrating an example configuration of data transforms for providing load testing as a service in a shared computing system, according to one embodiment. An original input stream 1365 is separated into transaction-type based input streams 1395*a*-1395*n* by a set of data transforms 1375 of a test data loader 1385. In some embodiments, users provide a JAR file that contains an implementation to a LoadGenerationDataCategorizer interface. The point of the data categorizer is to take as input an InputStream and split it into several InputStreams, each one containing the data for one specific category. In some embodiments, the user can upload and enable this JAR, which works on a specific load id. Additionally, some users specify a number of key-value pairs that the data should match in order for the data transform to run.

void    LoadGenerationCloudService.enableDataTransform(
        String loadId,
        Jar dataTransformJar,
        Map<String,String>tags)

In some embodiments, when the load generation service receives data via a call to the saveData ( ), it fetches all the data transforms that apply to a particular load id. Then, for each one, it checks if they have any specific key-value pairs in the tags that should be matched. If so, and if they match, then those data transform run on the input stream. The corresponding sub-input streams get saved to the data stored, and indexed with the usual metadata and additionally with the categories returned. A number of properties may be specified to work on a load id. For example, one of the properties may be a retention period specifying that data can be automatically cleaned up after n hours or days.

To replay data, users can get a "DataProvider" that provides data that matches the load id and whatever key-value pairs the user wants:

DataProvider LoadGenerationCloudService.getDataProvider(
        String loadId,
        Map<String,String>tags)

The data provider can provide a list of files that were sent to the Load Generation Datastore on a given interval (or you can get all of them).

DataProvider {
        File [ ] getData
        File [ ] getData (String category)
        File [ ] getData (Interval interval)
        File[ ] getData (String category, Interval interval)
    }

Having recorded data (e.g., recorded production test data) is not required. Load tests that do not replay traffic but rather create artificial traffic on the fly, can specify a NullDataProvider, which has no files. Some embodiments implement assembling load test transaction inputs according to a mix of load test transaction types projected to exist on a future date based on a demand model provided by the scalable production load test service.

Figure 13D:
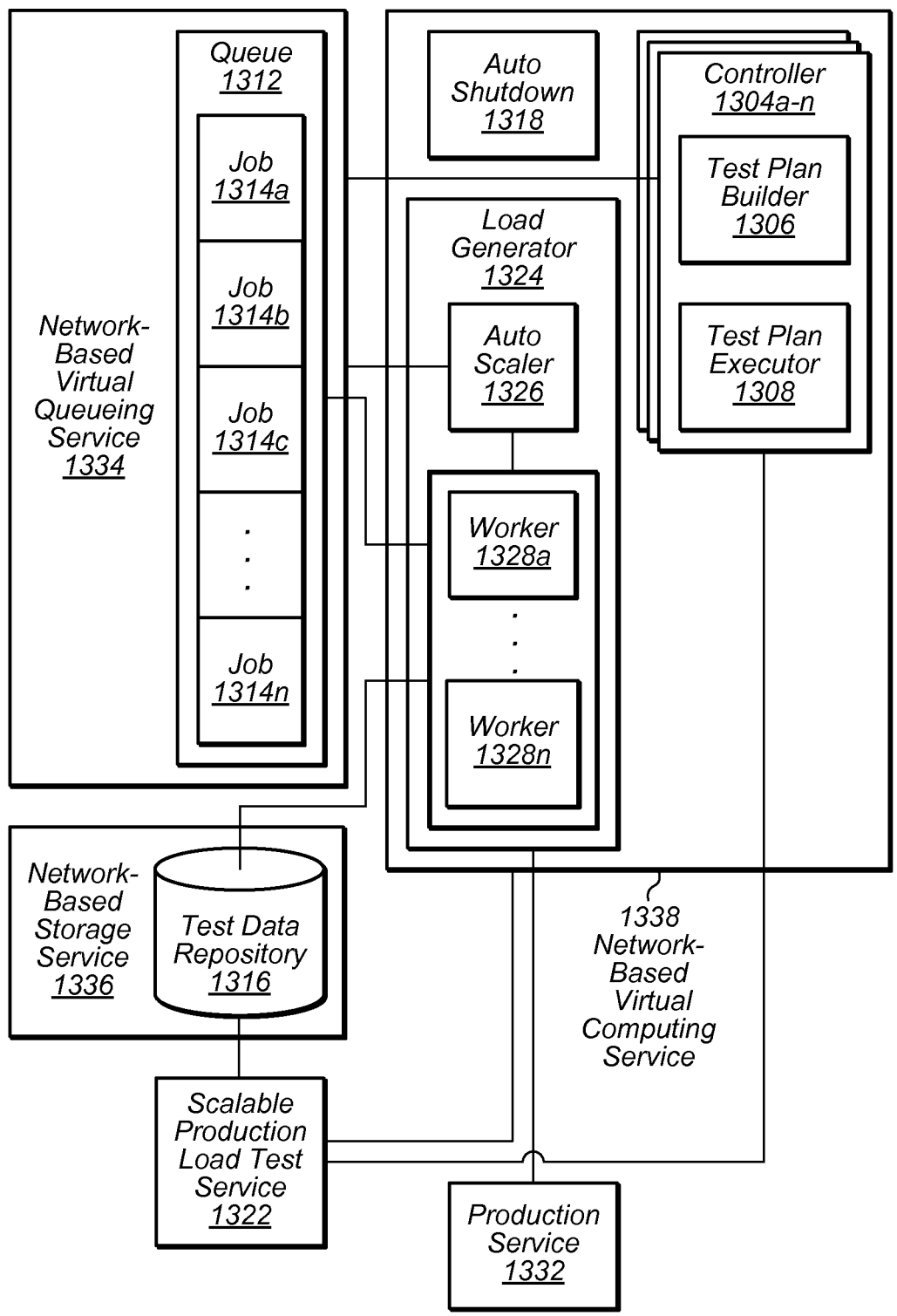
FIG. 13D illustrates dynamic allocation of resources under direction of a load testing as a service in a shared computing system, according to one embodiment.

FIG. 13D illustrates dynamic allocation of resources under direction of a load testing as a service in a shared computing system, according to one embodiment. In general, a scalable production load test service 1322 is configured to test and monitor (during the test) network-based production service 1332. In some embodiments, scalable production load test service 1322 is configured to receive a request to capture to a load test data repository 1316 on a network-based storage service 1336 items of transaction data for a network-based production service 1332. In some embodiments, in response to a load test specification received by the scalable production load test service 1332, the scalable production load test service 1332 is configured to dynamically allocate one or more resources, including a queue on a network-based queuing service 1334, and a load generator 1324 and controllers 1304*a-n* on a network based virtual computing service 1338 to perform a load test of the network-based production service 1338 according to the load test specification.

A scalable production load test service 1322 (e.g., scalable production load test service 1320 in FIG. 13A) may include one or more dynamically allocate controllers 1304*a-n* on network-based virtual computing service 1338 including a test plan builder 1306 and/or a test plan executor 1308, for example. The test plan builder 1306 may determine the test configuration and the production data required for a test, for example. The test executor 1308 may submit jobs 1314*a*-1314*n* to a queue 1312 on a network based queuing service 1334 according to the test plan, for example.

In some embodiments, a load generator 1324 instantiates workers 1328*a*-1328*n* to retrieve jobs 1314*a*-1314*n* from the job queue 1312 and post to the production service 1332. An auto-scaler 1326 may scale the workers in response to metrics such as the quantity of jobs in the job queue, for example. An auto-shutdown mechanism 1318 monitors metrics to determine, based on the metrics, whether shutdown of the components implemented to simulate a load on production service 1338 is required, in some embodiments. In some embodiments, auto-shutdown mechanism 1318 monitors performance metrics 1360 of FIG. 13A to whether shutdown of the components implemented to simulate a load on production service 1338 is required based on transactions per second through production service 1338, concurrent connections held by production service 1338, distribution (blend) of operations executing on production service 1338, percentile latency metrics for each transaction type executing on production service 1338, and an error rate seen at production service 1338.

Scalable production load test service 1322, in some embodiments, may be implemented at a same entity as network-based production service 1332. In alternate embodiments, scalable production load test service 1322 is implemented separately from network-based production service 1322. In some embodiments, scalable production load test service 1322 may be provided as a separate service from production service 1322. For example, at least some portions of scalable production test system 1322 may be provided as a network-based service (e.g., third party service) remote to production service 1332.

One or more controllers 1304*a-n* are dynamically allocated by scalable production load test service 1322 and implemented to create and execute a test plan to simulate a load on production service 1332. A test plan specifies the production data that will be replayed to production service 1332. A test plan may also specify re-ordering of the data to achieve a given test profile, for example, as described above. A test profile of the test plan describes the simulated load for production service 1332. For example, a test profile may be an increasing/decreasing load, a constant load and/or a peak load, and may specify a mix of transaction types, as described above.

Controllers

Controller 1304a includes test plan builder 1306 and test plan executor 1308, in some embodiments. Test plan builder 1306 in controller 1304a queries test data repository 1316 to evaluate available data for a test plan. Test plan builder 1306 creates a test plan based on the available data (e.g., in data store 1335 of FIG. 13B) and the type of testing (e.g., direct replay of data, constant load, increasing load, etc.) desired, in some embodiments. For example, test plan builder 1306 may evaluate start and end times for a given time period (e.g., individual minutes on a given date) and the size of the file corresponding to the data to determine the ordering of the production request data in the test plan, in some embodiments. In some embodiments, the test plan specifies a test profile that defines the rate and/or rate profile at which one or more controllers 1304a-n add jobs 1314a-n to the job queue 1312.

For example, test data repository 1316 may be queried by test plan builder 1306 under direction of scalable production load test service 1322 to determine the number of files and the size of the files for a given minute, as indicated by start and stop times, on a given date. Test plan builder 1306 may query the same information over an hour or a day, for example, to determine the rate that the load is applied to network-based production service 1322 during test.

As another example, to stress (e.g., create a peak traffic test) network-based production service 1322, several days' worth of production request data may be combined to create a peak traffic test plan for a given test day. The production request data is combined for a standard timeframe from different standard timeframes to create a test load for the standard timeframe test larger than any of the individual timeframe loads, in some embodiments. For example, if the stress test were to determine the load to simulate peak traffic, test plan builder 1306 may query the production data in the test data repository 1316 to determine the number and size of the files to create the desired load. In some embodiments, scalable production load test service 1322 may provide an interface to allow a test administrator, for example, to specify the desired parameters for a given test. One or more controllers 1304a-n may receive the parameters via the interface and build an appropriate test plan.

In addition, in some embodiments, test plan builder 1306 may test data repository 1316 for a sufficient amount of production data to create specific test profiles. A test profile may also be described as the rate at which production data is replayed to the network-based production service 1332, for example. An example of a test profile may be a straight replay of data for a given time period (e.g., a day). In other embodiments, the test plan creates a constant load, where the production request data for a given time period is averaged out. In other embodiments, the load is an increasing load where the production data steadily increases or spikes suddenly. Alternatively, in some embodiments, the test profile is a decreasing load where large amount of production data is initially replayed and the amount steadily decreases. Finally, any combination of the above described test profiles can be created by test plan builder 1305 to stress network-based production service 1322 under direction of scalable production load test service 1322, in some embodiments.

Test plan executor 1308 generates jobs 1314a-1314n to carry out the test plan, in some embodiments. In some embodiments, test plan executor 1308 in controller 1304a implements the test plan created by test plan builder 1308 under direction of scalable production load test service 1322. Test plan executor 1308 creates jobs 1314a-1314n and submits the jobs 1314a-1314n to the job queue 1312 in network based virtual queueing service 1334. Test plan executor 1308 maintains the rate required under direction of scalable production load test service 1322 to create the load profile in network-based production service 1332 as specified by the test plan. In some embodiments, each of jobs 1314a-1314n that test plan executor 1308 creates includes a link or pointer to the portion of production request data in test data repository 1316 as indicated in the test plan. Test plan executor 1308 may also include instructions in jobs 1314a-1314n for workers 1328a-1328n as indicated by test plan builder 1306, in some embodiments. Each of job 1314a-1314n specifies client requests (e.g. production request data) to be replayed by workers 1328a-1328n dynamically allocated by scalable production load test service 1322 to be used in testing network-based production service 1332.

In some embodiments, scalable production load test service 1322 is configured to dynamically allocate resources to scale the number of controllers 1304a-1304n based on the size of the load to be simulated on production service 1332. The number of controllers is dynamically allocated to be scaled in response to the test plan. If the test plan indicated a large load, for example, that requires more than one controller for implementation the test plan, then controllers 1304a-1304n may be added to meet the demand of the test plan. In some embodiments, additional controllers 1304a-1304n are implemented to complement the controller that created the test plan when executing the test plan. For example controller 1304a includes test plan builder 1306 and test plan executor 1308. Based on the test plan created, more controllers 1304a-1304n may be needed to execute the test plan, in some embodiments. The additional controllers 1304a-1304n are dynamically allocated and implemented to provide additional resources to create and submit jobs 1314a-1314n to queue 1312. For example, if the test plan created by test plan builder 1306 in controller 1304a has created a test profile included multiple days' worth of data, a separate controller may be required to create and submit jobs 1314a-1314n for each day's worth of data. In addition, in some embodiments, controllers 1304a-1304n are dynamically allocated and implemented under direction of scalable production load test service 1322 with test plan builder 1306 and test plan executor 1308 on separate controllers.

Queuing

In some embodiments, queue 1312 is implemented to receive jobs from the controllers 1304a-1304n and provide workers 1328a-1328n jobs 1314a-1314n to replay to production service 1332. Queue 1312 identifies the status of jobs and provides a centralized point for determining the resources to complete the jobs 1314a-1314n. For example, the status of the jobs 1314a-1314n and the quantity of jobs 1314a-1314n in queue 1312 may be used to determine whether to dynamically allocate resources such as workers 1328a-1328n under direction of scalable production load test service 1322.

In alternate embodiments, queue 1312 is implemented separate from other components of scalable production test system or by a third party resource. Queue 1312, accepts and manages jobs 1314a-1314n from test plan executor 1308 in controllers 1304a-1304n. As jobs 1314a-1314n are accepted from queue service 1312, the status of each job (e.g., test job) is indicated by marking the job "taken" or "invisible", in some embodiments. "Taken" jobs 1314a-1314n remain in the queue to ensure that in the event of a failure to complete job, the job is made available again in the queue 1312, in some embodiments. Marking jobs 1314a-1314n as "taken" or "invisible" ensure that once a job is accessed from queue service 1312 by one of workers 1328a-1328n, another of workers 1328a-1328n may not perform the "taken" job. Jobs 1314a-1314n may become available again (e.g., marked "untaken" or "visible") if they are not marked complete prior a predetermined timeout, for example. For example, jobs 1314a-1314n currently in progress in network-based production service 1332 may be marked as "untaken" or "visible" if job 1314a-1314n fails to complete. Jobs 1314a-1314n may fail to complete due to failure of workers 1328a-1328n, production service 1332 failure, and/or network failure, for example.

Load Generator

In some embodiments, load generator 1324 is provided to carry out jobs from the job queue 1312 to implement the test plan under direction of scalable production load test service 1322. In some embodiments, load generator 1324 provisions workers 1328a-1328n dynamically allocated by scalable production load test service 1322 to execute the jobs 1314a-1314n, scales the number of workers in response to metrics, and/or shuts down scalable production load test service 1322 in response to metrics. In some embodiments, load generator 1324 comprises one or more workers 1328a-1328n, an auto-scaler 1326 and auto-shut down module 1318. Load generator 1325 implements workers 1328a-1328n dynamically allocated by scalable production load test service 1322 in response to the test plan and scales the workers 1328a-1328n under direction of scalable production load test service 1322 with auto-scaler 1326 in response to metrics assessed on the job queue. For example, the status of the jobs 1314a-1314n in the job queue 1312, may indicate the need for more workers. Load generator 1324 monitors system metrics with auto-shutdown 1312.

In some embodiments, a worker 1328a accesses the next available job 1314a from queue 1312. Available jobs 1314a-1314n are marked as "untaken" in the job queue 1312. Worker 1328a accesses the production request data from test data repository 1316 as indicated by the job 1314a and replays the production request data to the production service 1332. In some embodiments, one of workers 1328a-1328n is generic such that any implemented worker can access any untaken job, regardless of the nature of the test plan and/or production service. When a worker 1328 accesses a job (e.g., test job) from queue 1312, the job 1314 is marked as "taken" and that job 1314 is ineligible to be taken by other workers 1328, in some embodiments. However, as discussed above, a job 1414 remains in queue 1312 until completed. After a predefined amount of time has elapsed without a "taken" job being completed, the job may again be marked as "untaken" and become available for a worker 1328 to accesses. Worker 1328 retrieves the production request test data repository 1316 indicated by job 1314. Worker 1328 decrypts the production request data from test data repository 1316 and applies any instructions from job 1314 to the decrypted production request data. An example of an instruction may be transforming the date and time of the production data to the current date and time prior to posting job 1314 to network-based production service 1322. Worker 1328 then replays the client requests captured in the production request data to network-based production service 1322.

In some embodiments, auto-scaler 1326 scales the number of workers 1328a-1328n in response to metrics. The quantity of workers 1328a-1328n implemented by load generator 1324 may scale up or increase in response to one or more metrics. The quantity of workers implemented by load generator 1324 may scale down in response to one or more metrics. In addition, workers may be scaled separately from the controllers implementing the test plan. For example, controllers may scale in response to the quantity of jobs that will be submitted to the job queue 1312, whereas workers may be scaled in response to the quantity of jobs already in job queue 1312. In some embodiments, the metrics for determining scaling of workers 1328 are one or more job quantity metrics and/or one or more worker load metrics. A job quantity metric monitors the quantity of jobs 1314 in queue 1312 and in response to the quantity of jobs exceeding a given threshold, auto-scaler 1326 may implement more workers under the direction of scalable production load test service 1322. A worker load metric comprises monitoring system metrics such as memory usage, CPU usage, disk usage and/or network usage for the computing resource(s) used to implement the worker(s). In response to at least one of these metrics being above a threshold, more workers may be implemented by load generator 1324.

In addition, in some embodiments, auto-scaler 1326 scales (e.g. increases or decreases) the implementation of workers 1328 at the direction of scalable production load test service 1322 in a predictive manner. In some embodiments, since the test plan is known and the available production request data for replay is known, auto-scaler 1326 can look ahead at the plan or the production request data to determine how to scale workers 1328. For example, in response to the look ahead, auto-scaler 1326 schedules an increase or decrease in the number of workers based on the predicted change according to the test plan. Auto-scaler 1326 can scale workers 1328 at the direction of scalable production load test service 1322 in advance of or concurrently with controller 1304a-n and/or test plan executor 1308 creating and submitting jobs 1314a-1314n in queue 1312. For example, if there are currently 800 workers and twenty minutes from now the load will increase by 10%, 80 more workers may be initiated (e.g., gradually) in preparation for the increase in load. Conversely, if the load will decrease by 10% in the near future, 80 workers may be slowly decommissioned.

In some embodiments, auto-shutdown module 1318 is implemented to monitor and preserve the health of network-based production service 1332 and/or other computing resources used to carry out the test. Auto-shutdown module 1318 is configured to monitor one or more system metrics and determine whether to shut down the test load on the production service 1332 in response to the system metrics. In some embodiments, the system metrics include the number of test jobs in the job queue (e.g., queue 1312), the number of untaken jobs in the job queue and/or the number of taken test jobs in the job queue. In some embodiments, auto-shutdown 1318 compares the metrics described above to a given threshold to determine if auto-shutdown is needed. In some embodiments, if the size of queue 1312 grows such that workers 1328a-1328n are not accessing jobs at an expected rate, auto-shutdown 1318 instructs controller 1304a-1304n to shut down and/or delete the queue 1312. In some embodiments, if there are too many taken jobs or too many untaken jobs in queue 1312, auto-shutdown 1318 instructs controller 1304 to shut down and/or delete the queue 1312. Too many taken jobs 1314 may indicate that there are too many jobs applied to network-based production service 1322 or that workers 1328 are stalled on particular jobs posted to network-based production service 1332, for example. Too many untaken jobs may be indicative that workers 1328a-1328n may not be able to handle the current load, for example. In some embodiments, when a maximum number of workers is reached auto-shutdown 1318 shuts down scalable production load test service 1322. If the maximum number of allocated workers (e.g. workers 1328a-1328n) is reached and more workers 1328a-1328n are necessary to complete the jobs, for example, that may be indicative of problems in scalable production load test service 1322. In some embodiments, the success rate of each worker 1328a-1328n is monitored to determine the number of jobs handled successfully and unsuccessfully. If a certain percentage of jobs are failing in a pre-determined amount of time, auto-shutdown 1318 will shut down the worker. In some embodiments, workers 1328a-1328n will automatically shut down in response to reaching a certain percentage of failing jobs, for example. In some embodiments, if too many (e.g., compared to a threshold) workers 1328a-1328n are auto-shutdown, auto-shutdown 1318 will instruct controller 1304 to also shutdown (e.g., delete the job queue 1312 and stop the test). Too many workers 1328a-1328n shutting down may indicate larger issues such as network problems or problems with network-based production service 1332 under test, for example.

Load Execution

Returning to FIG. 13A, the user can set up a load test using a load generation framework 1340 of scalable production test system 1320. In some embodiments, in response to a load test specification received by the scalable production load test service, the plurality of computing devices is configured to dynamically allocate one or more resources to perform a load test of the network-based production service according to the load test specification. In some embodiments, the load test specification received by the scalable production load test service includes a description of acceptable execution timing for the sending from the scalable production load test service to the network-based production service transactions based on the generated load.

In some embodiments, the user will first set up load drivers 1350. A load driver is a Java JAR file that contains classes for interacting with the user's product (e.g., network-based production services 1300a-n or 1370a-n) that conform to a specific API of load generator 1340.

LoadDriver LoadGenerationCloudService.uploadLoadDriver(
Jar driver)

As the load generation framework 1340 is generic, load drivers 1350 will in some embodiments reflect knowledge of how to apply a transaction to the service under test (e.g., network-based production services 1300a-n or 1370a-n). Load drivers 1350 access test data repository 1330 data and can query data that matches specific time frames, a specific category, or specific key-value pairs.

When this call is made, the load generation framework 1340 stores the local JAR file in another storage and its id and a link to the location in storage in its database. Later, when the user starts a load test that uses that load driver 1350, the framework copies the JAR file from storage to each computing instance of scalable production test system 1320 and creates a secondary classloader to bootstrap it into the system.

To start a load test, the user calls the start load method, specifying the driver that knows how to interact with the user's product, the data provider that contains the data the user wishes to replay, and a load definition.

LoadInformation {
LoadDriver getDriver( );
DataProvider getDataProvider( );
LoadDefinition getLoadDefinition( );
}
LoadId LoadGenerationCloudService.startLoad(
LoadInformation load);

This starts a load test. The user can use this handle to monitor it or terminate it. Users can also list current load tests running:

LoadId [ ] LoadGenerationCloudService.listLoads ( )

Users can get information on any specific load:
LoadInformation
LoadGenerationCloudService.getLoadInformation(
LoadId loadId);

Users can cancel a test running:
LoadGenerationCloudService.cancelLoad(LoadId loadId)

Figure 13E:
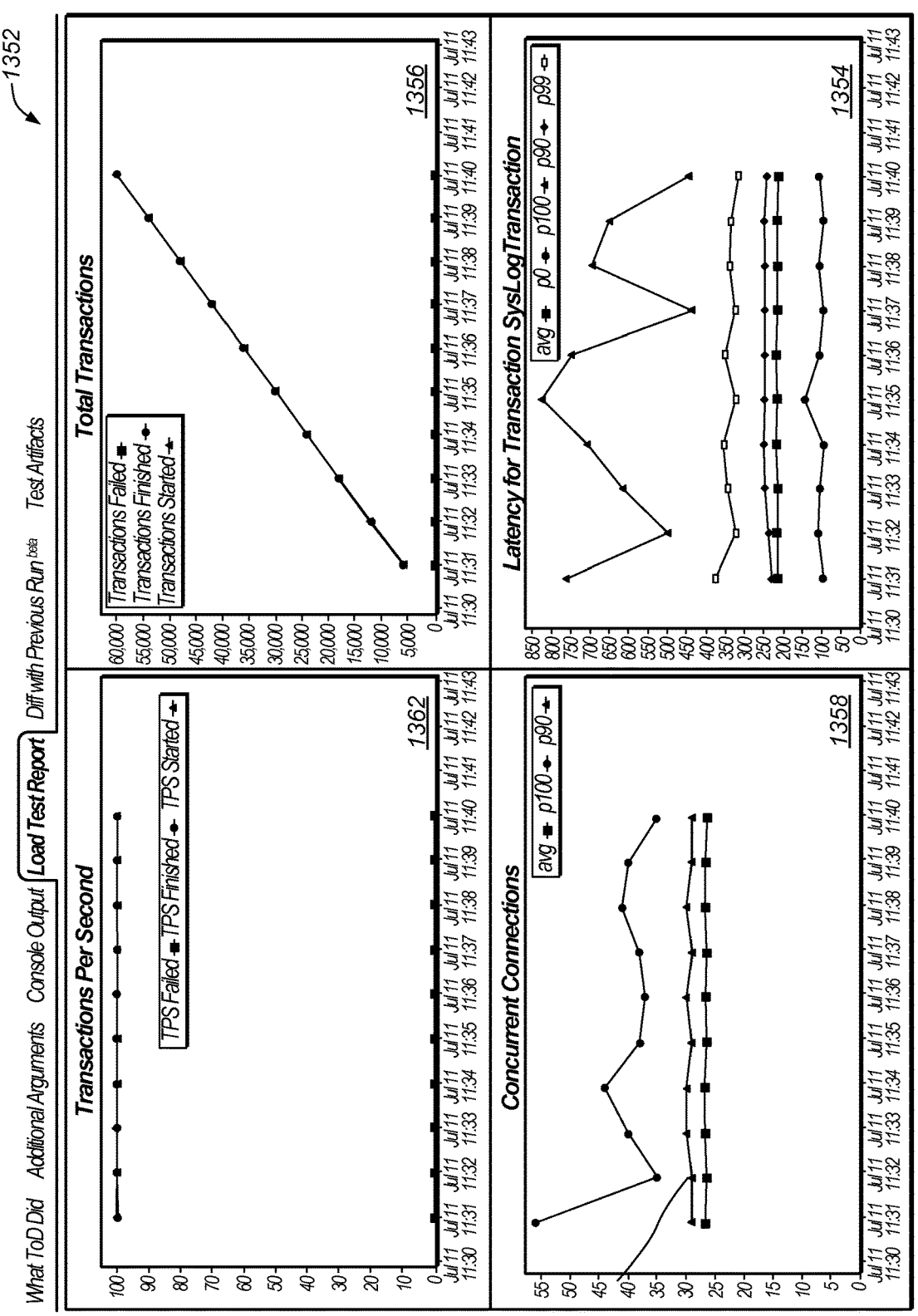
FIG. 13E depicts a dashboard for monitoring a load testing as a service in a shared computing system, according to one embodiment.

Some embodiments include a dashboard of metrics representing performance of the network-based production service during the load test of the network based production service using the dynamically allocated one or more resources. In one embodiment, As the framework is running, it is posting a number of performance metrics 1360:

Transactions per second
Concurrent connections held
Distribution (blend) of operations
Percentile latency metrics for each transaction type
Error rate FIG. 13E depicts a dashboard for monitoring a load testing as a service in a shared computing system, according to one embodiment. As shown a dashboard interface 1352 includes a latency window 1354, a total transaction window 1356, a concurrent connection window 1358 and a transaction rate window 1362.

Metrics that may be shown in transaction rate window 1362 include:

Transactions per second (minute metrics)
Started
Finished
Failed
Skipped

Metrics that may be shown in total transaction window 1356 include:

Total transactions (running sums)
Started
Finished
Failed
Skipped

Metrics that may be shown in concurrent connection window 1358 include:

Concurrent connections
Percentile metrics (p0, p50, p90, p99, p99.9, p99.99, p100)

Metrics that may be shown in latency window 1354 include:

Latency for each transaction (minute metric)
Percentile metrics (p0, p50, p90, p99, p99.9, p99.99, p100)

Additionally, windows not shown but supported by an embodiment of dashboard interface 1352 include:

Dynamic status charts:
Change in latency as TPS (transactions per second) increases
Change in reliability (% failed) as TPS increases
Increase in payload Hardware metrics
  On the load gen host(s)
  On the host(s) of the service under test
  These would be:
    CPU usage
    Memory usage
    Network bandwidth (in/out)
    Disk usage Load Information arrives with a pointer to the LoadGenerationCloudService dashboard. The dashboard is a UI that shows the user to see charts real time, in a graphical manner. Other graphs available in the dashboard:
  Number of machines being used to generate the load
  Standard AWS hardware metrics for these (CPU, Memory, Disk, Network, . . . )

In some embodiments, replays of existing production traffic may be run at the same rate at which it came in. In this mode, the user has saved production traffic to the test data repository 1330. The user can specify that the data should be replayed in the Load Definition object. Test load generation framework 1340 reads from the test data repository 1330, places pointers to the individual files a SQS queue, and has workers reading and executing these messages. Hosts are automatically provisioned to handle the expected load, based on auto-scaling and metrics.

To perform the load test the network-based scalable production load test service is configured to generate a load for load testing the network-based production service based at least in part on the items of transaction data for the network based production service in the load test data repository, send from the scalable production load test service to the network-based production service transactions based on the generated load, and collect performance metrics indicating performance of the load test on the network-based production service. In some embodiments, traffic generation at artificial rates is provided (i.e. specific number of transaction per seconds, or synthetic blend of transaction types), either using real production traffic or artificial data. Hosts are automatically provisioned to handle the expected load, based on auto-scaling and metrics.

In some embodiments, the plurality of computing devices is configured to perform the load test of the network-based production service using the dynamically allocated one or more resources. In terms of hardware usage, the framework starts with a blend of hardware types (e.g., m1.small, m1.large, m1.xlarge, etc.), and it monitors what hardware type gives the most effective throughput, and adjusts the hardware allocation automatically under the hood, without the user having to specify it. Scalable test production service generates performance metrics 1360.

Pricing Scheme

Some embodiments include a billing interface representing costs associated with performance of the load test of the network based production service using the dynamically allocated one or more resources. Some embodiments include a dashboard of utilization metrics comprising metrics representing cost of resource consumption by the network-based production service during the load test of the network based production service. Some embodiments include an order interface representing costs expected to be associated with selectable options for performance of the load test of the network based production service using the dynamically allocated one or more resources, and controls for selecting the selectable options to adjust selection of the one or more dynamically allocated resources. Some embodiments allow scalable production test system 1320 to implement a pricing scheme that takes into account:

Elastic computing instances that need to support traffic generation and data transforms
  Storage costs for storing the production data
  SQS costs for the controller/queue/worker scheme
  DB costs for storing the metadata related to services.

Security

Some embodiments include a mechanism for whitelisting endpoints (e.g., network-based production services 1300a-n or 1370a-n) that scalable production tests system 1320 can hit with a load test, thereby preventing malicious Denial of Service attacks. In order to prevent these, some embodiments whitelist the endpoints (e.g., network-based production services 1300a-n or 1370a-n), and only apply load incrementally without proof of a legitimate user, e.g. through heuristics for having to build a reputation before mass loading. Users have a reputation that allow them to generate load up to a certain limit in their Tier, until they get approved to test at the next tier (which allows a higher number of transactions per second).

Some embodiments provide generic load generation as a native cloud service on a provider network 1390. Such embodiments abstract the hardware pains of load testing by using the cloud to automatically find the right hardware type and the right amount of hardware to apply any load. Such embodiments also abstract the pains of storing and retrieving production data for replay.

Some embodiments provide a test data repository 1330 as a native part of a generic load generation framework 1340 as a service of a provider network 1390, which offers the ability to save production data and tag it with an interval and key value pairs. This data can later be retrieved for traffic replays. With cloud storage some embodiments can offer features such as an automatic retention period to reduce storage costs. In some embodiments, filtering the items of transaction data is supported to eliminate from the transaction data repository items of transaction data that have remained in the repository past a useful lifespan representing common occurrence of a transaction type of the data.

Some embodiments provide data transforms 1375 automatically and elastically operating on data as it is ingested by a test data repository 1330. Data transforms 1375 can filter out sensitive data and/or modify fields in the data. In some embodiments, to capture to the load test data repository the items of transaction data, the network-based scalable production load test service is configured to filter the items of transaction data to eliminate from the transaction data repository items of transaction data for which persistence is forbidden. Additionally, data transforms can categorize the data into buckets (categories) that can be individually fetched later during traffic replay.

Some embodiments provide a data provider 1380 in the scalable production test service 1320, with a layer on top of the test data repository 1330 that can be used for fetching data saved to the TDR 1330 for traffic generation in a load test. Some embodiments provide a mechanism for uploading a JAR that implements the product-specific code that knows how to interact with the product under test. This JAR is stored in provider network storage, and automatically copied over to all the instances running load by the framework. The framework creates a secondary Java classloader where it safely loads it for executing the test.

In some embodiments, the network-based scalable production load test service is configured to present a dashboard of metrics representing performance of the network-based production service. Some embodiments provide dashboards of performance metrics 1360 that are offered as part of the UI of the scalable production test service 1320. They include transactions per second, concurrent connections, distribution of operations, percentile latency metrics for each transaction type, error rate, number of hosts utilized (and type), and hardware metrics for the hosts generating the load. Some embodiments include a dashboard of metrics representing comparison between performance of the network-based production service during load testing of the network-based production service specified by the load test specification and a predictive model of the performance of the network-based production service during load testing of the network-based production service specified by the load test specification. Some embodiments provide scalable production test service 1320 that allow the same load generation framework 1340 to either do replays at the exact rate at which data came in or achieve artificial rates or blends.

In some embodiments, to generate the load for load testing the network-based production service based at least in part on the items of transaction data for the network based production service in the load test data repository, the network-based scalable production load test service is configured to assemble load test transaction inputs according to a mix of load test transaction types different from a mix of transaction types present in the items of transaction data at said capturing. Some embodiments provide heuristics for automatically selecting the best hardware type of the provider network 1390 for a run based on optimal throughput and latency given the cost of the hardware type. Some embodiments provide a pricing scheme for a scalable production test service 1320. Some embodiments provide security heuristics for a scalable production test service 1320 to build a "reputation" that allows the user to generate a certain tier of load, until approved for the next tier.

Figure 14A:
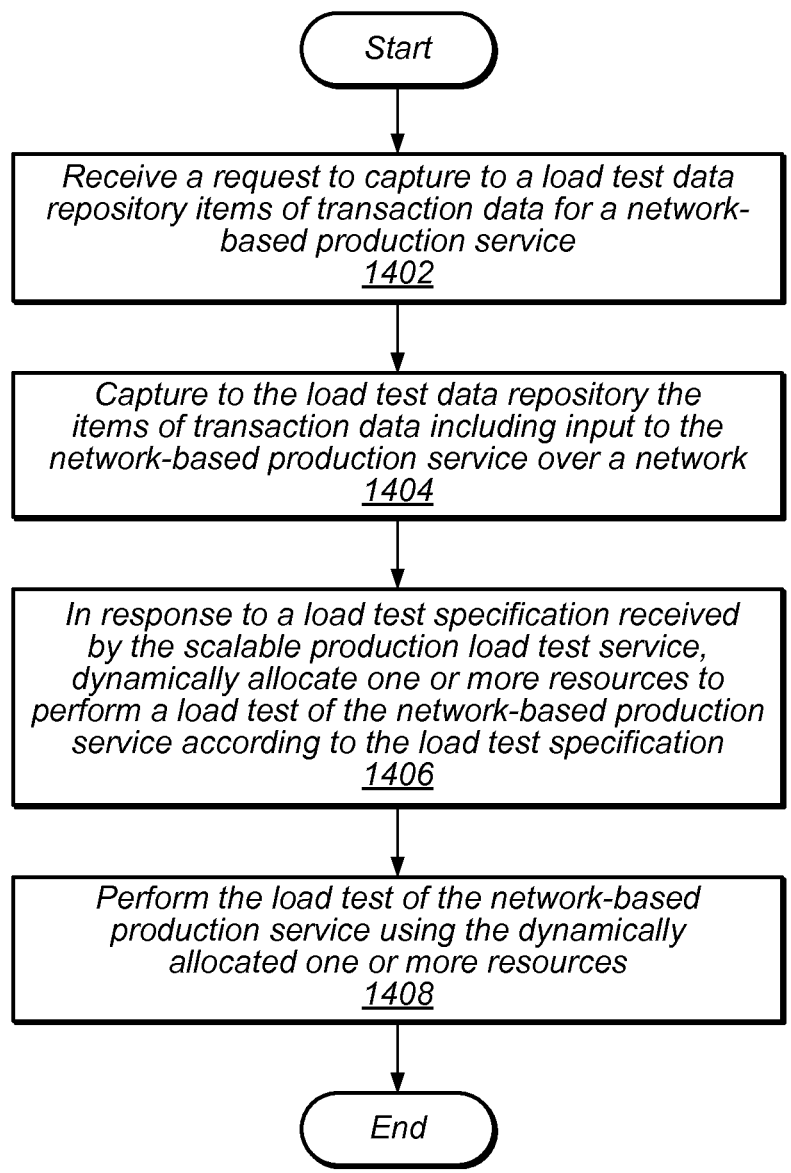
FIG. 14A is a flowchart illustrating one embodiment of a method for providing load testing as a service in a shared computing system, as described herein.

FIG. 14A is a flowchart illustrating one embodiment of a method for providing load testing as a service in a shared computing system, as described herein. A request to capture to a load test data repository items of transaction data for a network-based production service is received, for example, by scalable production load test service 1320 of FIG. 13A, which is described above (block 1402). Items of transaction data including input to the network-based production service over a network are captured to the load test data repository, for example, by test data repository 1330 of FIG. 13A, which is described above (block 1404). In response to a load test specification received by the scalable production load test service, one or more resources are dynamically allocated to perform a load test of the network-based production service according to the load test specification, for example, by a controller 1304 of FIG. 13D, which is described above (block 1406). The load test of the network-based production service is performed using the dynamically allocated one or more resources, for example, by scalable production load test service 1320 of FIG. 13A, which is described above (block 1408).

Figure 14B:
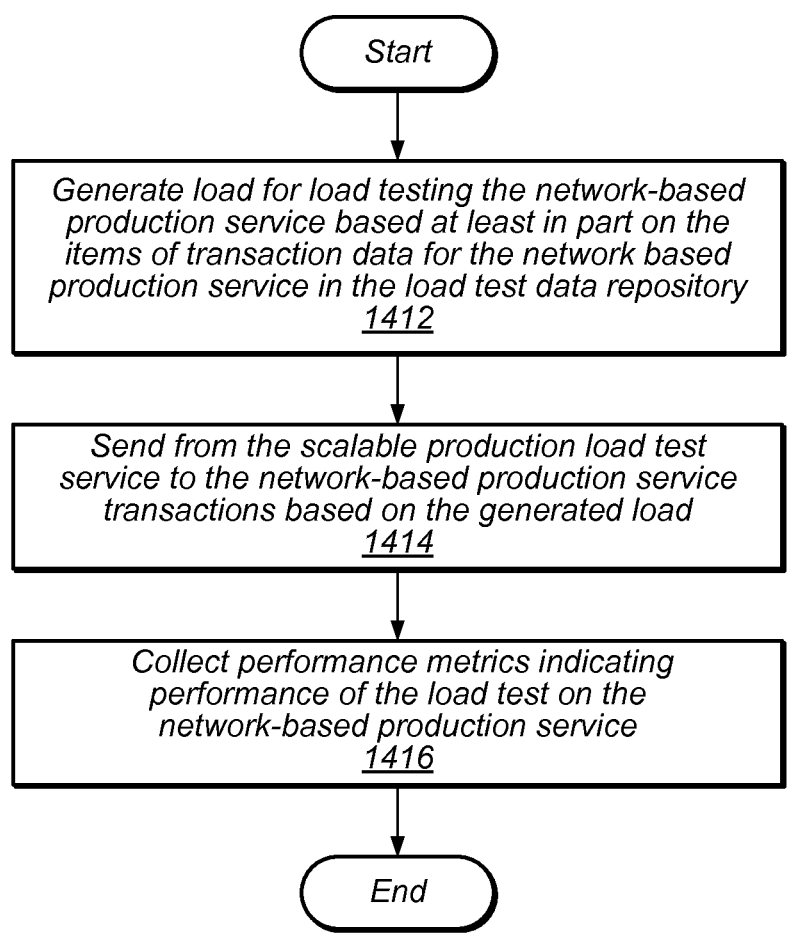
FIG. 14B is a flowchart illustrating one embodiment of a method for performing the load test of the network-based production service as part of providing load testing as a service in a shared computing system, as described herein.

FIG. 14B is a flowchart illustrating one embodiment of a method for performing the load test of the network-based production service as part of providing load testing as a service in a shared computing system, as described herein. A load for load testing the network-based production service based at least in part on the items of transaction data for the network based production service in the load test data repository is generated, for example, by load generation framework 1340 of FIG. 13A, which is described above (block 1412). Transactions based on the generated load are sent from the scalable production load test service to the network-based production service, for example, by scalable production load test service 1320 of FIG. 13A, which is described above (block 1414). Performance metrics indicating performance of the load test on the network-based production service are collected, for example, by scalable production load test service 1320 of FIG. 13A, which is described above (block 1416).

Figure 14C:
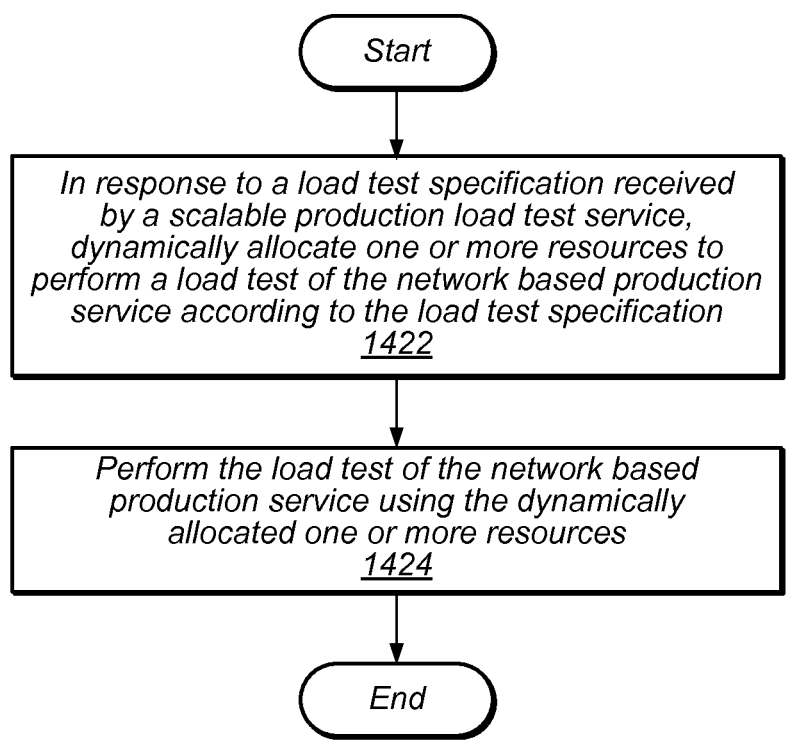
FIG. 14C is a flowchart illustrating one embodiment of a method for providing load testing as a service in a shared computing system, as described herein.

FIG. 14C is a flowchart illustrating one embodiment of a method for providing load testing as a service in a shared computing system, as described herein. In response to a load test specification received by a scalable production load test service, one or more resources is dynamically allocated by a scalable production load test service to perform a load test of the network based production service according to the load test specification, for example, by a controller 1304 of FIG. 13D, which is described above (block 1422). The load test of the network based production service is performed using the dynamically allocated one or more resources, for example, by scalable production load test service 1320 of FIG. 13A, which is described above (block 1424).

Figure 14D:
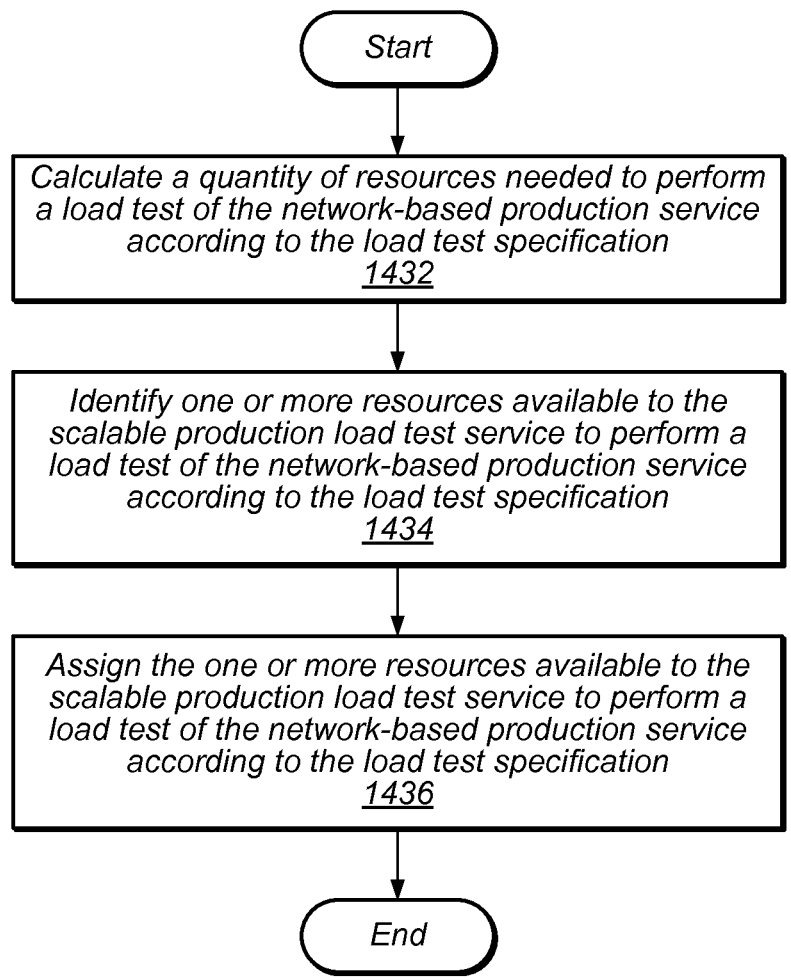
FIG. 14D is a flowchart illustrating one embodiment of a method for dynamically allocating one or more resources to perform a load test as part of providing load testing as a service in a shared computing system, as described herein.

FIG. 14D is a flowchart illustrating one embodiment of a method for dynamically allocating one or more resources to perform a load test as part of providing load testing as a service in a shared computing system, as described herein. A quantity of resources needed to perform a load test of the network-based production service according to the load test specification is calculated, for example, by a controller 1304 of FIG. 13D, which is described above (block 1432). One or more resources available to the scalable production load test service to perform a load test of the network-based production service according to the load test specification is identified, for example, by a controller 1304 of FIG. 13D, which is described above (block 1434). The one or more resources available to the scalable production load test service is assigned to perform a load test of the network-based production service according to the load test specification, for example, by a controller 1304 of FIG. 13D, which is described above (block 1436).

Figure 14E:
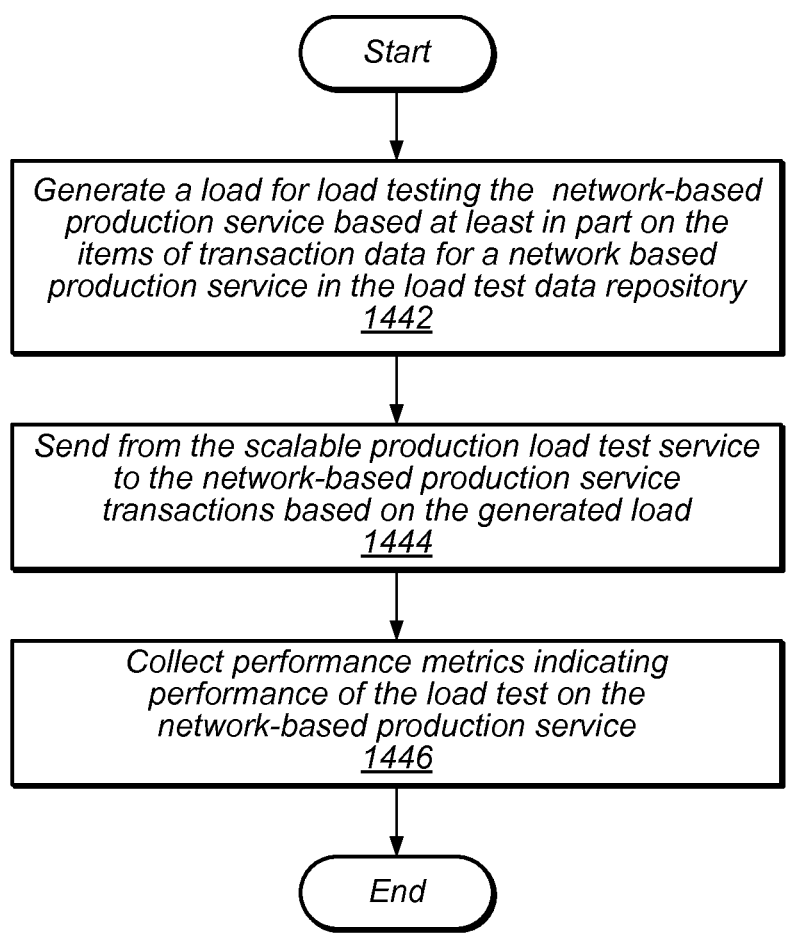
FIG. 14E is a flowchart illustrating one embodiment of a method for performing the load test of the network-based production service as part of providing load testing as a service in a shared computing system, as described herein.

FIG. 14E is a flowchart illustrating one embodiment of a method for performing the load test of the network-based production service as part of providing load testing as a service in a shared computing system, as described herein. A load is generated for load testing the network-based production service based at least in part on the items of transaction data for a network based production service in the load test data repository, for example, by a load generator 1324 of FIG. 13D, which is described above (block 1442). Transactions based on the generated load are sent from the scalable production load test service to the network-based production service, for example, by a network based virtual computing service 1338 of FIG. 13D, which is described above (block 1444). Performance metrics indicating performance of the load test on the network-based production service are collected, for example, by a scalable production load test service 1320 of FIG. 13A, which is described above (block 1446).

Figure 14F:
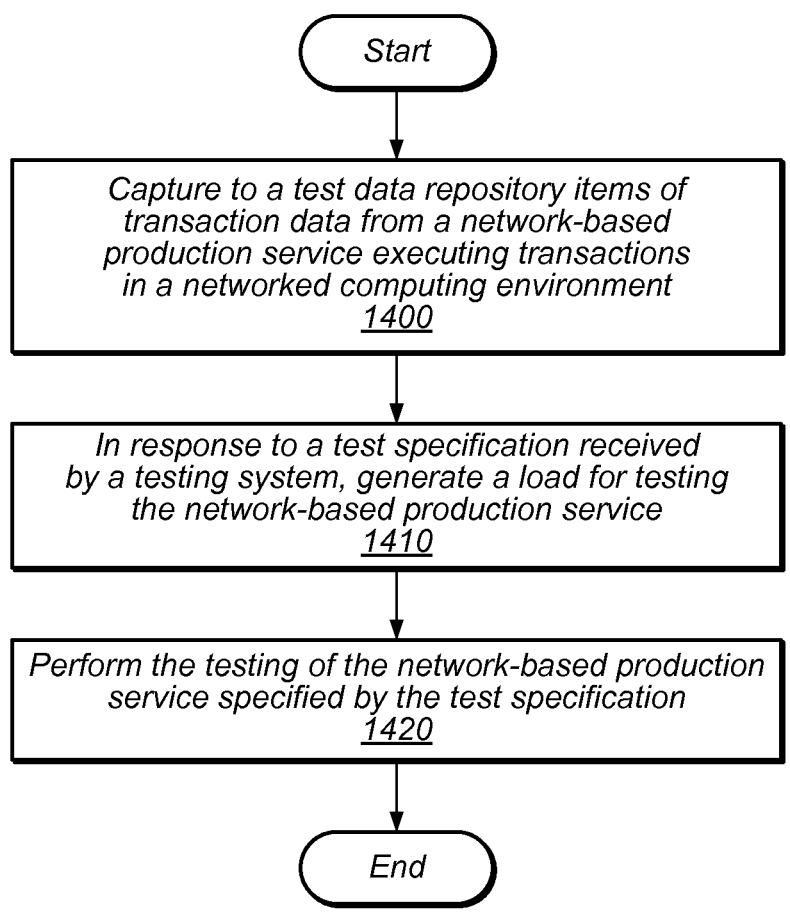
FIG. 14F is a flowchart illustrating one embodiment of a method for providing load testing as a service in a shared computing system, as described herein.

FIG. 14F is a flowchart illustrating one embodiment of a method for providing load testing as a service in a shared computing system, as described herein. Items of transaction data from a network-based production service executing transactions in a networked computing environment are captured to a test data repository, for example, by a test data repository 1330 of FIG. 13A, which is described above (block 1400). In response to a test specification received by a testing system, a load for testing the network-based production service is generated, for example, by a load generation framework 1340 of FIG. 13A, which is described above (block 1410). The testing of the network-based production service specified by the test specification is performed, for example, by load drivers 1350 of FIG. 13A, which is described above (block 1420).

Figure 14G:
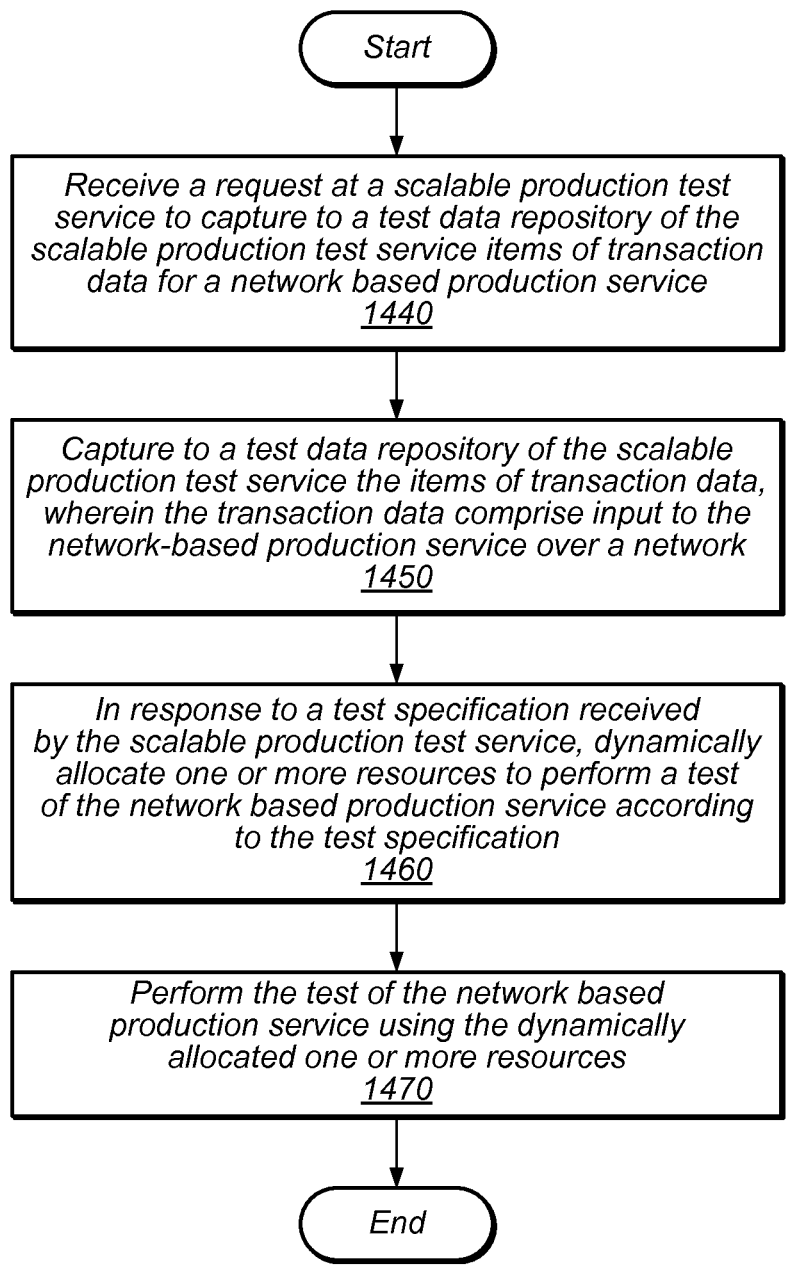
FIG. 14G is a flowchart illustrating one embodiment of a method for providing load testing as a service in a shared computing system, as described herein.

FIG. 14G is a flowchart illustrating one embodiment of a method for providing load testing as a service in a shared computing system, as described herein. At a scalable production test service a request to capture to a test data repository of the scalable production test service items of transaction data for a network based production service is received, for example, by a scalable production load test service 1320 of FIG. 13A, which is described above (block 1440).

The items of transaction data, including transaction data that include input to the network-based production service over a network are captured to a test data repository of the scalable production test service, for example, by a test data repository 1330 of FIG. 13A, which is described above (block 1450). In response to a test specification received by the scalable production test service, one or more resources are dynamically allocated to perform a test of the network based production service according to the test specification, for example, by a controller 1304 of FIG. 13D, which is described above (block 1460). The test of the network based production service is performed using the dynamically allocated one or more resources, for example, by a load driver 1350 of FIG. 13A, which is described above (block 1470).

Some embodiments include a method for performing non-deterministic load testing of a network-based production service. In some embodiments, the method includes performing, using a load testing system implemented on one or more computers, receiving a load testing specification. The load testing specification indicates one or more load testing conditions for performing non-deterministic load testing of a network-based production service executing transactions in a networked computing environment. In some embodiments, the method further includes requesting from the virtual computing service resources to perform the non-deterministic load testing of the network-based production service, and performing the non-deterministic load testing of the network-based production service. The non-deterministic load testing comprises executing test transactions on the network-based production service at pseudo-randomly varying times to measure system performance of the network-based production service at a plurality of levels of transaction intensity.

In some embodiments, the method further includes, based at least in part on a load testing specification, identifying a quantity of virtual computing instances to be acquired from a virtual computing service and used as the resources to perform the non-deterministic load testing of the network-based production service. The virtual computing service offers virtual computing instances supplied in a market in which price varies based on demand. In some embodiments, the method further includes determining a bid price at which to place bids in the market for the quantity of virtual computing instances required to perform the non-deterministic load testing of the network-based production service. The bid price is determined based at least in part on historical pricing data for the virtual computing service such that the load testing will be performed in a non-deterministic manner with respect to time. In some embodiments, the method further includes forecasting an expected likelihood of completion of a testing regimen described in the load testing specification at the bid price.

In some embodiments, the method further includes presenting an interface comprising one or more details of the load testing specification, the forecast, and one or more controls for modifying the one or more details of the load testing specification, responsive to actuation of at least one of the one or more controls for modifying the one or more details of the load testing specification, iterating the identifying, determining and forecasting, and presenting through the interface a revised forecast resulting from the iterating the identifying, determining and forecasting steps.

In some embodiments, the method further includes based at least in part on the load testing specification, identifying a quantity of virtual computing instances to be acquired from a virtual computing service and used as the resources to perform the non-deterministic load testing of the network-based production service. The virtual computing service offers virtual computing instances supplied in a market in which price varies based on demand, and the identifying includes identifying instances available at a minimum possible total price ceiling for performing a complete regimen of load testing of the network-based production service specified by the load testing specification within a time window specified by the load testing specification.

In some embodiments, the method further includes, based at least in part on the load testing specification, identifying a quantity of virtual computing instances to be acquired from a virtual computing service and used as the resources to perform the non-deterministic load testing of the network-based production service. The virtual computing service offers virtual computing instances supplied in a market in which price varies based on demand, and the identifying a quantity of virtual computing instances to be acquired from a virtual computing service to perform the non-deterministic load testing of the network-based identifying a quantity of virtual computing instances to maximize load test duration within a total price ceiling.

In some embodiments, the load testing specification comprises a description of unacceptable execution time windows for performing the testing, and the performing the non-deterministic load testing of the network-based production service further includes suspending testing during the unacceptable execution time windows.

In some embodiments, the method further includes collecting performance metrics indicating performance of the load test on the network-based production service, and responsive to one or more of the metrics exceeding a threshold, suspending testing.

Some embodiments include a system for non-deterministic load testing. In some embodiments, the system includes at least one processor on a computing system, and a memory comprising program instructions. In some embodiments, the program instructions are executable by the at least one processor to receive a load testing specification. The load testing specification indicates one or more load testing conditions for performing non-deterministic load testing of a network-based production service executing transactions in a networked computing environment. The non-deterministic load testing includes executing test transactions on the network-based production service at pseudo-randomly varying times to measure system performance of the network-based production service at a plurality of levels of transaction intensity.

In some embodiments, the program instructions are executable by the at least one processor to, based at least in part on the load testing specification, identify a quantity of virtual computing instances to be acquired from a virtual computing service to perform the non-deterministic load testing of the network-based production service. The virtual computing service offers virtual computing instances supplied in a market in which price varies based on demand. In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying instances available below a price ceiling per recurring time period specified by a resource pricing condition for performing load testing of the network-based production service.

In some embodiments, the program instructions are executable by the at least one processor to, based at least in part on the load testing specification, determine a bid price for the quantity of virtual computing instances required to perform the non-deterministic load testing of the network-based production service. The bid price is determined based at least in part on historical pricing data for the virtual computing service such that the load testing will be performed in a non-deterministic manner with respect to time.

In some embodiments, the program instructions are executable by the at least one processor to request from the virtual computing service the quantity of virtual computing instances at the determined bid price to perform the non-deterministic load testing of the network-based production service.

In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying from a spot market instances available within a price range specified by a resource pricing condition for performing load testing of the network-based production service specified by the load testing specification within a time window specified by the load testing specification.

In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying an instance available below a per-instance price ceiling specified by a resource pricing condition for performing load testing of the network-based production service specified by the load testing specification within a time window specified by the load testing specification.

In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying instances available below a total price ceiling specified by the resource pricing condition for performing a complete regimen of load testing of the network-based production service specified by the load testing specification within a time window specified by the load testing specification.

In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying instances available below a total price ceiling specified by the resource pricing condition for performing a complete regimen of load testing of the network-based production service specified by the load testing specification within a time window specified by the load testing specification.

In some embodiments, the program instructions executable by the at least one processor to identify a quantity of virtual computing instances to be acquired from a virtual computing service to perform the non-deterministic load testing of the network-based production service further include program instructions executable by the at least one processor to perform identifying instances available below a total price ceiling specified by the resource pricing condition for performing a complete regimen of load testing of the network-based production service specified by the load testing specification within a time window specified by the load testing specification. The set of computing system instances is optimized to maximize a peak of load testing traffic delivered to the network-based production service.

Some embodiments include a non-transitory computer-readable storage medium storing program instructions. In some embodiments, the program instructions are computer-executable to implement, based at least in part on a load testing specification, identifying a quantity of virtual computing instances to be acquired from a virtual computing service to perform the non-deterministic load testing of the network-based production service. The virtual computing service offers virtual computing instances supplied in a market in which price varies based on demand. The load testing specification indicates one or more load testing conditions for performing non-deterministic load testing of a network-based production service executing transactions in a networked computing environment.

In some embodiments, the program instructions are computer-executable to implement requesting from the virtual computing service the quantity of virtual computing instances to perform the non-deterministic load testing of the network-based production service. In some embodiments, the program instructions are computer-executable to implement, performing the non-deterministic load testing of the network-based production service using the virtual computing instances. The non-deterministic load testing comprises executing test transactions on the network-based production service at pseudo-randomly varying times to measure system performance of the network-based production service at a plurality of levels of transaction intensity.

In some embodiments, the program instructions are computer-executable to implement collecting performance metrics indicating performance of the load test on the network-based production service, responsive to one or more of the metrics exceeding a threshold, reducing intensity of testing. In some embodiments, the identifying a quantity of virtual computing instances to be acquired from a virtual computing service to perform the non-deterministic load testing of the network-based further comprises identifying a quantity of virtual computing instances to minimize load test duration as a percentage of a time window.

In some embodiments, the program instructions are computer-executable to implement presenting an interface comprising one or more details of the load testing specification, real-time performance metrics related to the testing, and one or more controls for modifying the one or more details of the load testing specification during execution, and, responsive to actuation of at least one of the one or more controls for modifying the one or more details of the load testing specification, iterating the identifying, determining and performing.

In some embodiments, the program instructions are computer-executable to implement presenting an interface comprising one or more details of the load testing specification, real-time budget expenditure metrics related to costs of the load testing, and one or more controls for modifying the one or more details of the load testing specification during execution. In some embodiments, the program instructions are computer-executable to implement, responsive to actuation of at least one of the one or more controls for modifying the one or more details of the load testing specification, iterating the identifying, determining and performing.

In some embodiments, the program instructions are computer-executable to implement collecting real-time cost metrics indicating costs of performance of the load test on the network-based production service, and responsive to one or more of the metrics exceeding a threshold, reducing intensity of testing. In some embodiments, the program instructions are computer-executable to implement collecting performance metrics indicating performance of the load test on the network-based production service, and, responsive to one or more of the metrics exceeding a threshold, reducing intensity of testing.

Figure 15A:
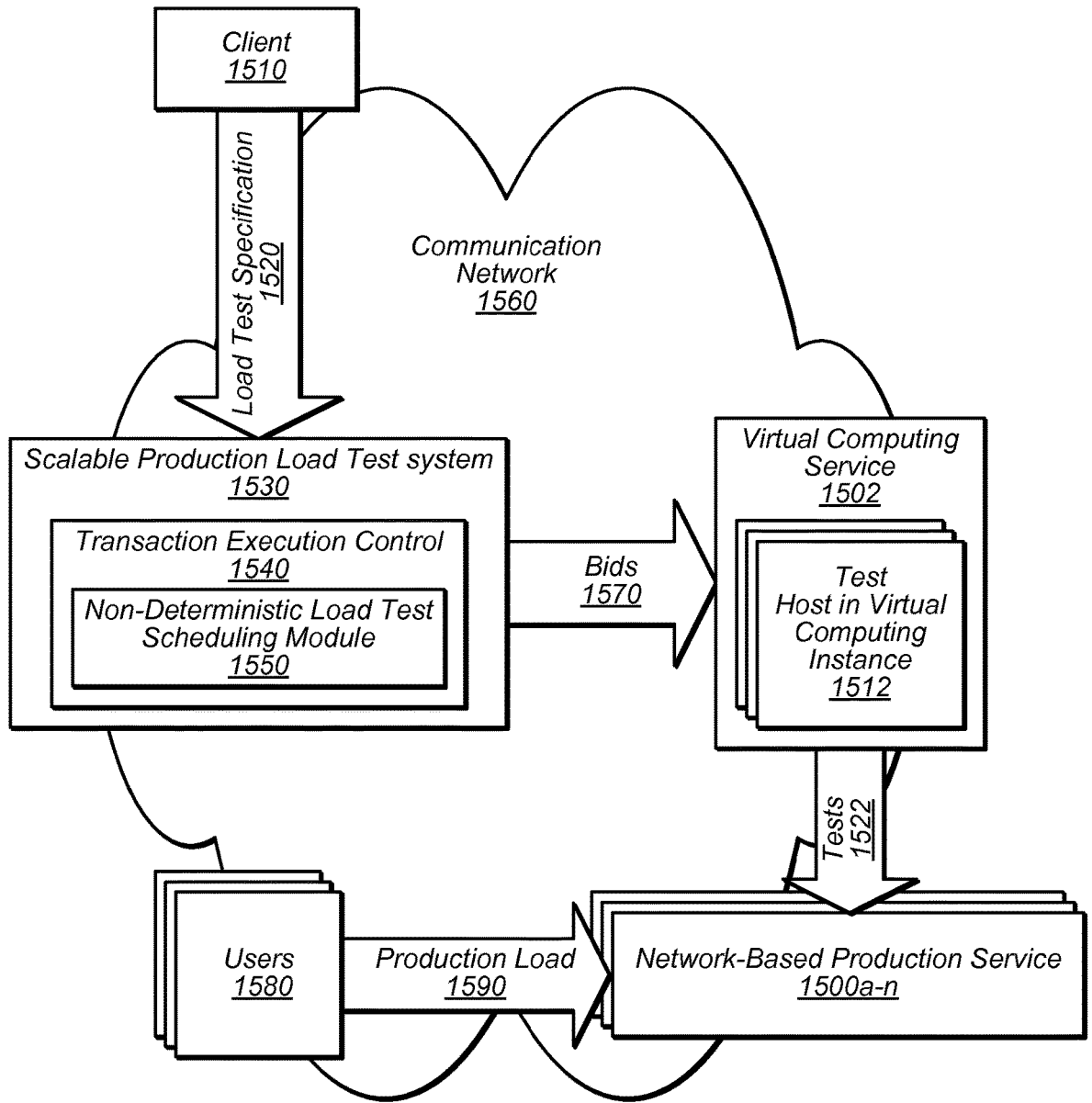
FIG. 15A is a logical block diagram illustrating an example system environment for a scalable production test system capable of providing non-deterministic load testing, according to one embodiment.

FIG. 15A is a logical block diagram illustrating an example system environment for a scalable production test system capable of providing non-deterministic load testing, according to one embodiment. A scalable production load test system 1530 includes a transaction execution control 1540 including a non-deterministic load test scheduling module 1550. The scalable production load test system 1530 generates performance metrics (not shown) reflecting performance of tests 1522 by a series of test hosts in virtual computing instances 1512 executing a test environment of a provider network (virtual computing service 1502), executing tests against network based production services 1500a-1500n on the basis of bids 1570 from the scalable production load test system 1530 in response to a load test specification 1520 received from a client 1510 over a communication network 1560, which also carries a production load 1590 from users 1580 of network based production services 1500a-1500n.

In some embodiments, a service owner (client 1510) interacting with scalable production load test system 1530 creates a load test specification 1520 for a load test job for execution by scalable production load test system 1530 on test hosts 1512. Rather that starting it and ending it deterministically based on a calendaring application, client 1510 interacting with scalable production load test system 1530 specifies criteria designating when transaction execution control 1540 can start testing and criteria when transaction execution control 1540 can end testing.

Between the designated start and end times, transaction execution control 1540 authorizes testing to start and end based on bids 1570 reflecting desired cost of the load test per time period (e.g., per hour, per day, per week or per month). For example, a user can specify that 'I want to spend no more than $50/day load testing,' through input to client 1510, and non-deterministic load test scheduling module 1550 allows bids 1570 for test hosts 1512 only at times during which the pricing information indicates that the needed tests hosts 1412 are available to test network based production services 1500a-1500n at the specified pricing conditions reflected in bids 1570.

In some embodiments, transaction execution control 1540 imposes a 'safety window, a time window during which it is safe to apply load to network based production services 1500a-1500n from tests hosts 1512 for testing purposes. For example, a user may not want to have on-call engineers deal with operational issues that stem from load testing outside business hours, and can therefore use an interface of client 1510 to specify that transaction execution control 1540 may only apply load to network based production services 1500a-1500n from tests hosts 1512 between 10 am and 4 pm, PST.

In some embodiments, transaction execution control 1540 allows a user to use an interface of client 1510 to specify that transaction execution module 1540 may apply load to network based production services 1500a-1500n from tests hosts 1512 with a maximum duration of the load test and desired peak of the load test. For example, a user may want to apply load for no more than 2 hours, or at no more than 100,000 transactions per second' and can therefore use an interface of client 1510 to specify that transaction execution module 1540 may only apply load to network based production services 1500a-1500n from tests hosts 1512 on at times at which heuristics within scalable production test system evaluate performance metrics indicate that current traffic patterns will not exceed the desired load.

As another example of use of peak performance metrics, a user can use an interface of scalable production load test system 1530 to specify that transaction execution module 1540 may only apply load to network based production services 1500a-1500n from tests hosts 1512 at times at which heuristics within scalable production test system evaluate performance metrics indicate that the network based production service 1500a-1500n hosts in the service remain under 70% CPU usage (after which point the system may be considered potentially compromised so load should stop growing or stop altogether).

Some embodiments will support auto-scaling as described elsewhere herein, such that if network based production service 1500a-1500n has auto-scaling enabled, a user can use an interface of scalable production load test system 1530 to specify that transaction execution module 1540 may only apply load to network based production services 1500a-1500n from tests hosts 1512 only when the service under test has n hosts behind the load balancer of network based production services 1500a-1500n running below a certain threshold.

In some embodiments, if the performance metrics include information on transactions per second or concurrent connections, a user can use an interface of scalable production load test system 1530 to specify that transaction execution module 1540 may only apply load to network based production services 1500a-1500n from test hosts 1512 only when the service under test has transactions per second or concurrent connections running below a certain threshold.

For example, if network based production service 1500a is receiving X transactions per second from real production traffic in production load 1590 from users 1580, a client 1510 can submit a test specification specifying that transaction execution module 1540 allow no more than X+Y transactions per second on network based production service 1500a at any given time. Network based production service 1500a know that at no point it is to apply more than Y transactions per second from test hosts 1512 for testing purposes. A user can specify multiple different thresholds. For example, a user can specify one threshold at which transaction execution module 1540 is to stop increasing load on network based production service 1500a, and another threshold at which to perform an emergency stop and stop applying load from test hosts 1512 altogether.

Virtual computing service 1502 estimates, in some embodiments, on how many instances it will need to generate the desired load through creation of test hosts 1512, and what results come from different hardware types (e.g., m1.small, m1.large, etc.). With every time test hosts 1512 run tests 1522, instance virtual computing service 1502 adjusts estimates based on the newly acquired data. If there is no prior data, virtual computing service 1502 spins a conservative amount of machines of different hardware types to run test hosts 1512, runs test hosts 1522 for a small amount of time, and stores enough data to make its first estimate.

Based on data from prior runs, virtual computing service 1502 can estimate how many instances it will need and for how long, and the desired cost, and transaction non-deterministic load test scheduling module 1550 calculates the optimal cost of instances for a requested run of tests 1522. Transaction execution control 1540 then requests by bids 1570 spot instances at that price from virtual computing service 1502. When the price of these spot instances drop below the target cost, the instances are allocated by Virtual computing service 1502 and test hosts 1512 execute tests 1522 on network based production services 1500a-1500n.

In some embodiments, if virtual computing service 1502 indicates that the prices of spot instances go up and down throughout the day, when test hosts 1512 execute tests 1422 on network based production services 1500a-1500n is non-deterministic.

Non-deterministic tests scheduling module 1550 provides functions for bids 1570 to control execution of test hosts 1512 executing tests on network based production services 1500a-1500n at random as a way to encourage 'avoiding failure by failing constantly'—having unexpected traffic peaks generated artificially in production (when its safe) so that the system is always proven to handle unexpected peaks, with a variety of different heuristics for bounding when and where artificial load can be applied to a production environment for testing purposes. Some embodiments leverage the concept of spot instances for doing load testing at approximately a tenth of the cost of doing this with dedicated virtual computing service instances, and even more cheaply than doing it with dedicated hardware.

Scalable production test system 1530 receives a load testing specification 1520. The load testing specification 1520 indicates one or more load testing conditions for performing non-deterministic load testing of a network-based production service 1500a-n executing transactions in a networked computing environment. The non-deterministic load testing includes executing test transactions on the network-based production service 1500a-n at pseudo-randomly varying times to measure system performance of the network-based production service 1500a-n at a plurality of levels of transaction intensity.

In some embodiments, scalable production test system 1530, based at least in part on the load testing specification 1520, identifies a quantity of virtual computing instances to be acquired from a virtual computing service 1502 to perform the non-deterministic load testing of the network-based production service 1500a-n. The virtual computing service 1500a-n offers virtual computing instances 1512 supplied in a market in which price varies based on demand.

In some embodiments, scalable production test system 1530, based at least in part on the load testing specification, determines a bid price for the quantity of virtual computing instances required to perform the non-deterministic load testing of the network-based production service 1500a-n. The bid price is determined based at least in part on historical pricing data for the virtual computing service 1502 such that the load testing will be performed in a non-deterministic manner with respect to time.

In some embodiments, scalable production test system 1530 requests, using bids 1570, from the virtual computing service 1502 the quantity of virtual computing instances 1512 at the determined bid price to perform the non-deterministic load testing of the network-based production service 1500a-n.

Figure 15B:
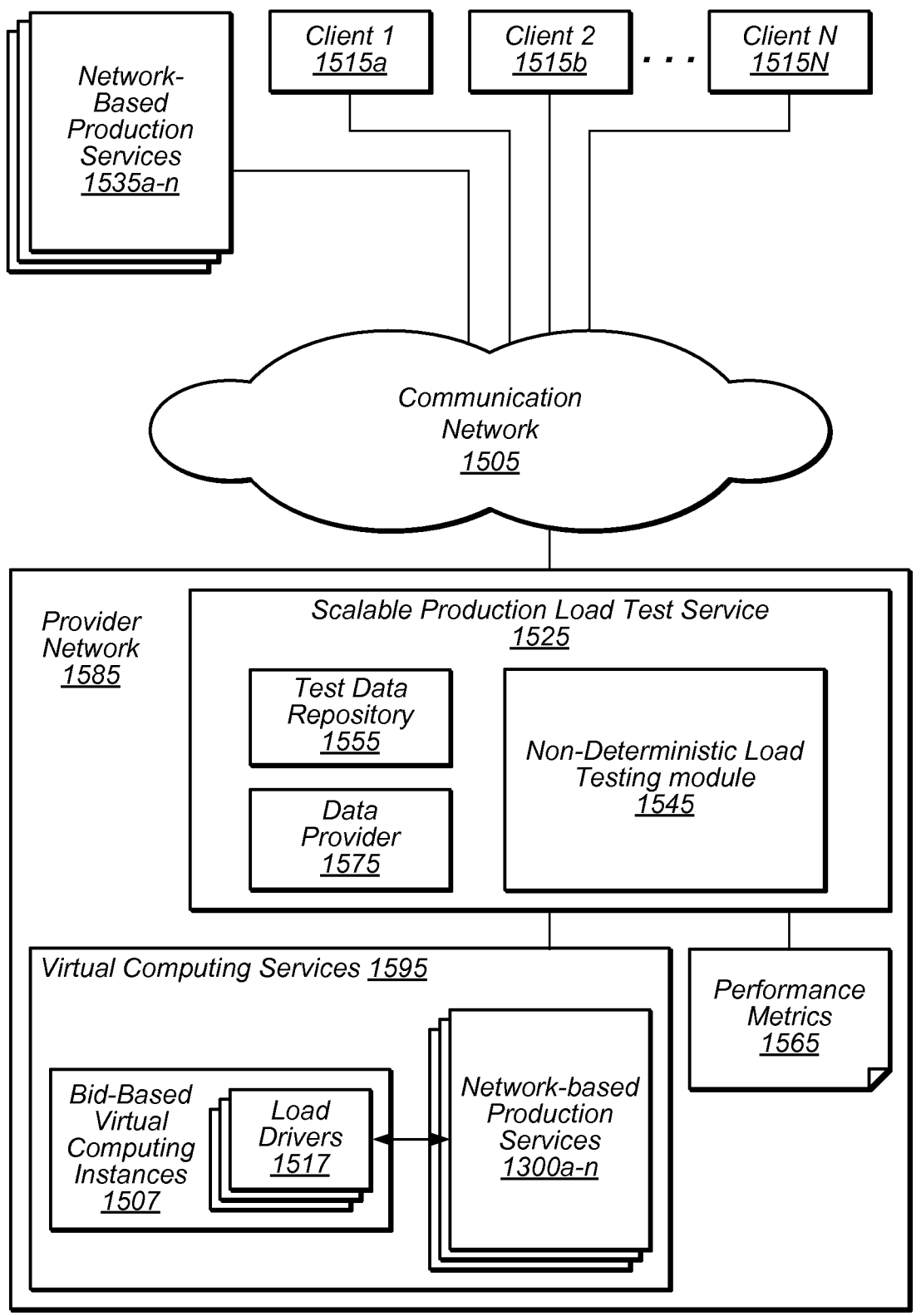
FIG. 15B is a logical block diagram illustrating an example system environment for a scalable production test system capable of providing non-deterministic load testing, according to one embodiment.

FIG. 15B is a logical block diagram illustrating an example system environment for a scalable production test system capable of providing non-deterministic load testing, according to one embodiment. A scalable production load test service 1525 executing on a provider network 1585 includes a non-deterministic load testing module 1545 (performing functions as described with respect to FIG. 15A) for executing tests of network based production services 1535a-n over a communication network 1505 and network based production services 1527a-n over a provider network 1585 using a test data repository 1555 and data provider 1575 as described elsewhere herein in response to requests from clients 1515a-n. The scalable production load test service 1525 generates performance metrics 1565 reflecting performance of tests by a series of test hosts implemented as load drivers 1517 in bid-based virtual computing instances 1507 executing a test environment in a virtual computing services environment 1595 of a provider network 1585, executing tests against network based production services 1527a-1500n and 1535a-n on the basis of bids (not shown) from the scalable production load test service 1525 in response to test specifications (not shown) received from clients 1510a-1515n over a communication network 1560, which also carries a production load from users of network based production services 1535a-1535n and 1527a-1527n.

In some embodiments, a service owner (e.g., client 1515a) interacting with scalable production load test service 1525 across communication network 1505 creates a test specification (not shown) for a load test job using load drivers 1517 for execution by scalable production load test service 1525 on bid-based virtual computing instances 1507. Rather that starting it and ending it deterministically based on a calendaring application, client 1515a interacting with scalable production load test service 1525 specifies criteria designating when non-deterministic load testing module 1545 can start testing and criteria when non-deterministic load testing module 1545 can end testing.

Between the designated start and end times, non-deterministic load testing module 1545 authorizes testing to start and end based on bids reflecting desired cost of the load test per time period (e.g., per hour, per day, per week or per month). For example, a user can specify that 'I want to spend no more than $50/day load testing,' through input to client 1515a, and non-deterministic load testing module 1545 allows bids for bid-based virtual computing instances 1507 only at times during which the pricing information indicates that the needed bid-based virtual computing instances 1507 are available to test network based production services 1527a-1527n and 1536a-1535n at the specified pricing conditions reflected in bids.

Figure 16A:
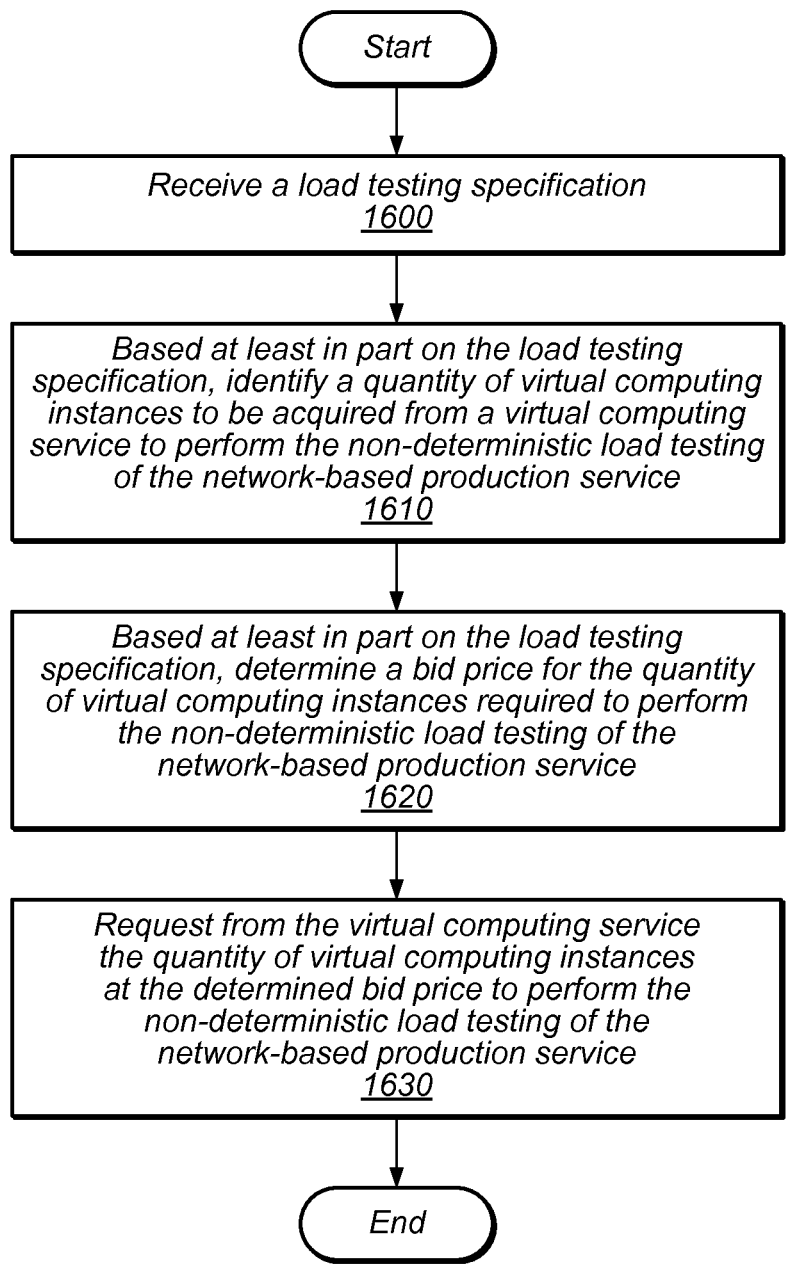
FIG. 16A is a flowchart illustrating one embodiment of a method for providing non-deterministic load testing, as described herein.

FIG. 16A is a flowchart illustrating one embodiment of a method for providing non-deterministic load testing, as described herein. A load testing specification is received, for example, by a scalable production load test service 1525 of FIG. 15B, which is described above (block 1600). Based at least in part on the load testing specification, a quantity of virtual computing instances to be acquired from a virtual computing service to perform the non-deterministic load testing of the network-based production service is identified), for example, by a non-deterministic load testing module 1545 of FIG. 15B (block 1610). Based at least in part on the load testing specification, a bid price for the quantity of virtual computing instances required to perform the non-deterministic load testing of the network-based production service is determined, for example, by a non-deterministic load testing module 1545 of FIG. 15B (block 1620). The quantity of virtual computing instances at the determined bid price to perform the non-deterministic load testing of the network-based production service is requested from the virtual computing service, for example, by a non-deterministic load testing module 1545 of FIG. 15B (block 1630).

Figure 16B:
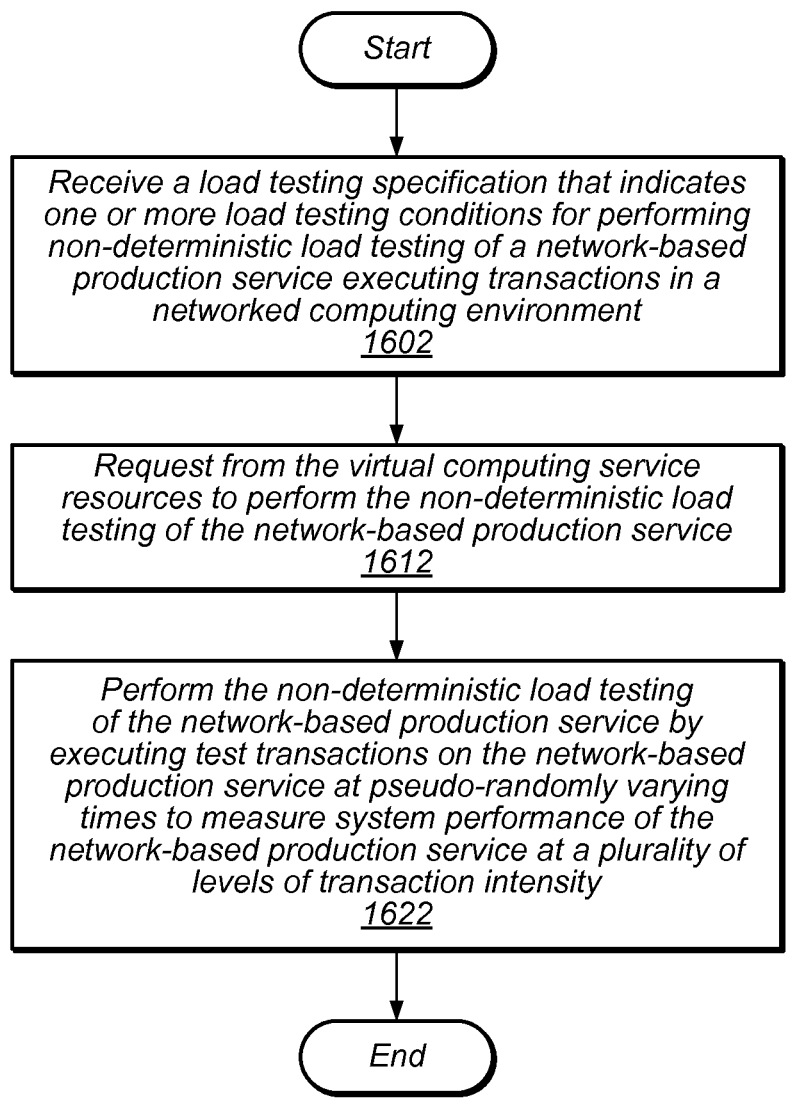
FIG. 16B is a flowchart illustrating one embodiment of a method for providing non-deterministic load testing, as described herein.

FIG. 16B is a flowchart illustrating one embodiment of a method for providing non-deterministic load testing, as described herein. A load testing specification that indicates one or more load testing conditions for performing non-deterministic load testing of a network-based production service executing transactions in a networked computing environment is received, for example, by a scalable production load test service 1525 of FIG. 15B, which is described above (block 1602). Resources to perform the non-deterministic load testing of the network-based production service are requested from the virtual computing service, for example, by a non-deterministic load testing module 1545 of FIG. 15B (block 1612). The non-deterministic load testing of the network-based production service is performed by executing test transactions on the network-based production service at pseudo-randomly varying times to measure system performance of the network-based production service at a plurality of levels of transaction intensity, for example, by load drivers 1517 of FIG. 15B (block 1622).

Figure 16C:
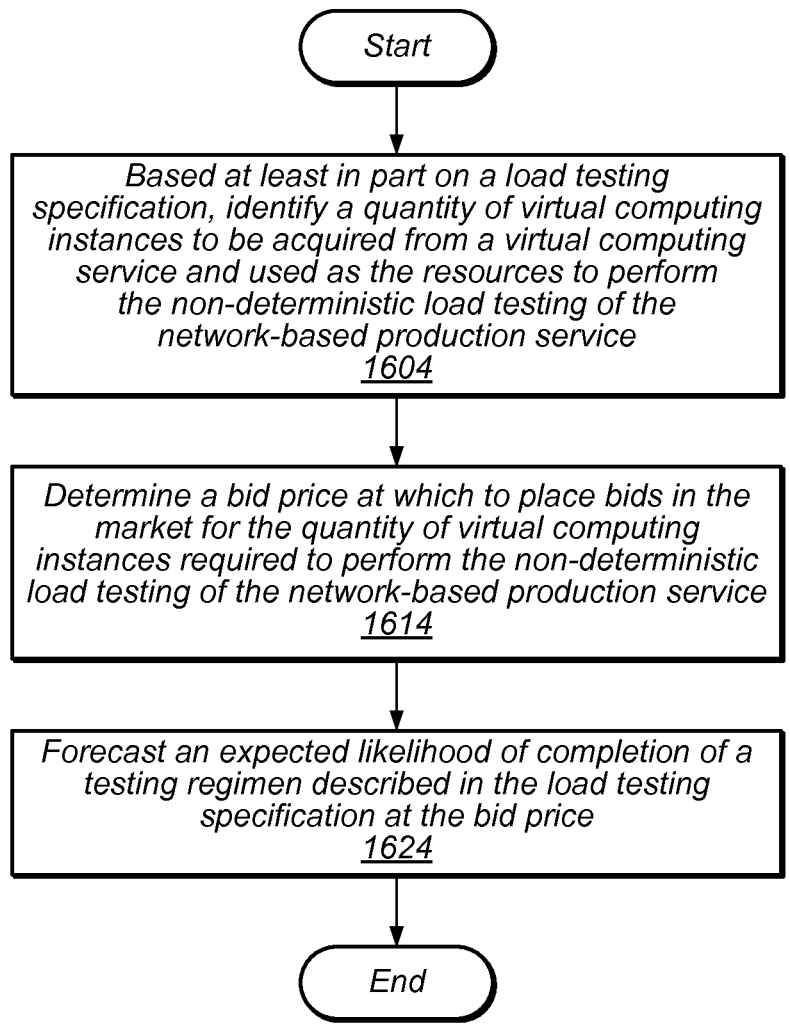
FIG. 16C is a flowchart illustrating one embodiment of a method for providing non-deterministic load testing, as described herein.

FIG. 16C is a flowchart illustrating one embodiment of a method for providing non-deterministic load testing, as described herein. Based at least in part on a load testing specification, a quantity of virtual computing instances to be acquired from a virtual computing service and used as the resources to perform the non-deterministic load testing of the network-based production service is identified, for example, by a non-deterministic load testing module 1545 of FIG. 15B (block 1604). A bid price at which to place bids in the market for the quantity of virtual computing instances required to perform the non-deterministic load testing of the network-based production service is determined, for example, by a non-deterministic load testing module 1545 of FIG. 15B (block 1614). An expected likelihood of completion of a testing regimen described in the load testing specification at the bid price is forecasted, for example, by a non-deterministic load testing module 1545 of FIG. 15B (block 1624).

Figure 16D:
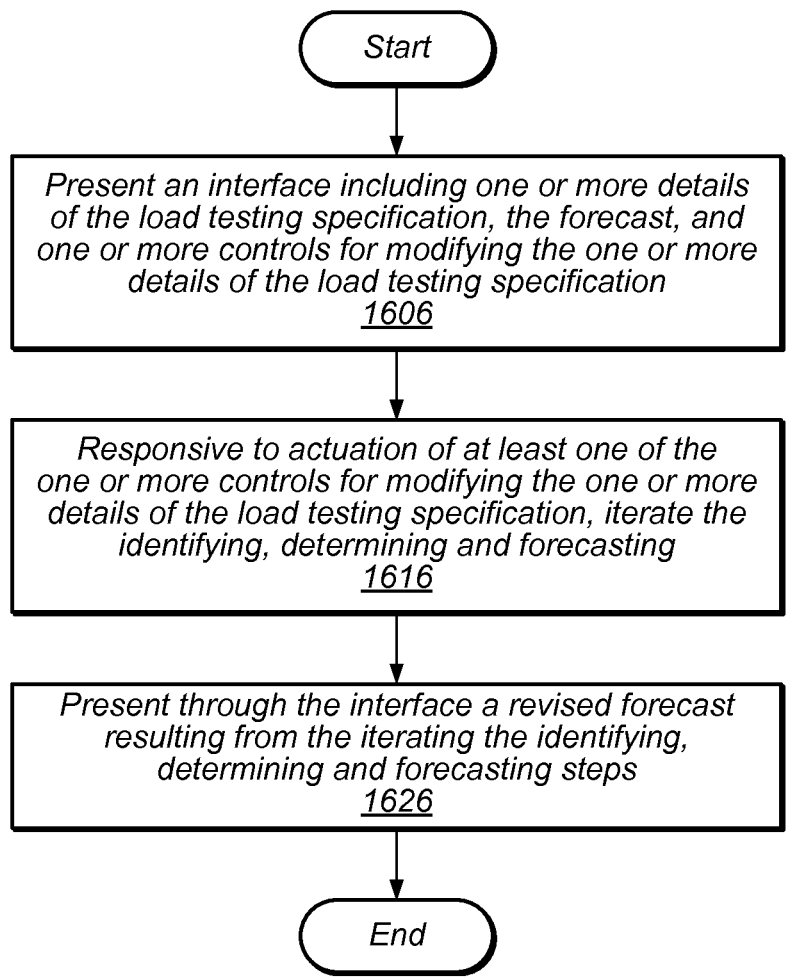
FIG. 16D is a flowchart illustrating one embodiment of a method for providing non-deterministic load testing, as described herein.

FIG. 16D is a flowchart illustrating one embodiment of a method for providing non-deterministic load testing, as described herein. An interface including one or more details of the load testing specification, the forecast, and one or more controls for modifying the one or more details of the load testing specification is presented, for example, by a non-deterministic load testing module 1545 of FIG. 15B (block 1606). Responsive to actuation of at least one of the one or more controls for modifying the one or more details of the load testing specification, the identifying, determining and forecasting are iterated, for example, by a non-deterministic load testing module 1545 of FIG. 15B (block 1616). A revised forecast resulting from the iterating the identifying, determining and forecasting steps is presented through the interface, for example, by a non-deterministic load testing module 1545 of FIG. 15B (block 1626).

Figure 17:
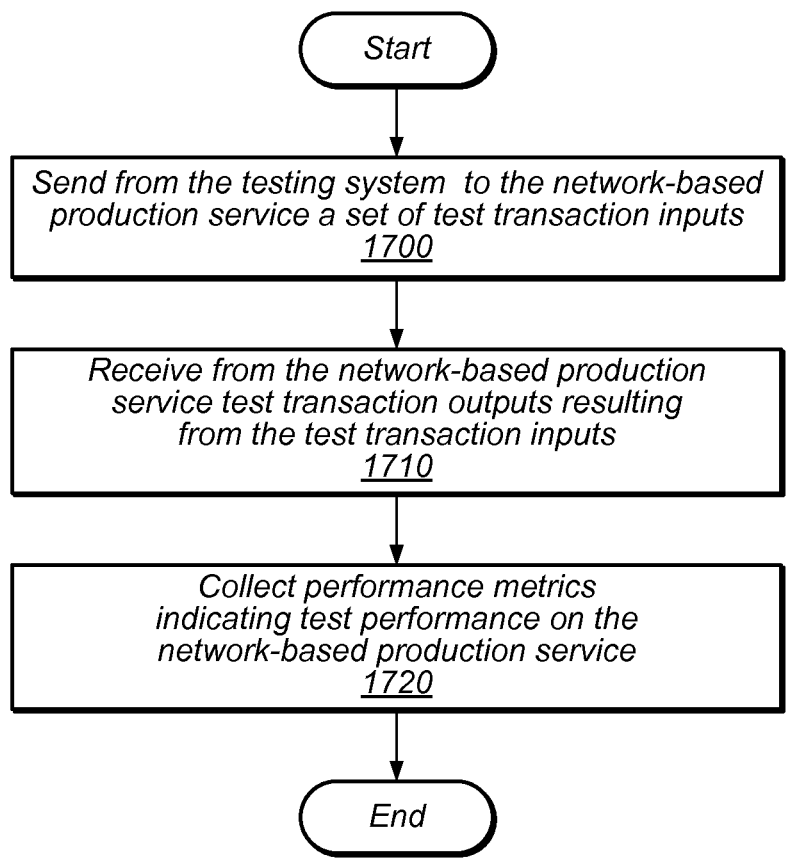
FIG. 17 is a flowchart illustrating one embodiment of a method for providing load testing, which supports non-deterministic load testing, as described herein.

FIG. 17 is a flowchart illustrating one embodiment of a method for providing non-deterministic load testing, as described herein. A set of test transaction inputs is sent from the testing system executing on the shared computing system to the network-based production service, for example, by a virtual computing service 1595 of FIG. 15B (block 1700). Test transaction outputs resulting from the test transaction inputs are received from the network-based production service, for example, by a non-deterministic load testing module 1545 of FIG. 15B (block 1710). Performance metrics indicating test performance on the network-based production service are collected, for example, by a non-deterministic load testing module 1545 of FIG. 15B (block 1720).

Figure 18:
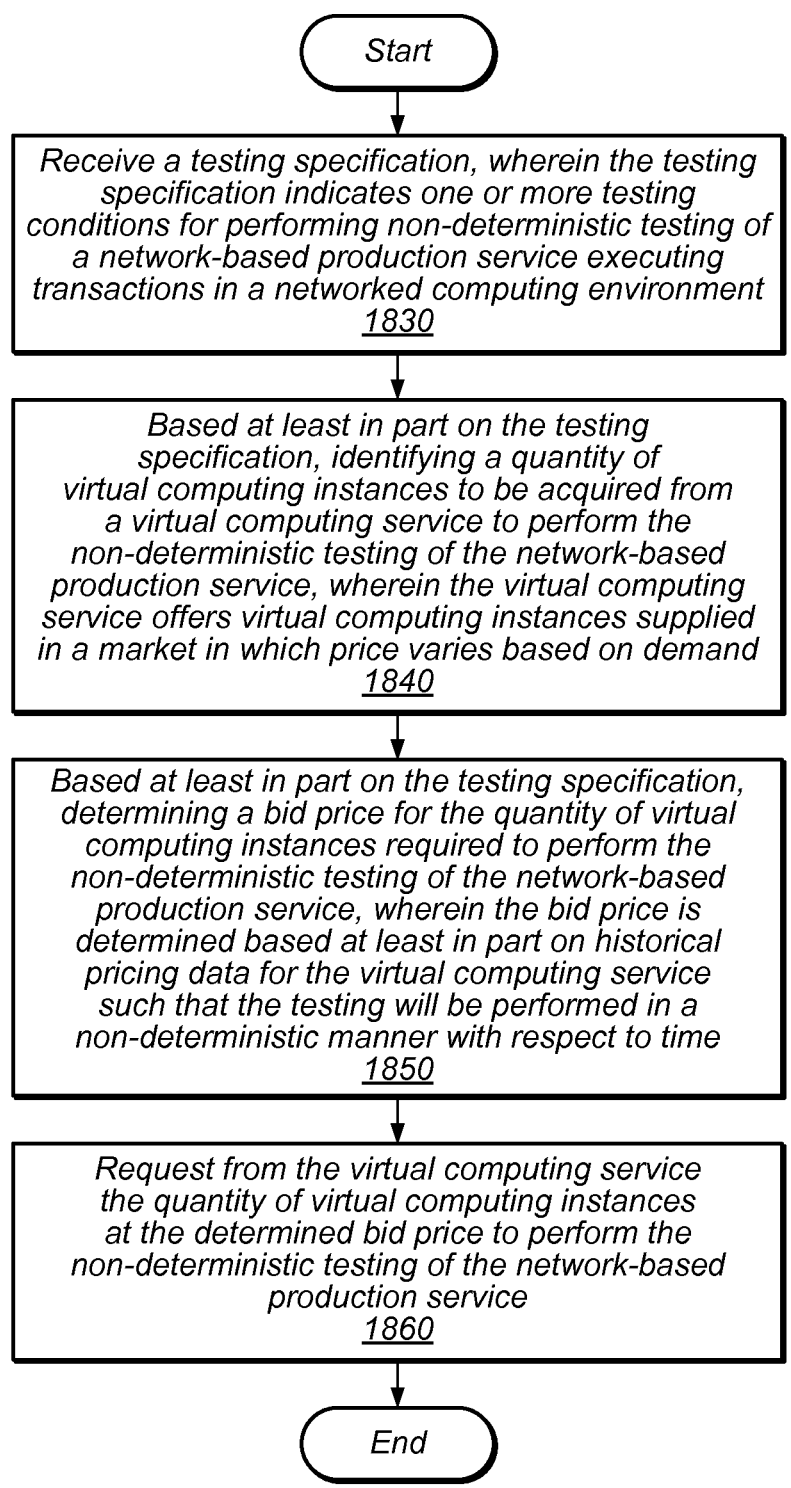
FIG. 18 is a flowchart illustrating one embodiment of a method for providing non-deterministic load testing, as described herein.\

FIG. 18 is a flowchart illustrating one embodiment of a method for providing non-deterministic load testing, as described herein. A testing specification is received, wherein the testing specification indicates one or more testing conditions for performing non-deterministic testing of a network-based production service executing transactions in a networked computing environment, for example, by a non-deterministic load testing module 1545 of FIG. 15B (block 1830). Based at least in part on the testing specification, a quantity of virtual computing instances to be acquired from a virtual computing service to perform the non-deterministic testing of the network-based production service is identified, wherein the virtual computing service offers virtual computing instances supplied in a market in which price varies based on demand, for example, by a non-deterministic load testing module 1545 of FIG. 15B (block 1840). Based at least in part on the testing specification, a bid price for the quantity of virtual computing instances required to perform the non-deterministic testing of the network-based production service is determined, wherein the bid price is determined based at least in part on historical pricing data for the virtual computing service such that the testing will be performed in a non-deterministic manner with respect to time, for example, by a non-deterministic load testing module 1545 of FIG. 15B (block 1850). The quantity of virtual computing instances at the determined bid price to perform the non-deterministic testing of the network-based production service is requested from the virtual computing service, for example, by a non-deterministic load testing module 1545 of FIG. 15B (block 1860).

Figure 19:
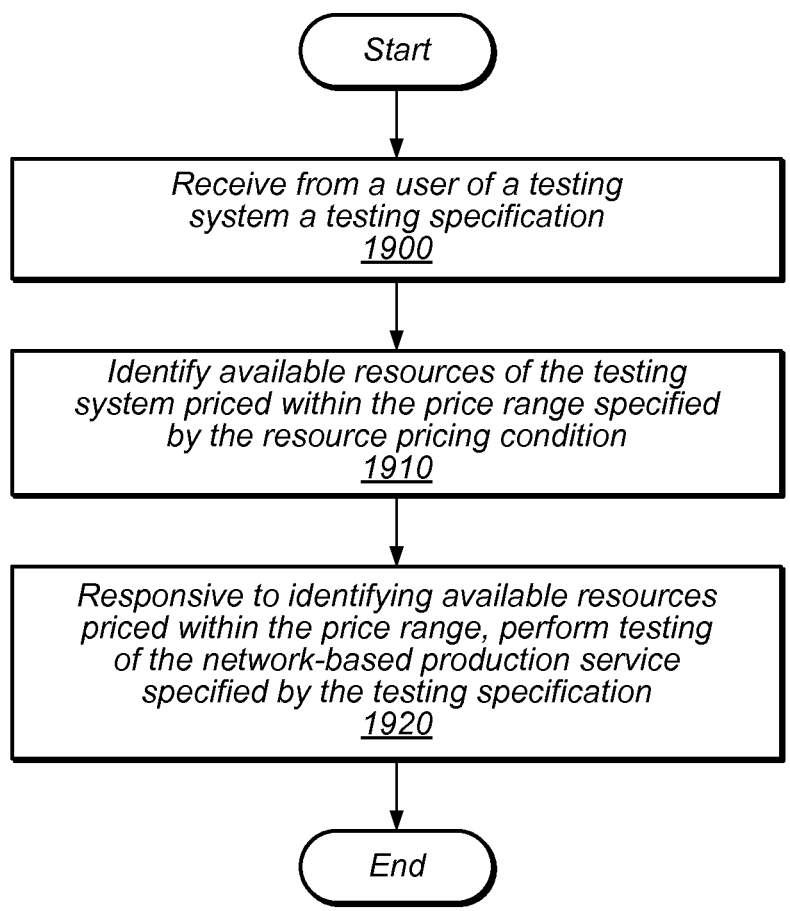
FIG. 19 is a flowchart illustrating one embodiment of a method for providing non-deterministic load testing, as described herein.

FIG. 19 is a flowchart illustrating one embodiment of a method for providing non-deterministic load testing, as described herein. A testing specification is received from a user of a testing system executing on a shared computing system, for example, by a non-deterministic load testing module 1545 of FIG. 15B (block 1900). Available resources of the testing system executing on the shared computing system priced within the price range specified by the resource pricing condition are identified, for example, by a non-deterministic load testing module 1545 of FIG. 15B (block 1910). Responsive to identifying available resources of the testing system executing on the shared computing system priced within the price range, testing of the network-based production service specified by the testing specification is performed, for example, by a virtual computing service 1595 of FIG. 15B (block 1920).

While the embodiments described herein in the detailed description and examples reflect distinct groups of features, these groupings of features are abstractions for the purpose of clarifying some features by elision from view of others that would be practiced in conjunction, and one of skill in the art will readily ascertain in light of having read the present specification that combinations of features described herein different from the particular combinations described herein are contemplated within the scope and intent of this disclosure. Thus, features from different parts of this disclosure and its appendices may be combined without departing from the scope and intent of this disclosure, and one of skill in the art will readily comprehend in light of this disclosure that different elements of the disclosure and its appendices may be combined in ways not clarified herein to preserve the clarity of discussion of the features themselves.

Further, an appendix presented with the provisional from which the present application claims priority indicates a set of useful methods and features that one of skill in the art will recognize in light of having read the attached disclosure as being helpfully applicable, though not necessary, to implementing the described embodiments. For example, Appendix FIG. 5, described below, illustrates workers 530*a*-530*n* which may implement many of the testing functions, such as load drivers (1517 of FIG. 15B and 1350 of FIG. 13A) and test hosts (1512 of FIG. 15A) described above with respect to FIGS. 13A-18. One of skill in the art will readily recognize that, while not being essential to implementing any embodiment of the present invention, the described methods, features and techniques may prove helpful in such implementations. In general, details of the scalable production test system described in the appendix may apply, in some embodiments, to the test framework, system, and/or service described above.

In at least some embodiments, a computer system that implements a portion or all of one or more of the technologies described herein, such as the scalable load testing system 100, may include a general-purpose computer system that includes or is configured to access one or more computer-readable media. FIG. 20 illustrates such a general-purpose computing device 3000 suitable for implementing one embodiment of a scalable production test system including a transaction creator module and a transaction generation framework, as described herein. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026. For example, memory 3020 and well as code 3025 and data 3026 may store, in one embodiment, program instructions and data for implementing scalable production test system 120 including transaction creator 130 and transaction generation framework 140, described above.

In various embodiments, scalable production test system 120, transaction creator 130 and transaction generation framework 140 (and/or any individual sub-modules thereof) may each be implemented in any of various programming languages or methods. For example, in one embodiment, transaction generation framework 140 may be written in any of the C, C++, assembly, JAVA or other general purpose programing languages, while in another embodiment, it may be written using a different, more specialized, programming language. Moreover, in some embodiments, scalable production test system 120, transaction creator 130 and transaction generation framework 140 (and/or various sub-modules thereof) may not be implemented using the same programming language.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1 and 2, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (e.g., computer-accessible) medium configured to store program instructions and data as described above with respect to FIGS. 1 through 18 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory.

Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG.

20 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. For example, actions, processes, methods, tasks or functions described herein as being performed by scalable production test system 120 may, in some embodiments, be performed by transaction generation framework 140 and vice versa. Additionally, functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of examples that follow. Finally, structures and functionality presented as discrete components in the exemplary configurations may be implemented as a combined structure or component. These and other variations, modifications, additions, and improvements may fall within the scope of the disclosure as defined in the examples that follow.

Example embodiments of the disclosure can be described in view of the following clauses:

1. A system, comprising:
one or more computers configured to implement a load testing system, wherein the load testing system comprises:
a transaction generation framework; and
a transaction creator module;
wherein the transaction creator module is dynamically bound to the transaction generation framework at runtime;
wherein the transaction generation framework discovers, during runtime, source code annotations within the transaction creator module;
wherein the source code annotations comprise information identifying one or more transaction methods of the transaction creator module, wherein individual ones of the one or more transaction methods cause a test transaction to be performed to a network-based production service;
wherein the transaction generation framework generates one or more test transactions to be performed on the service based on load step information;
wherein for individual ones of the one or more test transactions, the transaction generation framework calls one of the one or more transaction methods of the transaction creator module;
wherein in response to the transaction generation framework calling one of the transaction methods, the transaction creator module communicates with the service to perform the respective test transaction;
wherein the transaction generation framework collects one or more performance metrics based on the service performance of the performed test transactions.

2. The system of clause 1, wherein the source code annotations comprise information identifying a transaction type for individual ones of the one or more transaction methods; wherein the source code annotations further comprise information indicating ratios among the transaction types; wherein the transaction generation framework generates the one or more test transactions of the transactions types according to the indicated ratios among the transaction types.

3. The system of clauses 1-2, wherein the transaction generation framework discovers, during runtime, additional source code annotations within the transaction creator module, wherein the additional source code annotations comprise additional information indicating different ratios among the transaction types; wherein the transaction generation framework generates one or more additional test transactions of the transactions types according to the different ratios among the transaction types.

4. The system of clauses 1-3, wherein the source code annotations further comprise information identifying one or more initialization methods, wherein the transaction generation framework executes the one or more initialization methods according to the source code annotations.

5. The system of clauses 1-4, wherein the source code annotations further comprise information specifying a plurality of endpoints;
wherein individual ones of the plurality of endpoints are network endpoints for sending transactions to an instance of the network-based production service;
wherein the transaction generation framework executes an initialization method of the transaction creator module, wherein the initialization method returns information identifying the plurality of endpoints;

wherein the load testing system sends individual ones of the one or more transactions concurrently to individual ones of the plurality of endpoints;
wherein the transaction generation framework collects and compares performance metrics for the endpoints.

6. A method for testing a network-based production service, comprising;
performing, by one or more computers:
discovering, by a transaction generation framework at runtime, runtime-discoverable information within a transaction creator module, wherein the runtime-discoverable information identifies one or more transaction types to send to the network-based production service;
discovering, by the transaction generation framework at runtime, additional runtime-discoverable information within the transaction creator module, wherein the additional runtime-discoverable information identifies one or more transaction methods of the transaction creator module, wherein at least one of the one or more transaction methods is of one of the one or more transaction types;
generating, by the transaction generation framework, one or more test transactions based on load information specifying a particular distribution of transaction types to be generated, wherein at least one generated test transaction is of one of the transactions types;
calling, by the transaction generation framework for at least one generated test transaction, one of the transaction methods corresponding to the transaction type of the generated test transaction; and in response to the transaction generation framework calling one of the transaction methods, sending a transaction of the corresponding transaction type to the network-based production service.

7. The method of clause 6, wherein the runtime-discoverable information further comprises information identifying:
an initialization method of the transaction creator module; and
a termination method of the transaction creator module; wherein the method further comprises:
calling, by the transaction generation framework, the initialization method prior to calling any of the transaction methods; and
calling, by the transaction generation framework, the termination method after calling the one or more transaction methods.

8. The method of clauses 6-7, further comprising passing to the initialization method, by the transaction generation framework, one or more parameters received as initialization parameters to the transaction generation framework.

9. The method of clauses 6-8, wherein the runtime-discoverable information further comprises information identifying multiple initialization methods; wherein the method further comprises:
executing, by the transaction generation framework, the multiple initialization methods according to the runtime-discoverable information.

10. The method of clauses 6-9, wherein the runtime-discoverable information indicates dependency information specifying a particular dependency order among the multiple initialization methods; wherein the method further comprises:
executing, by the transaction generation framework, the multiple initialization methods in the particular dependency order based on the indicated dependency information.

11. The method of clauses 6-9, further comprising:
executing, by the transaction generation framework, the multiple initialization methods in parallel.

12. The method of clauses 6-11, wherein the runtime-discoverable information comprises information identifying transaction types for individual ones of the one or more transaction methods; wherein the one or more testing parameters comprise information indicating ratios among the transaction types; wherein the method further comprises:
generating, by the transaction generation framework, the one or more test transactions of the transactions types according to the indicated ratios among the transaction types.

13. A non-transitory, computer-readable storage medium storing program instructions that when executed cause one or more computers to perform:
discovering, at runtime, source code annotations identifying one or more transaction types to send to a network-based production service;
generating one or more test transactions based on load information specifying a distribution of the transaction types, wherein at least one generated test transaction is of one of the transactions types; and
sending individual ones of the generated test transactions to the network-based production service.

14. The non-transitory, computer-readable storage medium of clause 13, wherein the program instructions further cause the one or more computers to perform:
discovering, at runtime, additional source code annotations identifying one or more transaction methods, wherein at least one of the one or more transaction methods corresponds one of the one or more transaction types; and
wherein said executing comprises calling, for at least one generated test transaction, one of the transaction methods corresponding to the transaction type of the generated test transaction, wherein at least one called transaction method causes a transaction of the corresponding type to be sent to the network-based production service.

15. The non-transitory, computer-readable storage medium of clauses 13-14, wherein the program instructions further cause the one or more computers to perform:
collecting one or more performance metrics regarding performance of the test transactions sent to the network-based production service.

16. The non-transitory, computer-readable storage medium of clause 15, wherein the performance metrics comprise one or more of:
transaction latency information;
a number of transactions attempted;
a number of failed transactions; or
a transaction execution rate.

17. The non-transitory, computer-readable storage medium of clauses 13-16, wherein the program instructions further cause the one or more computers to perform:
discovering at runtime, initialization source code annotations wherein the initialization source code annotations identify one or more initialization methods; and
calling, prior to said generating one or more test transactions, the one or more initialization methods identified by the initialization source code annotations.

18. The non-transitory, computer-readable storage medium of clauses 13-17, wherein the program instructions further cause the one or more computers to perform:
    discovering, at runtime, termination source code annotations, wherein the termination source code annotations identify one or more termination methods; and
    calling, subsequent to said generating one or more test transactions, the one or more termination methods identified by the termination source code annotations.

19. The non-transitory, computer-readable storage medium of clause 18, wherein the termination source code annotations indicate a plurality of termination methods, wherein the program instructions further cause the one or more computers to perform:
    calling the plurality of termination methods in parallel such that the plurality of termination methods execute concurrently.

20. The non-transitory, computer-readable storage medium of clause 18, wherein the termination source code annotations further indicate an order in which the one or more termination methods are to be executed, wherein the program instructions further cause the one or more computers to perform:
    calling, by the transaction generation framework, the one or more termination methods in the indicated order.

21. A system, comprising:
    one or more computers configured to implement a testing system, wherein the testing system comprises:
        a transaction generation framework; and
        a transaction creator module;
        wherein the transaction creator module is dynamically bound to the transaction generation framework at runtime;
        wherein the transaction generation framework is configured to discover, during runtime, source code annotations within the transaction creator module;
        wherein the source code annotations comprise information identifying one or more transaction methods of the transaction creator module, wherein individual ones of the one or more transaction methods cause a test transaction to be performed on a network-based production service;
        wherein the source code annotations further comprise information identifying one or more data provider methods of the transaction creator module, wherein individual ones of the one or more data provider methods provides data for one or more of the one or more transaction methods;
        wherein the transaction generation framework is further configured to:
            generate one or more test transactions to be performed on the service based on load step information; and
            call, for at least one of the one or more test transactions, one of the data provider methods and one of the transaction methods for which the data provider methods provides data; and
        wherein in response to the transaction generation framework calling one of the transaction methods, the transaction creator module is configured to communicate with the service to perform the respective test transaction.

22. The system of clause 21, wherein the source code annotations further comprise information identifying a transaction type for individual ones of the one or more transaction methods and further comprise information associating at least one of the one or more data provider methods with one or more of the one or more transaction types.

23. The system of clause 22, wherein said calling, for at least one of the one or more test transactions, one of the data provider methods, comprises calling a data provider method associated with a transaction type for the transaction method to be called for the test transaction.

24. The system of clauses 21-23, wherein the source code annotations further comprise information identifying a data source for one or more of the one or more data provider methods, wherein the data source comprises one or more records usable for one or more of the one or more test transactions.

25. A method, comprising:
    performing, by one or more computers:
        discovering, by a transaction generation framework at runtime, runtime-discoverable information within a transaction creator module, wherein the transaction generation framework is bound at runtime to the transaction creator module;
        identifying based on the runtime-discoverable information, by the transaction generation framework, one or more transaction methods of the transaction creator module, wherein at least one of the one or more transaction methods causes a test transaction to be performed on a network-based service under test; and
        identifying based on the runtime-discoverable information, by the transaction generation framework, one or more data provider methods of the transaction creator module, wherein at least one of the one or more data provider methods provides test data for one or more of the one or more transaction methods.

26. The method of clause 25, wherein the runtime-discoverable information comprises source code annotations identifying the one or more transaction methods and the one or more data provider methods.

27. The method of clause 25, further comprising
    generating, by the transaction generation framework, one or more test transactions to be performed on the service; and
    for at least one of the one or more test transactions:
        executing, by the transaction generation framework, one of the data provider methods and one of the transaction methods for which the data provider methods provides test data.

28. The method of clause 27, further comprising:
    preparing, by the transaction creator module in response to said executing one of the data provider methods, test data for the one of the transaction methods for which the data provides methods provides test data.

29. The method of clause 28, further comprising:
    identifying, by the transaction generation framework and based on the runtime-discoverable information, a data source comprising test data for the one or more transaction methods;
    reading, by the transaction generation framework, a portion of the test data from the data source; and
    wherein said executing one of the data provider methods comprises:
        providing, by the transaction generation framework, the portion of the test data as an input parameter to the executed one of the data provider methods.

30. The method of clause 29, further comprising:
receiving, by the transaction generation framework from the executed one of the data provider methods, prepared test data based on the test data provided as an input parameter; and
wherein said executing one of the transaction methods comprises:
providing, by the transaction generation framework, the prepared test data as an input parameter to the executed one of the transaction methods.

31. A non-transitory, computer-readable storage medium storing program instructions that when executed cause one or more computers to perform:
discovering, by a transaction generation framework at runtime, runtime-discoverable information within a transaction creator module, wherein the transaction generation framework is bound at runtime to the transaction creator module;
identifying, by the transaction generation framework based on the runtime-discoverable information, one or more transaction methods of the transaction creator module, wherein individual ones of the one or more transaction methods cause a test transaction to be performed by a network-based service under test;
identifying, by the transaction generation framework based on the runtime-discoverable information, one or more data provider methods of the transaction creator module, wherein at least one of the one or more data provider methods provides test data for one or more of the one or more transaction methods; and
identifying, by the transaction generation framework based on the runtime-discoverable information, a data source for one or more of the one or more data provider methods, wherein the data source comprises one or more records usable for one or more of the one or more test transactions.

32. The non-transitory, computer-readable storage medium of clause 31, wherein the runtime-discoverable information further comprises information indicating field and/or record separating expressions for the data source.

33. The non-transitory, computer-readable storage medium of clauses 31-32, wherein the runtime-discoverable information further comprises information indicating whether the records within the data source should be used sequentially or randomly.

34. The non-transitory, computer-readable storage medium of clauses 31-33, wherein the runtime-discoverable information further comprises information indicating whether records within the data source should be used repeatedly if more test transactions are generated than a number of records in the data source.

35. The non-transitory, computer-readable storage medium of clauses 31-34, wherein the data source for a particular one of the data provider methods is a data file comprising test data, wherein the program instructions further cause the one or more computers to perform:
reading, by the transaction generation framework, the data file; and
providing, by the transaction generation framework, at least a portion of the test data to successive calls to the particular one of the data provider methods, wherein a respective successive call receives a different portion of the test data.

36. The non-transitory, computer-readable storage medium of clause 31, wherein the data source comprises previously recorded production data.

37. The non-transitory, computer-readable storage medium of clause 36, wherein the previously recorded production comprises transaction logs of client requests to a network-based service.

38. The non-transitory, computer-readable storage medium of clauses 31-37, wherein the data source is a plurality of files indicated by the runtime-discoverable information.

39. The non-transitory, computer-readable storage medium of clause 38, wherein the plurality of files are provided by an online multi-user network-based queue service.

40. The non-transitory, computer-readable storage medium of clause 39, wherein the program instructions further cause the one or more computers to perform:
accessing, by the transaction generation framework, the network-based queue service to obtain the plurality of files.

41. A system, comprising:
one or more computers configured to implement:
a transaction generation framework; and
a transaction creator module;
wherein the transaction creator module is dynamically bound to the transaction generation framework at runtime;
wherein the transaction generation framework is configured to discover, during runtime, runtime-discoverable information within the transaction creator module;
wherein the runtime-discoverable information comprises information identifying a plurality of transaction methods of the transaction creator module, wherein individual ones of the one or more transaction methods cause a test transaction to be performed on a network-based production service;
wherein the runtime-discoverable information further comprises dependency information identifying a dependency relationship between pairs of the plurality of transaction methods;
wherein the transaction generation framework is further configured to:
generate one or more test transactions to be performed on the service; and
for at least one of the one or more test transactions, call one of the transaction methods, wherein the transaction method called is based upon the dependency information; and
wherein in response to the transaction generation framework calling one of the transaction methods, the transaction creator module is configured to communicate with the service to perform the respective test transaction.

42. The system of clause 41, wherein the transaction generation framework is configured to:
determine, for one of the test transactions, a particular one of the plurality of transaction methods to call;
determine that the dependency information indicates that the particular one of the plurality of transaction methods has a dependency relationship with another one of the plurality of transaction methods, wherein the dependency relationship indicates that the particular one of the plurality of transaction methods should be called after the another one of the plurality of transaction methods is called;
determine that the another one of the plurality of transaction methods has not been called; and call the another one of the plurality of transaction methods.

43. The system of clause 42, wherein the transaction generation framework is further configured to store, in a redirect queue, an indication that the particular one of the plurality of transaction methods needs to be called.

44. The system of clause 43, wherein the transaction generation framework is further configured to determine, based on the stored indication in the redirect queue, that the particular one of the plurality of transaction methods should be called in place of a subsequent call to the another one of the plurality of transaction methods.

45. The system of clauses 41-44, wherein the dependency information indicates a chain dependency relationship between three or more of the plurality of transaction methods.

46. A method, comprising:
performing, by one or more computers:
discovering, at runtime, runtime-discoverable information within a transaction creator module;
identifying, based on the runtime-discoverable information, a plurality of transaction methods of the transaction creator module, wherein at least one of the one or more transaction methods causes a test transaction to be performed on a network-based production service; and
identifying, based on the runtime-discoverable information, dependency information specifying a dependency relationship between two or more of the plurality of transaction methods.

47. The method of clause 46, further comprising:
generating one or more test transactions to be performed on the service; and
calling, for at least one of the one or more test transactions, one of the transaction methods, wherein the transaction method called is based upon the dependency information.

48. The method of clause 47, further comprising:
determining, for one of the test transactions, a particular one of the plurality of transaction methods to call;
determining that the dependency information indicates that the particular one of the plurality of transaction methods has a dependency relationship with another one of the plurality of transaction methods, wherein the dependency relationship indicates that the particular one of the plurality of transaction methods should be called after the another one of the plurality of transaction methods is called;
determining that the another one of the plurality of transaction methods has not been called; and
calling the another one of the plurality of transaction methods.

49. The method of clauses 47-48, further comprising:
storing output data returned from a particular one of the plurality of transaction methods in a data queue; and
passing the stored output data as input to another of the plurality of transaction methods; and
wherein the dependency information indicates that the another of the plurality of transaction methods has a dependency relationship with the particular one of the plurality of transaction methods, wherein the dependency relationship indicates that the output data returned from the particular one of the plurality of transaction methods should be passed as input to the another of the plurality of transaction methods.

50. The method of clauses 47-49, wherein the runtime-discoverable information comprises distribution information indicating ratios among a plurality of transaction types, wherein respective ones of the one or more test transactions are of respective ones of the plurality of transaction types;
wherein said generating comprises:
generating the one or more test transactions randomly based on the distribution information;
wherein the method further comprises:
determining that a ratio of the total number of generated test transactions of a randomly selected transaction type differs from a target ratio indicated by the distribution information; and generating a test transaction of the randomly selected transaction type in response to another of the plurality of transaction types being selected randomly.

51. A non-transitory, computer-readable storage medium storing program instructions that when executed cause one or more computers to perform:
discovering source code annotations within a transaction creator module;
identifying, based on the source code annotations, a plurality of transaction methods of the transaction creator module, wherein at least one of the one or more transaction methods causes a test transaction to be performed on a network-based production service; and
identifying, based on the source code annotations, dependency information specifying a dependency relationship between one or more of the plurality of transaction methods.

52. The non-transitory, computer-readable storage medium of clause 51, wherein the program instructions further cause one or more computers to perform:
calling a particular one of the plurality of transaction methods;
storing an indication that another one of the plurality of transaction methods should be called subsequently, wherein the dependency information indicates a dependency relationship between the particular transaction method and another transaction method;
storing output from the particular transaction method on a data queue; and
calling the another transaction method using the stored output as input to the another transaction method.

53. The non-transitory, computer-readable storage medium of clauses 51-52, wherein the program instructions further cause one or more computers to perform:
determining that a number of uses of an output from a particular one of the plurality of transaction methods stored in a data queue is greater than a number indicated by the dependency information, and:
calling, in place of the particular one of the plurality of transaction methods when selected randomly, another one of the plurality of transaction methods with an instance of the stored outputs as input, wherein the dependency information indicates a dependency relationship between the particular transaction method and another transaction method.

54. The non-transitory, computer-readable storage medium of clauses 51-52, wherein the runtime-discoverable information comprises distribution information indicating target ratios among a plurality of transaction types, wherein respective ones of the one or more test transactions are of respective ones of the plurality of transaction types.

55. The non-transitory, computer-readable storage medium of clause 54, wherein the program instructions further cause one or more computers to perform generating the one or more test transactions randomly based on the distribution information and according to the target ratios.

56. The non-transitory, computer-readable storage medium of clause 55, wherein the program instructions further cause one or more computers to perform:
  substituting, for a randomly selected transaction type, another of the plurality of transaction types, in response to determining that a ratio of a total number of generated test transactions of the randomly selected transaction type does not match the target ratios.

57. The non-transitory, computer-readable storage medium of clauses 51-56, wherein the dependency relationship includes ratio information indicating that output from a single execution of a particular one of the transaction methods should be used as input for multiple executions of another one of the transaction methods.

58. The non-transitory, computer-readable storage medium of clause 57, wherein the program instructions further cause one or more computers to perform:
  storing, after a call to the another transaction method using output from the particular transaction method as input, an indication of a remaining number of times the output from the particular transaction method should be used as input for additional executions of the another transaction method.

59. The non-transitory, computer-readable storage medium of clause 58, wherein the program instructions further cause one or more computers to perform:
  storing the output of the particular transaction method in a data queue;
  randomly selecting the another transaction method for execution;
  removing the output from the data queue;
  passing the output as input to the another transaction method;
  decrementing the indication of the remaining number; and
  re-storing the output in the data queue in response to determining that the decremented indication is greater than zero.

60. The non-transitory, computer-readable storage medium of clauses 58-59, wherein the program instructions further cause one or more computers to perform:
  storing the output of the particular transaction method in a data queue, wherein said storing an indication of a remaining number of times comprises storing the indication with the stored output in the data queue;
  randomly selecting the another transaction method for execution;
  passing the stored output as input to the another transaction method; and
  in response to determining that the decremented indication is greater than zero, decrementing the indication of the remaining number without removing the stored output from the data queue.

61. A system, comprising:
  a plurality of computing devices configured to implement a network-based scalable production load test service configured to:
    receive a request to capture to a load test data repository items of transaction data for a network-based production service;
    capture to the load test data repository the items of transaction data,
      wherein
        the transaction data comprise input to the network-based production service over a network;
    in response to a load test specification received by the scalable production load test service, dynamically allocate one or more resources to perform a load test of the network-based production service according to the load test specification;
    perform the load test of the network-based production service using the dynamically allocated one or more resources, wherein to perform the load test the network-based scalable production load test service is configured to:
      generate a load for load testing the network-based production service based at least in part on the items of transaction data for the network based production service in the load test data repository,
      send from the scalable production load test service to the network-based production service transactions based on the generated load, and
      collect performance metrics indicating performance of the load test on the network-based production service.

62. The system of clause 61, wherein to capture to the load test data repository the items of transaction data the network-based scalable production load test service is configured to filter the items of transaction data to eliminate from the transaction data repository items of transaction data for which persistence is forbidden.

63. The system of clauses 61-62, wherein to generate the load for load testing the network-based production service based at least in part on the items of transaction data for the network based production service in the load test data repository the network-based scalable production load test service is configured to assemble load test transaction inputs according to a mix of load test transaction types different from a mix of transaction types present in the items of transaction data at said capturing.

64. The system of clauses 61-63, wherein to generate the load for load testing the network-based production service based at least in part on the items of transaction data for the network based production service in the load test data repository the network-based scalable production load test service is configured to assemble load test transaction inputs according to a mix of load test transaction types copied from a mix of transaction types present in the items of transaction data at said capturing.

65. The system of clauses 61-64, wherein the network-based scalable production load test service is configured to present a dashboard of metrics representing performance of the network-based production service.

66. The system of clauses 61-65, wherein the network-based scalable production load test service is configured to execute on a provider network hosting the network-based production service.

67. The system of clauses 61-66, wherein the load test data repository is implemented at a network-based storage service hosted on a provider network on which also hosts the network-based production service.

68. A method for providing a load testing service, the method comprising:
  in response to a load test specification received by a scalable production load test service, a scalable production load test service dynamically allocating one or more resources to perform a load test of the network based production service according to the load test specification, wherein the dynamically allocating comprises
    calculating a quantity of resources needed to perform a load test of the network-based production service according to the load test specification,
    identifying one or more resources available to the scalable production load test service to perform a load test of the network-based production service according to the load test specification, and assigning the one or more resources available to the scalable production load test service to perform a load test of the network-based production service according to the load test specification; and performing the load test of the network based production service using the dynamically allocated one or more resources, wherein the performing the load test comprises generating a load for load testing the network-based production service based at least in part on the items of transaction data for a network based production service in the load test data repository, sending from the scalable production load test service to the network-based production service transactions based on the generated load, and collecting performance metrics indicating performance of the load test on the network-based production service.

69. The method of clause 68, further comprising capturing to a load test data repository of the scalable production load test service items of transaction data, wherein the capturing to the load test data repository of the scalable production load test service the items of transaction data further comprises categorizing the items of transaction data to facilitate subsequent adjustment by the load test data repository items of transaction data for use by the scalable production load test service.

70. The method of clauses 68-69, further comprising presenting a billing interface representing costs associated with performance of the load test of the network based production service using the dynamically allocated one or more resources.

71. The method of clauses 68-70, further comprising presenting a dashboard of utilization metrics comprising metrics representing cost of resource consumption by the network-based production service during the load test of the network based production service.

72. The method of clauses 68-71, further comprising presenting a dashboard of metrics representing performance of the network-based production service during the load test of the network based production service using the dynamically allocated one or more resources.

73. The method of clauses 68-72, further comprising presenting a test specification interface for the scalable production load test service representing:

costs expected to be associated with selectable options for performance of the load test of the network based production service using the dynamically allocated one or more resources, and controls for selecting the selectable options to adjust selection of the one or more dynamically allocated resources.

74. The method of clauses 68-73, wherein the load test specification received by the scalable production load test service comprises a description of acceptable execution timing for the sending from the scalable production load test service to the network-based production service transactions based on the generated load.

75. A non-transitory computer-readable storage medium storing program instructions, wherein the program instructions are computer-executable to implement:

capturing to a load test data repository of the scalable production load test service the items of transaction data;

in response to a load test specification received by the scalable production load test service, the scalable production load test service dynamically allocating one or more resources to perform a load test of the network based production service according to the load test specification; and performing the load test of the load test of the network based production service using the dynamically allocated one or more resources, wherein the program instructions computer-executable to implement performing the load test comprise program instructions computer-executable to implement generating a load for load testing the network-based production service based at least in part on the items of transaction data in the load test data repository, and program instructions computer-executable to implement sending from the scalable production load test service to the network-based production service transactions based on the generated load.

76. The non-transitory computer-readable storage medium of clause 75, wherein the program instructions computer-executable to implement capturing to a load test data repository of the scalable production load test service the items of transaction data further comprise program instructions computer-executable to implement filtering the items of transaction data to eliminate from the transaction data repository items of transaction data that have remained in the repository past a specified lifespan.

77. The non-transitory computer-readable storage medium of clauses 75-76, wherein the program instructions computer-executable to implement capturing to a load test data repository of the scalable production load test service the items of transaction data further comprise program instructions computer-executable to implement assembling load test transaction inputs according to a mix of load test transaction types projected to exist on a future date based on a demand model provided by the scalable production load test service.

78. The non-transitory computer-readable storage medium of clauses 75-77, wherein the program instructions computer-executable to implement dynamically allocating one or more resources to perform a load test of the network based production service according to the load test specification further comprise program instructions computer-executable to:

calculate a number of virtual computing instances required to execute the load test of the network based production service according to the load test specification; and communicate with a network-based computing service to instantiate the calculated number of virtual computing instances to execute the load test of the network based production service according to the load test specification.

79. The non-transitory computer-readable storage medium of clauses 75-78, further comprising program instructions computer-executable to implement presenting a dashboard of metrics representing comparison between performance of the network-based production service during load testing of the network-based production service specified by the load test specification and a predictive model of said performance of the network-based production service during load testing of the network-based production service specified by the load test specification.

80. The non-transitory computer-readable storage medium of clauses 75-79, wherein the capturing to a load test data repository of the scalable production load test service the items of transaction data further comprises importing from a third-party data provider to the load test data repository of the scalable production load test service the items of transaction data, wherein the third-party data provider is distinct from the network-based production service.

81. A system, comprising:
   at least one processor on a computing system; and
   a memory comprising program instructions, wherein the program instructions are executable by the at least one processor to:
      receive a load testing specification, wherein
         the load testing specification indicates one or more load testing conditions for performing non-deterministic load testing of a network-based production service executing transactions in a networked computing environment, and
         the non-deterministic load testing comprises executing test transactions on the network-based production service at pseudo-randomly varying times to measure system performance of the network-based production service at a plurality of levels of transaction intensity,
      based at least in part on the load testing specification, identify a quantity of virtual computing instances to be acquired from a virtual computing service to perform the non-deterministic load testing of the network-based production service, wherein
         the virtual computing service offers virtual computing instances supplied in a market in which price varies based on demand;
      based at least in part on the load testing specification, determine a bid price for the quantity of virtual computing instances required to perform the non-deterministic load testing of the network-based production service, wherein
         the bid price is determined based at least in part on historical pricing data for the virtual computing service such that the load testing will be performed in a non-deterministic manner with respect to time; and
      request from the virtual computing service the quantity of virtual computing instances at the determined bid price to perform the non-deterministic load testing of the network-based production service.

82. The system of clause 81, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying from a spot market instances available within a price range specified by a resource pricing condition for performing load testing of the network-based production service specified by the load testing specification within a time window specified by the load testing specification.

83. The system of clauses 81-82, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying an instance available below a per-instance price ceiling specified by a resource pricing condition for performing load testing of the network-based production service specified by the load testing specification within a time window specified by the load testing specification.

84. The system of clauses 81-83, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying instances available below a total price ceiling specified by the resource pricing condition for performing a complete regimen of load testing of the network-based production service specified by the load testing specification within a time window specified by the load testing specification.

85. The system of clauses 81-84, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying instances available below a total price ceiling specified by the resource pricing condition for performing a complete regimen of load testing of the network-based production service specified by the load testing specification within a time window specified by the load testing specification.

86. The system of clauses 81-85, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying instances available below a total price ceiling specified by the resource pricing condition for performing a complete regimen of load testing of the network-based production service specified by the load testing specification within a time window specified by the load testing specification, wherein
      the set of computing system instances is optimized to maximize a peak of load testing traffic delivered to the network-based production service.

87. The system of clauses 81-86, wherein the program instructions executable by the at least one processor to identify a quantity of virtual computing instances to be acquired from a virtual computing service to perform the non-deterministic load testing of the network-based production service further comprise:
   program instructions executable by the at least one processor to perform identifying instances available below a price ceiling per recurring time period specified by a resource pricing condition for performing load testing of the network-based production service.

88. A method for performing non-deterministic load testing of a network-based production service, the method comprising:
   performing, using a load testing system implemented on one or more computers:
      receiving a load testing specification, wherein
         the load testing specification indicates one or more load testing conditions for performing non-deterministic load testing of a network-based production service executing transactions in a networked computing environment;
allocating computing resources to perform the non-deterministic load testing of the network-based production service; and
performing the non-deterministic load testing of the network-based production service, wherein
the non-deterministic load testing comprises executing test transactions on the network-based production service according to the load testing specification at a randomly or pseudo-randomly selected time.

89. The method of clause 88, further comprising:
based at least in part on a load testing specification, identifying a quantity of virtual computing instances to be acquired from a virtual computing service and used as the resources to perform the non-deterministic load testing of the network-based production service, wherein
the virtual computing service offers virtual computing instances supplied in a market in which price varies based on demand;
determining a bid price at which to place bids in the market for the quantity of virtual computing instances required to perform the non-deterministic load testing of the network-based production service, wherein
the bid price is determined based at least in part on historical pricing data for the virtual computing service such that the load testing will be performed in a non-deterministic manner with respect to time;
forecasting an expected likelihood of completion of a testing regimen described in the load testing specification at the bid price.

90. The method of clause 89, further comprising:
presenting an interface comprising one or more details of the load testing specification, the forecast, and one or more controls for modifying the one or more details of the load testing specification;
responsive to actuation of at least one of the one or more controls for modifying the one or more details of the load testing specification, iterating the identifying, determining and forecasting; and
presenting through the interface a revised forecast resulting from the iterating the identifying, determining and forecasting steps.

91. The method of clauses 88-90, further comprising:
based at least in part on the load testing specification, identifying a quantity of virtual computing instances to be acquired from a virtual computing service and used as the resources to perform the non-deterministic load testing of the network-based production service, wherein
the virtual computing service offers virtual computing instances supplied in a market in which price varies based on demand, and
the identifying comprises identifying instances available at a minimum possible total price ceiling for performing a complete regimen of load testing of the network-based production service specified by the load testing specification within a time window specified by the load testing specification.

92. The method of clauses 88-91, further comprising:
based at least in part on the load testing specification, identifying a quantity of virtual computing instances to be acquired from a virtual computing service and used as the resources to perform the non-deterministic load testing of the network-based production service, wherein
the virtual computing service offers virtual computing instances supplied in a market in which price varies based on demand, and
the identifying a quantity of virtual computing instances to be acquired from a virtual computing service to perform the non-deterministic load testing of the network-based identifying a quantity of virtual computing instances to maximize load test duration within a total price ceiling.

93. The method of clauses 88-92, wherein:
the load testing specification comprises a description of unacceptable execution time windows for performing the testing, and
the performing the non-deterministic load testing of the network-based production service further comprises suspending testing during the unacceptable execution time windows.

94. The method of clauses 88-93, further comprising:
collecting performance metrics indicating performance of the load test on the network-based production service; and
responsive to one or more of the metrics exceeding a threshold, suspending testing.

95. A non-transitory computer-readable storage medium storing program instructions, wherein the program instructions are computer-executable to implement:
based at least in part on a load testing specification, identifying a quantity of virtual computing instances to be acquired from a virtual computing service to perform the non-deterministic load testing of the network-based production service, wherein
the virtual computing service offers virtual computing instances supplied in a market in which price varies based on demand, and
the load testing specification indicates one or more load testing conditions for performing non-deterministic load testing of a network-based production service executing transactions in a networked computing environment;
requesting from the virtual computing service the quantity of virtual computing instances to perform the non-deterministic load testing of the network-based production service; and
performing the non-deterministic load testing of the network-based production service using the virtual computing instances.

96. The non-transitory computer-readable storage medium of clause 95, wherein the program instructions are computer-executable to implement:
collecting performance metrics indicating performance of the load test on the network-based production service; and
responsive to one or more of the metrics exceeding a threshold, reducing intensity of testing.

97. The non-transitory computer-readable storage medium of clauses 95-96, wherein the identifying a quantity of virtual computing instances to be acquired from a virtual computing service to perform the non-deterministic load testing of the network-based further comprises identifying a quantity of virtual computing instances to minimize load test duration as a percentage of a time window.

98. The non-transitory computer-readable storage medium of clauses 95-97, wherein the program instructions are computer-executable to implement:

presenting an interface comprising one or more details of the load testing specification, realtime performance metrics related to the testing, and one or more controls for modifying the one or more details of the load testing specification during execution;
responsive to actuation of at least one of the one or more controls for modifying the one or more details of the load testing specification, iterating the identifying, determining and performing.

99. The non-transitory computer-readable storage medium of clauses 95-98, wherein the program instructions are computer-executable to implement:
presenting an interface comprising one or more details of the load testing specification, realtime budget expenditure metrics related to costs of the load testing, and one or more controls for modifying the one or more details of the load testing specification during execution;
responsive to actuation of at least one of the one or more controls for modifying the one or more details of the load testing specification, iterating the identifying, determining and performing.

100. The non-transitory computer-readable storage medium of clauses 95-99, wherein the program instructions are computer-executable to implement:
collecting realtime cost metrics indicating costs of performance of the load test on the network-based production service; and
responsive to one or more of the metrics exceeding a threshold, reducing intensity of testing.

Although the embodiments above have been described in detail, numerous variations and modifications will become apparent once the above disclosure is fully appreciated. It is intended that the following claims be interpreted to embrace all such variations and modifications. Note that the subject matter disclosed in any sentence or paragraph herein can be combined with the subject matter of one or more of any other sentences or paragraphs herein as long as such a combination are not mutually exclusive or inoperable.

What is claimed is:

1. A system, comprising:
a plurality of computing devices configured to implement via one or more hardware processors of the plurality of computing devices a network-based scalable production load test service including an interface configured to receive at least both:
requests to capture items of transaction data for a network-based production service, wherein the items of transaction data to be captured comprise input to the network-based production service received from clients of the network-based production service as client request data over a network, and
load test specifications for the network-based scalable production load test service, wherein load testing by the load test service is performed according to a load test specification and is based at least in part on captured items of transaction data;
the network-based scalable production load test service configured to:
receive a request via the interface to capture to a load test data repository items of transaction data for the network-based production service, wherein the items of transaction data comprise input to the network-based production service received as client request data over a network by the network-based production service;
capture the items of transaction data to the load test data repository; and
in response to a load test specification received by the scalable production load test service via the interface,
dynamically allocate one or more resources to perform a load test of the network-based production service according to the load test specification, wherein dynamically allocate comprises analyze the load test specification to determine a quantity of resources needed to perform the load test of the network-based production service according to the load test specification; and
perform the load test of the network-based production service using the dynamically allocated one or more resources, wherein to perform the load test the network-based scalable production load test service is configured to:
generate a load for load testing the network-based production service based at least in part on the items of transaction data for the network-based production service in the load test data repository, wherein to generate the load for load testing the network-based scalable production load test service is configured to assemble load test transaction inputs according to a mix of:
load test transaction types different from a mix of transaction types present in the items of transaction data at said capture, or
load test transaction types copied from a mix of transaction types present in the items of transaction data at said capture,
send from the scalable production load test service to the network-based production service transactions based on the generated load, wherein the network-based production service is the network-based production service from which the items of transaction data used to generate the load were captured, and
collect performance metrics indicating performance of the load test on the network-based production service.

2. The system of claim 1, wherein to capture to the load test data repository the items of transaction data the network-based scalable production load test service is configured to filter the items of transaction data to eliminate from a transaction data repository items of transaction data for which persistence is forbidden.

3. The system of claim 1, wherein the network-based scalable production load test service is configured to present a dashboard of metrics representing performance of the network-based production service.

4. The system of claim 1, wherein the network-based scalable production load test service is configured to execute on a provider network hosting the network-based production service.

5. The system of claim 1, wherein the load test data repository is implemented at a network-based storage service hosted on a provider network on which also hosts the network-based production service.

6. A method for providing a load testing service, the method comprising: performing by one or more computers comprising one or more hardware processors and memory:
receiving, by an interface of a scalable production load test service:
requests to capture items of transaction data for a network-based production service, wherein the items of transaction data to be captured comprise input to the network-based production service received from clients of the network-based production service as client request data over a network, and load test specifications for the scalable production load test service, wherein load testing by the scalable production load test service is performed according to a load test specification and is based at least in part on captured items of transaction data;

subsequent to receiving, by the interface of the scalable production load test service, a load test specification and a request to capture items of transaction data for the network-based production service:

dynamically allocating, by the scalable production load test service, one or more resources to perform a load test of the network-based production service according to the load test specification, wherein dynamically allocating comprises:

calculating a quantity of resources needed to perform a load test of the network-based production service according to the load test specification, identifying one or more resources available to the scalable production load test service to perform a load test of the network-based production service according to the load test specification, and assigning the one or more resources available to the scalable production load test service to perform a load test of the network-based production service according to the load test specification;

presenting a test specification interface for the scalable production load test service representing:

costs expected to be associated with selectable options for performance of the load test of the network-based production service using the dynamically allocated one or more resources, and controls for selecting the selectable options to adjust selection of the one or more dynamically allocated resources; and performing the load test of the network-based production service using the dynamically allocated one or more resources, wherein the performing the load test comprises:

generating a load for load testing the network-based production service based at least in part on items of transaction data for a network-based production service in a load test data repository, wherein the items of transaction data comprise input to the network-based production service received as client request data over a network by the network-based production, sending from the scalable production load test service to the network-based production service transactions based on the generated load, wherein the network-based production service is the network-based production service from which the items of transaction data used to generate the load were captured, and collecting performance metrics indicating performance of the load test on the network-based production service.

7. The method of claim 6, further comprising capturing to a load test data repository of the scalable production load test service, items of transaction data, wherein the capturing to the load test data repository of the scalable production load test service the items of transaction data further comprises categorizing the items of transaction data to facilitate subsequent adjustment by the load test data repository items of transaction data for use by the scalable production load test service.

8. The method of claim 6, further comprising presenting a billing interface representing costs associated with performance of the load test of the network-based production service using the dynamically allocated one or more resources.

9. The method of claim 6, further comprising presenting a dashboard of utilization metrics comprising metrics representing cost of resource consumption by the network-based production service during the load test of the network-based production service.

10. The method of claim 6, further comprising presenting a dashboard of metrics representing performance of the network-based production service during the load test of the network-based production service using the dynamically allocated one or more resources.

11. The method of claim 6, wherein the load test specification received by the scalable production load test service comprises a description of acceptable execution timing for the sending from the scalable production load test service to the network-based production service transactions based on the generated load.

12. One or more non-transitory computer-readable storage media storing program instructions, wherein the program instructions are computer-executable to implement:

receiving, via an interface, both:

requests to capture items of transaction data for a network-based production service, wherein the items of transaction data to be captured comprise input to the network-based production service received from clients of the network-based production service as client request data over a network, and load test specifications for the scalable production load test service, wherein load testing by the scalable production load test service is performed according to a load test specification, and is based at least in part on captured items of transaction data;

capturing to a load test data repository of the scalable production load test service, items of transaction data, wherein capturing to the load test data repository comprises:

filtering the items of transaction data to eliminate from a transaction data repository items of transaction data for which persistence is forbidden or to eliminate from the transaction data repository items of transaction data that have remained in the repository past a specified lifespan, or assembling load test transaction inputs according to a mix of load test transaction types projected to exist on a future date based on a demand model provided by the scalable production load test service;

dynamically allocating by the scalable production load test service, subsequent to receiving a load test specification via the interface, one or more resources to perform a load test of a network-based production service according to the load test specification, wherein dynamically allocating comprises analyzing the load test specification to determine a quantity of resources needed to perform the load test of the network-based production service according to the load test specification; and performing the load test of the load test of the network-based production service using the dynamically allocated one or more resources, wherein the program instructions computer-executable to implement performing the load test comprise:

program instructions computer-executable to implement:

generating a load for load testing the network-based production service based at least in part on the items of transaction data in the load test data repository, wherein the items of transaction data comprise input to the network-based production service received as client request data over a network by the network-based production service, and sending from the scalable production load test service to the network-based production service, transactions based on the generated load, wherein the scalable production load test service is the scalable production service from which the items of transaction data used to generate the load were captured.

13. The non-transitory computer-readable storage medium of claim 12, wherein the program instructions computer-executable to implement dynamically allocating one or more resources to perform a load test of the network-based production service according to the load test specification further comprise program instructions computer-executable to:

calculate a number of virtual computing instances required to execute the load test of the network-based production service according to the load test specification; and communicate with a network-based computing service to instantiate the calculated number of virtual computing instances to execute the load test of the network-based production service according to the load test specification.

14. The non-transitory computer-readable storage medium of claim 12, further comprising program instructions computer-executable to implement presenting a dashboard of metrics representing comparison between performance of the network-based production service during load testing of the network-based production service specified by the load test specification and a predictive model of said performance of the network-based production service during load testing of the network-based production service specified by the load test specification.

15. The non-transitory computer-readable storage medium of claim 12, wherein the capturing to a load test data repository of the scalable production load test service the items of transaction data further comprises importing from a third-party data provider to the load test data repository of the scalable production load test service the items of transaction data, wherein the third-party data provider is distinct from the network-based production service.

* * * * *